United States Patent
Kyojima et al.

(10) Patent No.: US 7,225,165 B1
(45) Date of Patent: May 29, 2007

(54) LICENSE-ISSUING SYSTEM AND METHOD

(75) Inventors: Masaki Kyojima, Nakai-machi (JP); Kil-ho Shin, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1526 days.

(21) Appl. No.: 09/678,031

(22) Filed: Oct. 3, 2000

(30) Foreign Application Priority Data

Feb. 1, 2000 (JP) .............................. 2000-024525

(51) Int. Cl.
*G06Q 99/00* (2006.01)
*H04K 1/00* (2006.01)
(52) U.S. Cl. .............................. 705/59; 705/57; 705/52
(58) Field of Classification Search .................... 705/1, 705/51, 59
See application file for complete search history.

(56) References Cited

U.S. PATENT DOCUMENTS 5,892,900 A * 4/1999 Ginter et al. ............... 395/186

\* cited by examiner

*Primary Examiner*—Firmin Backer
(74) *Attorney, Agent, or Firm*—Oliff & Berridge, PLC

(57) ABSTRACT

The invention enables a provider and a retailer of digital contents to issue an electronic license to a consumer without wasting its own resources. A retailer sells digital contents to a consumer via the Internet. The retailer requests a license-issuing center to issue an electronic license corresponding to the digital contents and the user of the contents and receives the generated license. The user receives the license from the retailer via the Internet. The terminal used by the user certifies that he/she is a legitimate user using his/her license when he/she uses the digital contents provided from the provider. When the license is verified, the user can use the digital contents.

42 Claims, 37 Drawing Sheets

FIG.6

| PROVIDER IDENTIFIER |
|---|
| PRV10001 |
| PRV10002 |
| PRV10003 |
| ... |

FIG.7

| PUBLIC KEY IDENTIFIER | MODULUS | PUBLIC KEY | PRIVATE KEY | PROVIDER IDENTIFIER | START OF EFFECTIVE PERIOD | END OF EFFECTIVE PERIOD | DATE OF ISSUE |
|---|---|---|---|---|---|---|---|
| PK10001 | 10110... | 11001... | 10101... | PRV10001 | 2000.1.1 | 2001.1.1 | 2000.12.1 |
| PK10002 | 10010... | 11110... | 11011... | PRV10003 | 1999.3.5 | 2000.2.3 | 2000.1.2 |
| PK10003 | 11111... | 10000... | 10101... | PRV10001 | 1999.11.1 | 2000.5.1 | 2000.3.1 |
| ... | ... | ... | ... | ... | ... | ... | ... |

FIG.9

| CONSUMER IDENTIFIER | CONSUMER PRIVATE INFORMATION |
|---|---|
| CNS10001 | 10110... |
| CNS10002 | 11000... |
| CNS10003 | 01110... |
| ... | ... |

FIG.8

| RETAILER IDENTIFIER |
|---|
| RTL10001 |
| RTL10002 |
| RTL10003 |
| ... |

FIG.10

| PUBLIC KEY IDENTIFIER | PROVIDER IDENTIFIER | CONSUMER IDENTIFIER | INTERMEDIARY IDENTIFIER | USAGE CONDITION | DATE OF ISSUE |
|---|---|---|---|---|---|
| PK00001 | PRV10001 | CNS10001 | RTL10002 | 2F34A... | 2000.2.1 |
| PK00002 | PRV10003 | CNS10001 | RTL10002 | 44FBC... | 1999.4.16 |
| PK00002 | PRV10003 | CNS10003 | RTL10001 | 5AAB1... | 1999.11.12 |
| ... | ... | ... | ... | ... | ... |

FIG.14

| PUBLIC KEY IDENTIFIER | MODULUS | PUBLIC KEY | START OF EFFECTIVE PERIOD | END OF EFFECTIVE PERIOD | APPLICATION |
|---|---|---|---|---|---|
| PK00001 | 10110... | 11001... | 2000.1.1 | 2001.1.1 | UTILIZATION OF WD+++ |
| PK00003 | 11111... | 10000... | 1999.11.1 | 2000.5.1 | READING Mimic PICTURE FILE |
| PK00007 | 11000... | 10110... | 1999.8.1 | 2000.2.1 | UTILIZATION OF WJE |
| ... | ... | ... | ... | ... | ... |

FIG.19

| AGREEMENT IDENTIFIER | PUBLIC KEY IDENTIFIER | PROVIDER IDENTIFIER | AGREEMENT | PROVIDER CERTIFICATE |
|---|---|---|---|---|
| AGM01002 | PK00001 | PRV10001 | FF3AC4... | FE66B... |
| AGM03010 | PK00002 | PRV10003 | FF3CC2... | FEE4A... |
| AGM03034 | PK00008 | PRV10003 | FFF87A... | FE7DE... |
| ... | ... | ... | ... | ... |

FIG.20

| LICENSE IDENTIFIER | PUBLIC KEY IDENTIFIER | PROVIDER IDENTIFIER | CONSUMER IDENTIFIER | REQUESTER IDENTIFIER | USAGE CONDITION | DATE AND TIME OF REQUEST | DATE AND TIME OF TRANSMISSION |
|---|---|---|---|---|---|---|---|
| TKT10004 | PK00001 | PRV10001 | CNS10006 | CNS10006 | 2F34A... | 2000.2.1 10:25 | 2000.2.1 10:27 |
| TKT10010 | PK00008 | PRV10003 | CNS10003 | RTL10024 | 44FBC... | 2000.2.16 18:03 | 2000.2.16 18:04 |
| | PK00001 | PRV10001 | CNS10012 | CNS10012 | 5AAB1... | 2000.3.1 03:54 | |
| ... | ... | ... | ... | ... | ... | ... | ... |

FIG.34

| AGREEMENT IDENTIFIER | PUBLIC KEY IDENTIFIER | RETAILER IDENTIFIER | USAGE CONDITION LIMITATION INFORMATION | START OF EFFECTIVE PERIOD | END OF EFFECTIVE PERIOD | DATE OF ISSUE |
|---|---|---|---|---|---|---|
| AGM01002 | PK00001 | RTL10001 | FF3AC4... | 1999.12.1 | 2000.11.31 | 1999.12.1 |
| AGM03010 | PK00002 | RTL10003 | FF3CC2... | 2000.1.1 | 2000.7.1 | 2000.1.1 |
| AGM03034 | PK00008 | RTL10003 | FFF87A... | 2000.3.4 | 2001.3.4 | 2000.3.3 |
| ... | ... | ... | ... | ... | ... | ... |

LICENSE-ISSUING SYSTEM AND METHOD

BACKGROUND OF THE INVENTION

1. Field of the Invention

The present invention relates to technology for licensing the utilization of digital contents in a computer, particularly relates to the issue of a license which certificates that the user is licensed to use digital contents and the verification of the legitimacy of the license.

2. Description of the Related Art

As the Internet is rapidly popularized, business that sells digital contents including digital data such as an image, sound, a projected image and software via the Internet is being popular. From the viewpoint of a provider of digital contents, the use of the Internet has a merit that the cost for the packaging of digital contents and distribution can be saved, and from the viewpoint of a consumer, the use of the Internet has a merit that a consumer can get digital contents at home. Undoubtedly, the provision of digital contents via the Internet is to become the mainstream of business based upon digital contents in future.

It is the most serious problem in currently selling digital contents that the charging a right fee from the user of digital contents is difficult. Recently, electronic payment is starting to be ready to operate and the transfer of money itself is becoming safe. Therefore, as long as a user of digital contents has a will to pay, a problem is hardly caused. However, it is very easy for a person unwilling to pay to copy and use contents because of the characteristic of digital contents that copying is possible without any trace.

A method currently most often adopted in relation to the problem described above is access control in a web site.

According to the method, a consumer downloads digital contents from a web site in the Internet. At the site, access from a consumer is controlled and only a consumer who paid a fee can download digital contents. This method can charge a consumer who accesses the site a fee, however, it is a problem that digital contents after they are downloaded can be copied and their fee cannot be got from the user of the copy. However, this method can charge at least a consumer who downloads digital contents a fee and the system for this method is simple and easy to install, therefore, many providers utilize the method.

A technique devised to also charge a user of copied digital contents a fee is a method using data called a software key. It is a method used for selling software and is often used for selling shareware.

According to the method, a provider of digital contents determines a set of digital data called a software key effective for digital contents provided by the provider and a method of verifying the effectiveness of the software key. A method of verifying a software key is involved in digital contents and only when an effective software key is input; the use of the digital contents is permitted. As a software key is sent to only a consumer who paid the fee of digital content, it is only the consumer who paid the fee of digital contents that can use the digital contents. Conversely, a consumer who wants to use digital contents is necessarily required to buy a software key from a provider of the digital contents.

In a system that a provider of digital contents determines a set of an effective software key and a method of verifying the effectiveness of the software key, a provider of digital contents has to bear the development cost related to the software key and the management cost of selling and issuing the software key. A software key is digital data also called a certificate for certifying the right of a consumer to use digital contents and resistance to various problems related to security such as leakage, forgery and copying of a software key is required. The development and management of such a system increase a cost, become a serious obstacle when a provider of digital contents starts selling digital contents and give disadvantage of a rise in a price to a consumer.

SUMMARY OF THE INVENTION

According to the invention, the problems described above are solved by using a server for issuing a license independent from specific digital contents, a provider of digital contents or a seller of digital contents (hereinafter this server is called a license-issuing center or only a center) in the Internet. The license-issuing center undertakes all related to the generation and maintenance of a license and a seller of digital contents can entrust the license-issuing center with most of a part related to a license. As many sellers can use a common license-issuing center, the cost of development and management of the license-issuing center per one seller can be reduced, compared with a case that a seller develops its own system.

In the invention, a seller of digital content issues a license in response to a request for buying digital contents received from a consumer and the license is generated by a license-issuing center. The seller has a server for accepting a request for buying digital contents from a consumer in the Internet, however, a part related to the generation of a license does not exist in the server and the license-issuing center plays the role.

In using digital contents, a consumer inputs his/her license, only when the legitimacy of the license is verified, contents can be used. This verification is performed using digital data called information for verification. Information for verification is generated so that predetermined relationship is met between plural licenses and the legitimacy of a license is determined based upon whether the relationship is met between the information for verification and the license or not. If specific digital contents and specific information for verification are made to correspond, it can be determined whether a consumer bought digital contents or not depending upon whether a license between which and the information for verification predetermined relationship is met can be input or not.

Information for verification is generated in the center and output. If information for verification corresponding to a license which any seller sells is acquired, the legitimacy of the license can be verified.

The characteristics described above has effect of further reducing the cost for a seller who starts business of selling digital contents to pay. In the invention, a provider of digital contents and a seller of them are independently compatible. The provider of digital contents entrusts many sellers with selling the digital contents that the provider provides and can dedicate to the provision of the digital contents. Also, the sellers can sell many digital contents provided by various providers without digital contents that the sellers themselves provide.

A first or second aspect of the invention relates to a license-issuing center.

The first aspect of the invention is based upon a method of issuing an electronic license for certifying that the usage of digital contents is permitted to a specific user and is characterized in that a step for generating information for verification required to verify the legitimacy of an electronic license, a step for inputting information to specify the information for verification, a step for generating the electronic license which can be verified by the information for verification specified by the input information to specify the information for verification and a step for outputting the generated electronic license are provided.

Also, the second aspect of the invention is based upon a computer that issues an electronic license for certifying that the usage of digital contents is permitted to a specific user and is characterized in that a verification information generating section for generating information for verification required to verify the legitimacy of an electronic license, a verification information output section for outputting the information for verification generated by the verification information generating section, a license generating section which receives information to specify information for verification and generates the electronic license that can be verified by the information for verification specified by the input and a license output section for outputting the electronic license generated by the license generating section are provided.

The center according to the first or second aspect not only issues an electronic license but outputs information for verification for verifying the electronic license. The information for verification is used when the legitimacy of the electronic license input from a consumer in using digital contents is verified. As a set of licenses verifiable based upon specific information for verification is limited, a license only for specific digital contents can be issued by allocating the information for verification to the specific digital content. However, the center is not required to be concerned in correspondence between information for verification and digital contents. A provider of digital contents can freely determine connection between digital contents and information for verification.

A third or fourth aspect of the invention relates to a server for selling digital contents.

The third aspect is based upon a method of mediating a request for an electronic license for certifying that the usage of digital contents is permitted to a specific user and is characterized in that a step for receiving a first license request which is a request for the issuance of the electronic license for certifying that the usage of specific digital contents is permitted, a step for preparing a second license request for requesting the issuance of the electronic license requested in the received first license request and a step for outputting the prepared second license request are provided.

The fourth aspect is based upon a computer that intermediates a request for an electronic license for certifying that the usage of digital contents is permitted to a specific user and is characterized in that a license request receiving section for receiving a first license request which is a request for the issuance of the electronic license for certifying that the usage of specific digital contents is permitted, a license request preparing section for generating a second license request for requesting the issuance of the electronic license requested in the received first license request and a license request outputting section for outputting the second license request prepared in the license request preparing section are provided.

A server for selling digital contents to which the third or fourth aspect is applied accepts a request for issuance an electronic license from a consumer or other seller connected to the Internet. However, it is not the server that generates the electronic license corresponding to the accepted request. Only the license-issuing center issues the electronic license and the server for selling digital contents only mediates a request for an electronic license. As the server only mediates a request and the center considers an attack such as the falsification, forgery and copying of an electronic license, the initial cost and management cost of the server for selling digital contents according to this embodiment are reduced.

A fifth or sixth aspect of the invention relates to a provider of digital contents.

In the case a provider and a seller of digital contents independently coexist, it is basically profitable to the provider that digital contents provided by the provider are sold by many sellers. However, when digital contents of the provider are sold by an unreliable seller, trouble may be caused later and the situation cannot be allowed by the provider. Therefore, a technique for a provider of digital contents to limit sellers who can sell the digital contents is required.

The fifth aspect of the invention is based upon a method of allowing the intermediation of a request for an electronic license for certifying that the usage of digital contents is permitted to a specific user and is characterized in that a step for inputting information to specify an intermediator that intermediates a request for an electronic license of digital contents, a step for inputting information to specify digital contents of the intermediation which is permitted to the intermediator, a step for preparing an agreement for certifying that the intermediation of the request for the electronic license of the digital contents is permitted to the specified intermediator and a step for outputting the generated agreement are provided.

Also, the sixth aspect of the invention is based upon a computer for allowing the intermediation of a request for an electronic license for certifying that the usage of digital contents is permitted to a specific user and is characterized in that an agreement preparing section which receives information for specifying the intermediator that intermediates a request for an electronic license of digital contents and information to specify digital contents the request for electronic license of which the intermediator is allowed to intermediate and generates an agreement for certifying that the specified intermediator is allowed to intermediate the request for the electronic license of the specified digital contents and an agreement output section for outputting an agreement generated by the agreement preparing section are provided.

According to the fifth or sixth aspect, a provider of digital contents issues an agreement to sellers to whom the selling of digital contents provided by the provider is permitted. The agreement is input to the center in the case the seller requests the center for the issuance of a license. The center can check whether the mediation of the request is allowed to the sellers or not based upon the input agreement.

A seventh or eighth aspect of the invention relates to digital contents provided to a consumer and particularly relates to a feature to check whether a consumer owns his/her license or not.

The seventh aspect is based upon a method of providing one or more features to a user and is characterized in that a step for storing information for verification to verify an electronic license for certifying that the usage of all or a part of features is permitted to a specific user, a step for inputting an electronic license, a step for verifying the legitimacy of the input electronic license using the stored information and a step for activating at least a part of the features for verification only in the case it is judged that the input electronic license is legitimate are provided.

The eighth aspect is based upon a system for providing one or more features to a user and is characterized in that a verification information storage section for storing information for verification to verify an electronic license that certifies that the usage of all or a part of features of the system is permitted to a specific user and a license verification section which receives an electronic and verifies the legitimacy of the received electronic license using the information for verification stored in the verification information storage section are provided and at least the part of the features is activated only in the case it is judged in the license verification section that the received electronic license is legitimate.

A ninth or tenth aspect of the invention relates to a system or software for operating digital contents provided to a consumer and particularly relates to the ones having a feature to check whether a consumer has a legitimate license for operating digital contents or not.

The ninth aspect is based upon a method of operating digital contents and is characterized in that a step for storing information for verification to verify an electronic license for certifying that the operation of digital contents is permitted to a specific user, a step for inputting an electronic license, a step for verifying the legitimacy of the input electronic license using the stored information for verification and a step for enabling at least a part of operations of digital contents only in the case it is judged that the input electronic license is legitimate are provided.

The tenth aspect is based upon a system for operating digital contents and is characterized in that a verification information storage section for storing information for verification to verify an electronic license that certifies that the operation of digital contents is permitted to a specific user and a license verification section which receives an electronic license and verifies the legitimacy of the received electronic license using the information for verification stored in the verification information storage section are provided and at least the part of the operations of digital contents is enabled only in the case it is judged in the license verification section that the received electronic license is legitimate.

An eleventh or twelfth aspect of the invention relates to a system or software for decrypting encrypted digital contents provided to a consumer and particularly relates to the ones having a feature to check whether a consumer owns a legitimate license that can decrypt digital contents or not.

The eleventh aspect is based upon a method of decrypting encrypted digital contents and is characterized in that a step for storing information for verification to verify an electronic license that certifies that the decrypting of encrypted digital contents is permitted to a specific user, a step for inputting an electronic license, a step for verifying the legitimacy of the input electronic license using the stored information for verification and a step for decrypting the encrypted digital contents only in the case it is judged that the input electronic license is legitimate are provided.

The twelfth aspect is based upon a system for decrypting encrypted digital contents and is characterized in that a verification information storage section for storing information for verification to verify an electronic license that certifies that the decrypting of encrypted digital contents is permitted to a specific user and a license verification section which receives an electronic license and verifies the legitimacy of the received electronic license using the information for verification stored in the verification information storage section are provided and the encrypted digital contents are decrypted only in the case it is judged in the license verification section that the received electronic license is legitimate.

A thirteenth or fourteenth aspect of the invention relates to a system or software for decompressing compressed digital contents provided to a consumer and particularly relates to the ones having a feature to check whether a consumer owns a legitimate license that can decompress digital contents or not.

The thirteenth aspect is based upon a method of decompressing compressed digital contents and is characterized in that a step for storing information for verification to verify an electronic license that certifies that the decompression of compressed digital contents is permitted to a specific user, a step for inputting an electronic license, a step for verifying the legitimacy of the input electronic license using the stored information for verification and a step for decompressing the compressed digital contents only in the case it is judged that the input electronic license is legitimate are provided.

The fourteenth aspect is based upon a system for decompressing compressed digital contents and is characterized in that a section for receiving compressed digital contents to be decompressed, a verification information storage section for storing information for verification to verify an electronic license that certifies that the decompression of compressed digital contents is permitted to a specific user and a license verification section which receives an electronic license and verifies the legitimacy of the received electronic license using the information for verification stored in the verification information storage section are provided and the compressed digital contents are decompressed only in the case it is judged in the license verification section that the received electronic license is legitimate.

However, the invention is not limited to usage in the Internet and can be widely applied to a communication network.

BRIEF DESCRIPTION OF THE DRAWINGS

Preferred embodiments of the present invention will be described in detail based upon the followings, wherein:

FIG. 6 shows the structure of a provider DB that the center to which the invention is applied has;

FIG. 7 shows the structure of a public key pair DB that the center to which the invention is applied has;

FIG. 8 shows the structure of a retailer DB that the center to which the invention is applied has;

FIG. 9 shows the structure of a consumer DB that the center to which the invention is applied has;

FIG. 10 shows the structure of a license issuance history DB that the center to which the invention is applied has;

FIG. 14 shows the structure of a verification public key DB that the provider to which the invention is applied has;

FIG. 19 shows the structure of an agreement DB that the retailer to which the invention is applied has;

FIG. 20 shows the structure of the license intermediation history DB that the retailer to which the invention is applied has;

FIG. 34 shows the structure of the agreement issuance history DB that the provider to which the invention is applied has;

DETAILED DESCRIPTION OF THE PREFERRED EMBODIMENTS

One embodiment of the invention will be described above.

Figure 1:
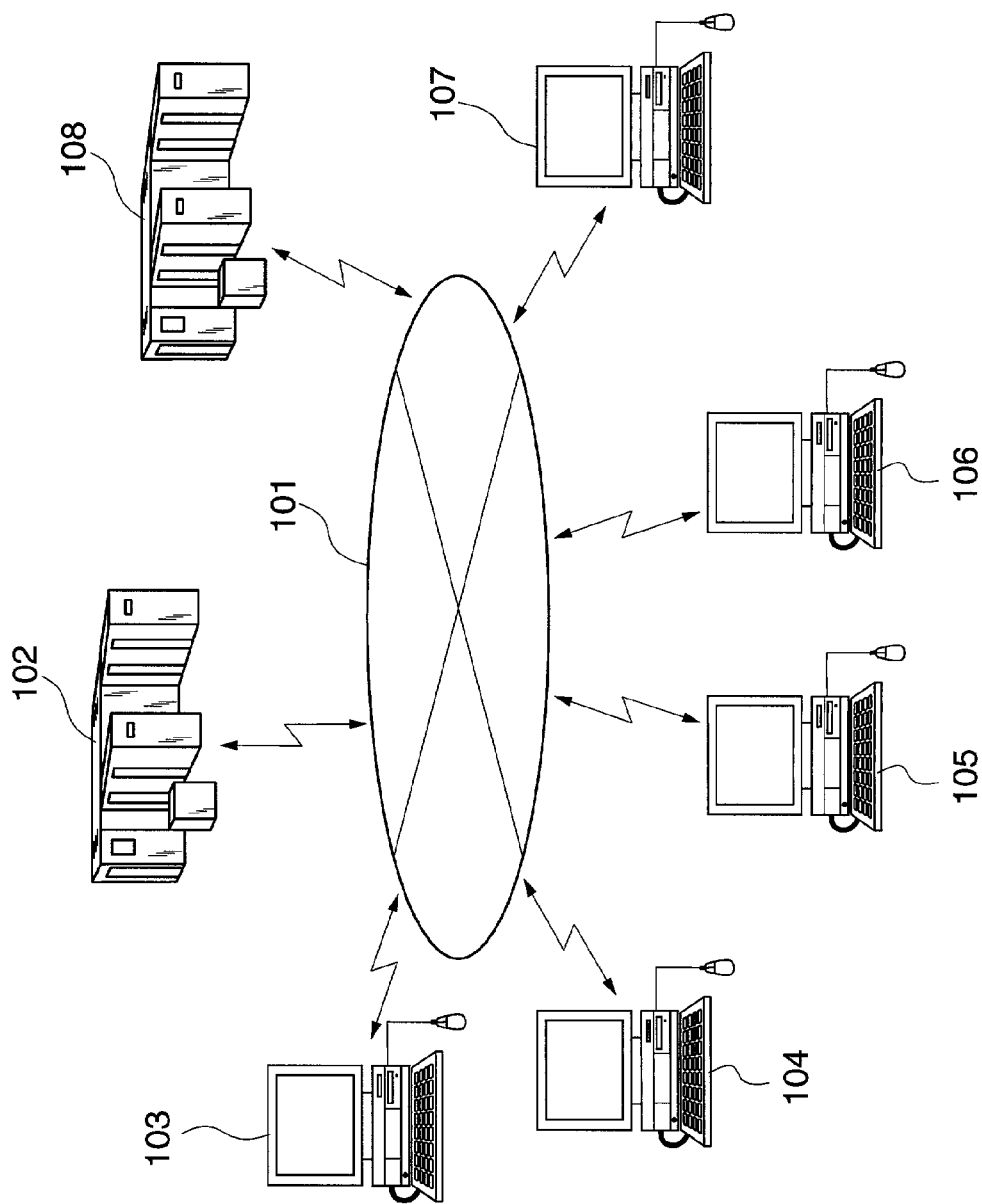
FIG. 1 is a block diagram showing an embodiment to which the invention is applied.

FIG. 1 is a block diagram showing the embodiment to which the invention is applied. A system equivalent to this embodiment includes plural computers connected to the Internet and digital contents are sold by operating these in coordination.

In this embodiment, a consumer buys digital contents via the Internet and receives a license that is digital data for certifying the purchase is completed.

Digital contents are provided to a consumer in such a form that only the consumer having a license can use the digital contents. A user can use the digital contents only in the case he/she owns the license.

—Group of Computers in this Embodiment—

Computers in this embodiment are classified into the following four types. The respective types are connected to the Internet 101 and mutually communicate.

Consumer terminal: a computer used when a consumer buys digital contents. It is shown as 107 in FIG. 1. The consumer terminal may also be a personal computer that a consumer uses at home and may also be a terminal in a convenience store and others. It is connected to the Internet 101 and can access to another computer via the Internet 101.

Retailer: a computer that sells digital contents to a consumer. It is shown as 103 or 104 in FIG. 1 and the number of retailers is not limited. The retailer is connected to the Internet 101 and accepts access from a consumer via the Internet 101. It is a seller of digital contents that maintains a retailer, however, in the following description of this embodiment, the seller and the computer maintained by the seller are not discriminated and are both called a retailer.

License-issuing center: a computer that generates and issues a license. It is shown as 102 in FIG. 1. The license-issuing center is connected to the Internet 101, accepts a request for a license from a retailer via the Internet, generates and issues the license on demand. Hereinafter, a license-issuing center is called a center.

Provider: a computer for a provider of digital contents to exchange information with the retailer 103 or 104 and the center 102 and is connected to the Internet 101. It is shown as 105 or 106 in FIG. 1 and the number of providers is not limited. In the following description of this embodiment, the provider of digital contents and the computer that the provider maintains are not discriminated and are both called a provider.

Certificate Authority: a digital signature is added to each message exchanged among a consumer terminal, a retailer, the center and a provider to detect forgery and reject of repudiation for creating message. The legitimacy of a verification key for the digital signature is guaranteed by a public key certificate according to X.509. A certificate authority 108 is a computer having a feature to generate and issue the public key certificate and is connected to the Internet 101. Also, the certificate authority stores a public key certificate issued by itself and also has a feature to transmit it to a requester on demand. Hereinafter, the certificate authority is called CA.

License and public key for verification—

In this embodiment, digital data called a license is issued to certify that a consumer bought digital contents. The legitimacy of a license is verified based upon the corresponding public key for verification. As the name of a public key for verification shows, public key encrypting technology is applied to a license and a public key for verification in this embodiment.

More concretely, a public key for verification is a public key in public key cipher and a license is data including a certification value generated based upon a private key corresponding to the public key. Only in the case a private key used when a certification value included in a license is generated and a public key for verification correspond, it can be verified that the license is legitimate and in a case except it, the license is never approved.

In the case digital contents are sold in this embodiment, a public key for verification bound with specific digital contents to be sold or a specific feature that digital contents provide to a consumer is required. A license that permits only the use of specific digital contents and their specific feature can be realized by binding a specific public key for verification and specific digital contents or their specific feature.

The reason why public key encrypting technology is used for a license and a public key for verification is to open a public key for verification. In the case a public key for verification is a public key, the security of a license is never damaged even if the public key for verification is made open. This has an advantage that not only the transmitting/receiving and the management of a public key for verification are simplified but also the legitimacy of a license can be verified by a third party and later trouble can be prevented.

A public key for verification is generated in the center 102 by a request from a provider and data called verification public key involving the public key for verification is sent to the provider. The center 102 generates a new public key pair when it receives a request for issuing a public key for verification. After this generation the center stores the public key pair together with a verification public key identifier which is information for uniquely identifying the public key pair, and the center sends verification public key information including the public key of the pair and the verification public key identifier to the provider. The provider who receives the verification public key information is called a user of the information or a user of a public key for verification included in the information.

The center 102 is not concerned in relation between a specific public key for verification and specific digital contents or their specific feature. It is the provider which acquires an issued public key for verification that determines the relation and the provider is required to store information for relating specific digital contents, their specific feature and a public key for verification respectively determined by the provider.

A license is data for permitting the use of specific digital contents or their specific feature bound with a public key for verification corresponding to the license. It is stored in a computer in which a consumer uses digital contents and the legitimacy is verified when digital contents are used.

As a license is digital data, users other than those to whom the usage of digital contents is permitted may use them using a copied license. To prevent such a situation, a license is designed so that the legitimacy cannot be verified without information called consumer private information. Consumer private information is information for limiting a range in which a license is acknowledged to be legitimate and a license generated corresponding to certain consumer private information is never acknowledged to be legitimate in the case the license is used together with other consumer private information.

For example, in the case consumer private information is realized as a numeric value stored in a computer and every different computer, a license effective only in a specific computer can be realized. In this case, a consumer acquires a license suited to consumer private information that a computer where the consumer will use digital contents has. Afterward, the consumer can use digital contents only in the computer, however, he/she cannot use digital contents in other computer using the same license.

In the case it is inconvenient that the use of digital contents is limited to a specific computer, a portable memory unit such as an IC card can be used. In this case, consumer private information is realized so that it is different every portable memory unit. In this case, a consumer acquires a license suited to consumer private information included in the portable memory unit owned by him/her. Afterward, the consumer can use digital contents only in the case the portable memory unit which he/she has and the acquired license are both used, however, the consumer cannot use digital contents without the portable memory unit. A storage medium such as a removable disk and MO may also be use as a portable memory unit.

Consumer private information is realized as data stored so that even a consumer cannot refer to the value. Also, only algorithm in which the value is calculated based upon various characteristic amounts of a computer or a portable memory unit is stored, every time consumer private information is referred, calculation according to the algorithm is executed and the result may also be used for consumer private information. Though there may be other methods of realization, it is only the license-issuing center that knows the value of consumer private information in any method.

An identifier called a consumer identifier is assigned to each consumer private information. Though each consumer private information is private data to entity except the center, a consumer identifier is data to which anybody can refer. A consumer identifier is used to specify the consumer private information to which a license suited when a consumer requests the license.

Particularly in this embodiment, a consumer identifier is also used to specify an individual consumer. In the case consumer private information stored in plural computers which the same consumer uses are different, separate consumer identifiers are assigned and it is recognized that separate consumers exist.

The data structure of verification public key information is as follows:

Verification public key information::={
  Issuer field
  Recipient field
  Issue date/time field
  Start date/time of effective period
  End date/time of effective period
    Verification
public key identifier field
  Public key information field
  Digital signature field
  }

Issuer field: The center's identifier, which is an issuer of the verification public key information, is described.

Recipient field: The identifier of a provider, which is a recipient of the verification public key information, is described.

Issue date/time field: The date/time of issue of the verification public key information is described.

Start date/time of effective period: The start date/time of an effective period of the verification public key information is described.

End date/time of effective period: The end date/time of an effective period of the verification public key information is described.

Verification public key identifier field: A verification public key identifier that the center assigns to the public key for verification is described.

Public key information: The information of a public key for verification used when a license is verified is described. Public key information includes the specification of used public key cipher algorithm and a value of a public key.

Digital signature field: A digital signature for the whole verification public key information by the center, which is an issuer, is described.

The data structure of a license is as follows.

License::={
  Issuer field
  Recipient field
  Issue date/time field
  License identifier field
  Public key identifier field
  Usage condition field
  Certification value field
  Digital signature field
}

Issuer field: The center's identifier, which is an issuer of the license, is described.

Recipient field: The identifier of a consumer who is a recipient of the license is described.

Issue date/time field: The date/time of issue of the license is described.

Availability license identifier field: An identifier that the center assigns to the license is described.

Public key identifier field: A verification public key identifier assigned to a public key for verification corresponding to the license is described.

Usage condition field: A usage condition, which is a condition for limiting the range of digital contents, is described.

Certification value field: A certification value generated based upon a private key corresponding to a public key for verification to which an identifier described in the public key identifier field of the license is assigned is described.

Digital signature field: A digital signature for the whole license by the center, which is an issuer, is described.

For a usage condition described in the usage condition field, a condition for limiting the range of the utilization of digital contents made effective by the license is described.

The data structure of a usage condition is as follows.

Usage condition::={
  Start date/time of effective period
  End date/time of effective period
  - - -
  }

Start date/time of effective period: The start date/time of an effective period of the license is described. Before the date, digital contents cannot be used.

End date/time of effective period: The end date/time of an effective period of the license is described. After the date, digital contents cannot be used.

It is checked whether or not various conditions specified for a usage condition are met when a license is verified. In the case various conditions specified for a usage condition are not met, the legitimacy of the license is not verified.

For a usage condition, various conditions according to the application of a license are described in addition to the start date and the end date/time of an effective period.

For example, in the case the frequency of the usage of digital contents is, the limited frequency can be described in the usage condition field and it has only to be checked whether the frequency exceeds the limited frequency or not when a license is verified.

In the case a charge is collected in using digital contents, the price can be described in the usage condition field and processing such as subtracting the charge from prepaid frequencies has only to be executed when a license is verified.

Or in the case only the use of specific one of features that digital contents have is permitted, information for specifying the feature can be described in the usage condition field and it has only to be checked whether or not a feature for a user to use is described in the usage condition field when a license is verified.

—Certification Value—

A certification value is data included in a license, is generated based upon a private key corresponding to a public key for verification generated by the center and guarantees that a license corresponds to only a specific public key for verification. To generate a certification value, consumer private information is also used for controlling that the use of a certification value is permitted in only a specific computer or controlling that the use is permitted only with a specific portable memory unit is possible. Further, to generate a certification value, a usage condition described in a license is also used and it is also guaranteed that a certification value can be used only in the case a specific usage condition is met.

If the public key encryption algorithm used for this embodiment is RSA, a certification value t is generated based upon a private key d, a modulus n, a public key for verification e, a private key d, consumer private information u and a usage condition 1 according to the following expression.

$$t = d - f(n, e, u, l) \quad (1)$$

A function f ( ) is an open one-way function. For example, a cryptological one-way hash function such as SHA-1 and MD5 is used.

As clear from the expression (1), a certification value t functions as a private key d only in the case it is used together with a modulus n, a public key for verification e, consumer private information u and a usage condition 1. In the case one of them is replaced with another one, the certification value does not function as the private key d.

—Verification of a License and Usage of Digital Contents—

In this embodiment, when a consumer uses digital contents, the legitimacy of a license for the whole digital contents or a part of its features is verified, it is checked whether or not a consumer is permitted the usage of the whole digital contents or a part of its features and only in the case the usage is permitted, the usage is allowed.

Figure 35:
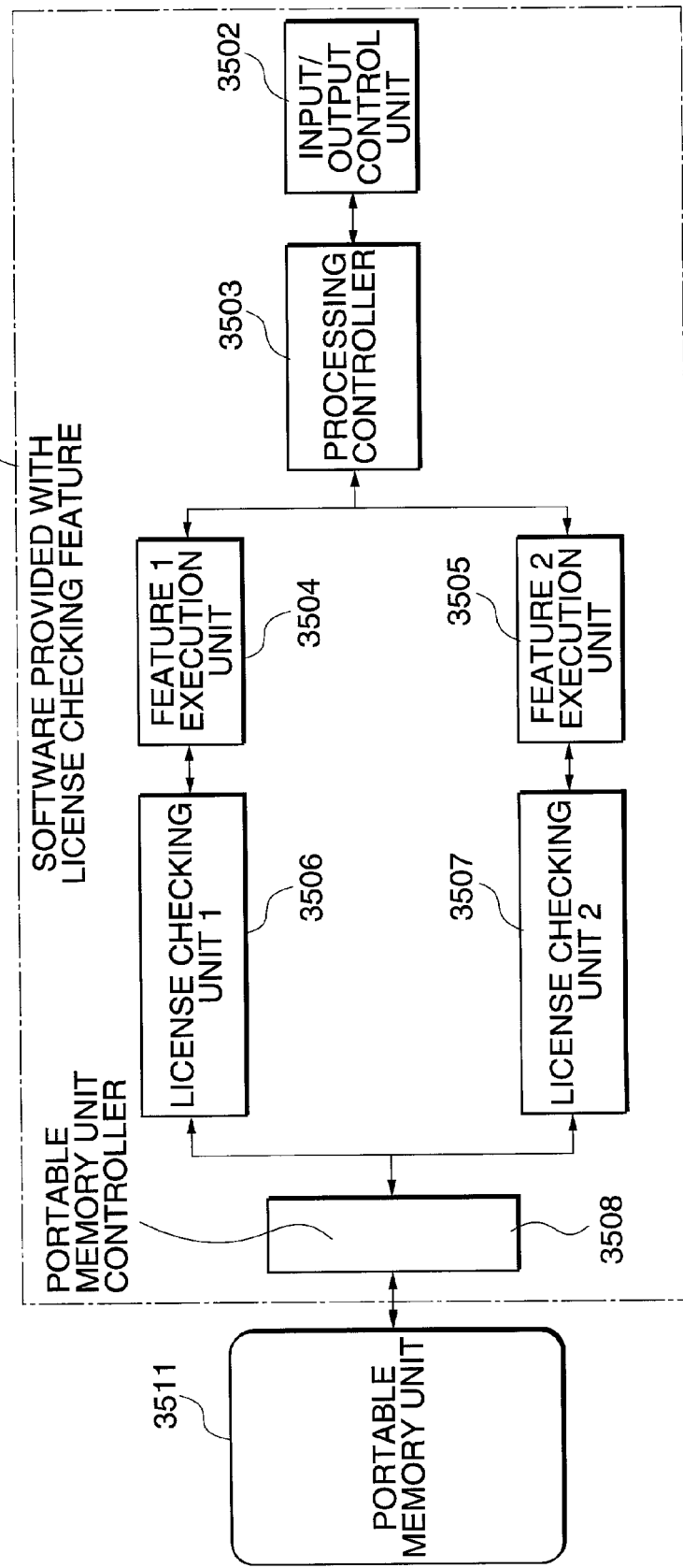
FIG. 35 shows an example of the configuration of the software provided with the license checking feature to which the invention is applied.

FIG. 35 shows the configuration of application software that is digital contents to which the invention is applied. This software executes two features according to a command from a user, however, before any feature is executed, it is checked whether a user has a license or not and only in the case a user owns a right license, the feature is executed. As different public keys for verification are assigned to respective features, different licenses are required.

Also, a consumer of this software is provided with a portable memory unit including a consumer identifier and consumer private information. A license required for a consumer to use digital contents is also stored in the portable memory unit.

This software 3501 includes an input/output control unit 3502, a processing control unit 3503, a feature 1 execution unit 3504, a feature 2 execution unit 3505, a first license checking unit 3506, a second license checking unit 3507 and a portable memory unit controller 3508. The portable memory unit 3511 connects with this software 3501 via the portable memory unit controller 3508.

The role of respective components is as follows:

Input/output control unit 3502: Controls input from a user or output to a user.

Processing control unit 3503: Receives a command from a user from the input/output control unit 3502, calls the feature 1 execution unit 3504 or the feature 2 execution unit 3505 according to the command, receives the result of the execution of a feature and outputs it to the user via the input/output control unit 3502.

Feature 1 execution unit 3504: Executes a first feature according to calling from the processing control unit 3503 and returns the result to the processing control unit 3503. Calls the first license checking unit 3506 before the execution and verifies that the user owns a right license corresponding to the first feature.

Feature 2 execution unit 3505: Executes a second feature according to calling from the processing control unit 3503 and returns the result to the processing control unit 3503. Calls the second license checking unit 3507 before the execution and verifies that the user owns a right license corresponding to the second feature.

First license checking unit 3506: Checks whether the user owns a right license corresponding to the first feature according to calling from the feature 1 execution unit 3504 or not and returns the result to the feature 1 execution unit 3504. Exchanges data with the portable memory unit 3511 via the portable memory unit controller 3508 to check the license.

Second license checking unit 3507: Checks whether the user owns a right license corresponding to the second feature or not according to calling from the feature 2 execution unit 3505 and returns the result to the feature 2 execution unit 3505. Exchanges data with the portable memory unit 3511 via the portable memory unit controller 3508 to check the license.

Portable memory unit controller 3508: Controls data exchange with the portable memory unit 3511.

Figure 28:
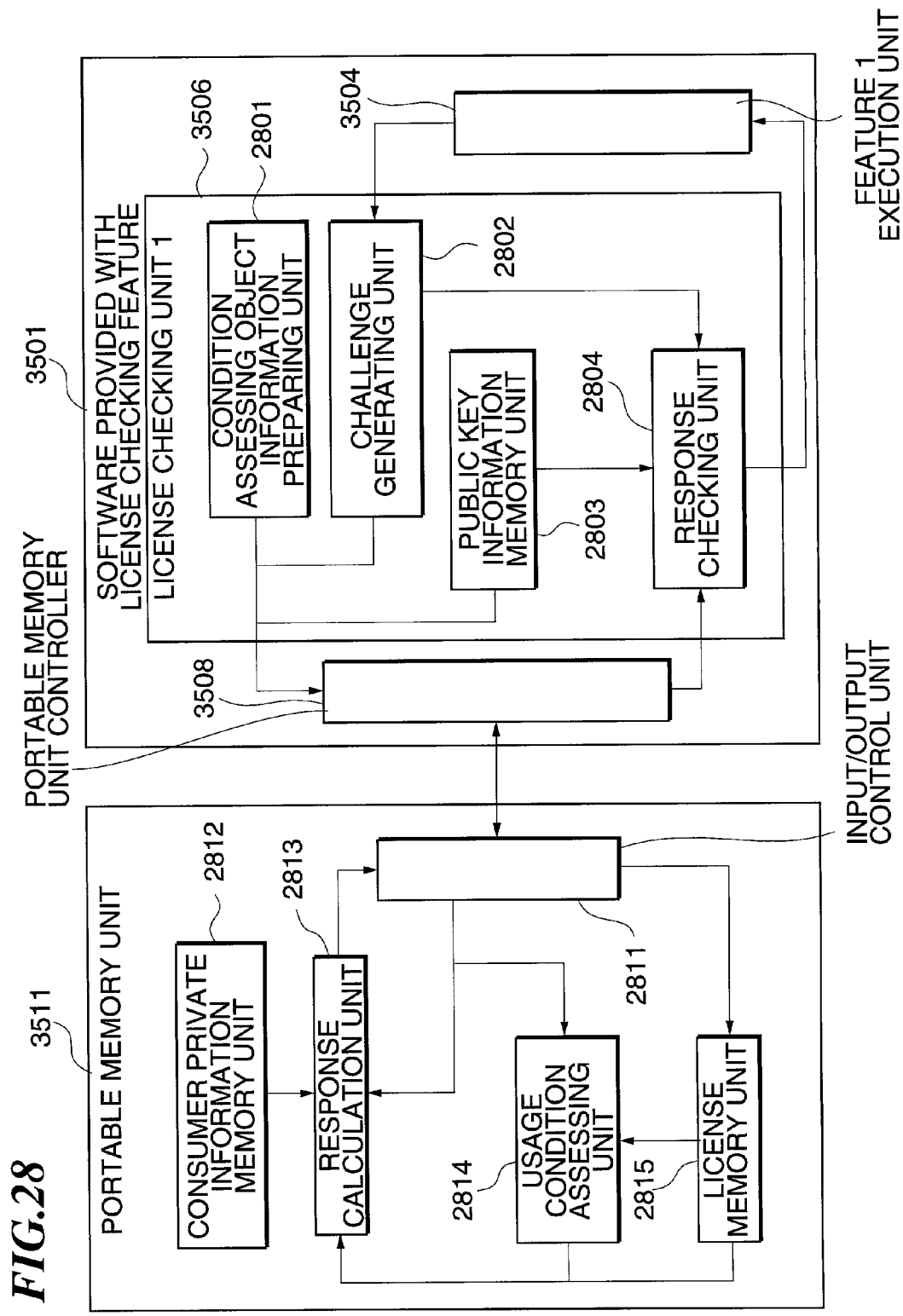
FIG. 28 shows an example of the internal configuration of the portable memory unit and software provided with the license checking feature respectively to which the invention is applied.

FIG. 28 shows the internal configuration of the first license checking unit 3506 of the software shown in FIG. 35 and the portable memory unit 3511 which stores data connected with the software. The first license checking unit 3506 sends a random number called a challenge to the portable memory unit 3511, the portable memory unit 3511 calculates and outputs a value called a response based upon the received challenge and a stored license and when the legitimacy of the response is checked by the license checking unit 3506. If the first license checking unit 3506 accept the legitimacy of the response, the legitimacy of the license stored in the portable memory unit 3511 is verified.

The first license checking unit 3506 includes a condition assessing object information preparing unit 2801, a challenge generating unit 2802, a public key information memory unit 2803 and a response checking unit 2804.

The role of each element of the license checking unit 3506 is as follows:

Conditions assessing object information preparing unit 2801: Generates the information that should be assessed in the case the first feature is executed only if an usage condition described in a license is satisfied.

Challenge generating unit 2802: Generates a challenge sent to the portable memory unit 3511.

Public key information memory unit 2803: Stores the modulus, the public key and the identifier of a public key for verification assigned to the first feature and a public key.

Response checking unit 2804: Checks the legitimacy of a response generated by the portable memory unit 3511.

The portable memory unit 3511 includes an input/output control unit 2811, a consumer private information memory unit 2812, a response calculation unit 2813, a usage condition assessing unit 2814 and a license memory unit 2815.

The role of each unit of the portable memory unit 3511 is as follows.

Input/output control unit 2811: Controls the input/output of data from/to the software 3501.

Consumer private information memory unit 2812: Stores consumer private information.

Response calculation unit 2813: Calculates a response sent to the first license checking unit 3506.

Usage condition assessing unit 2814: Determines whether a usage condition described in a license is met or not.

license memory unit 2815: Stores plural licenses.

Figure 29:
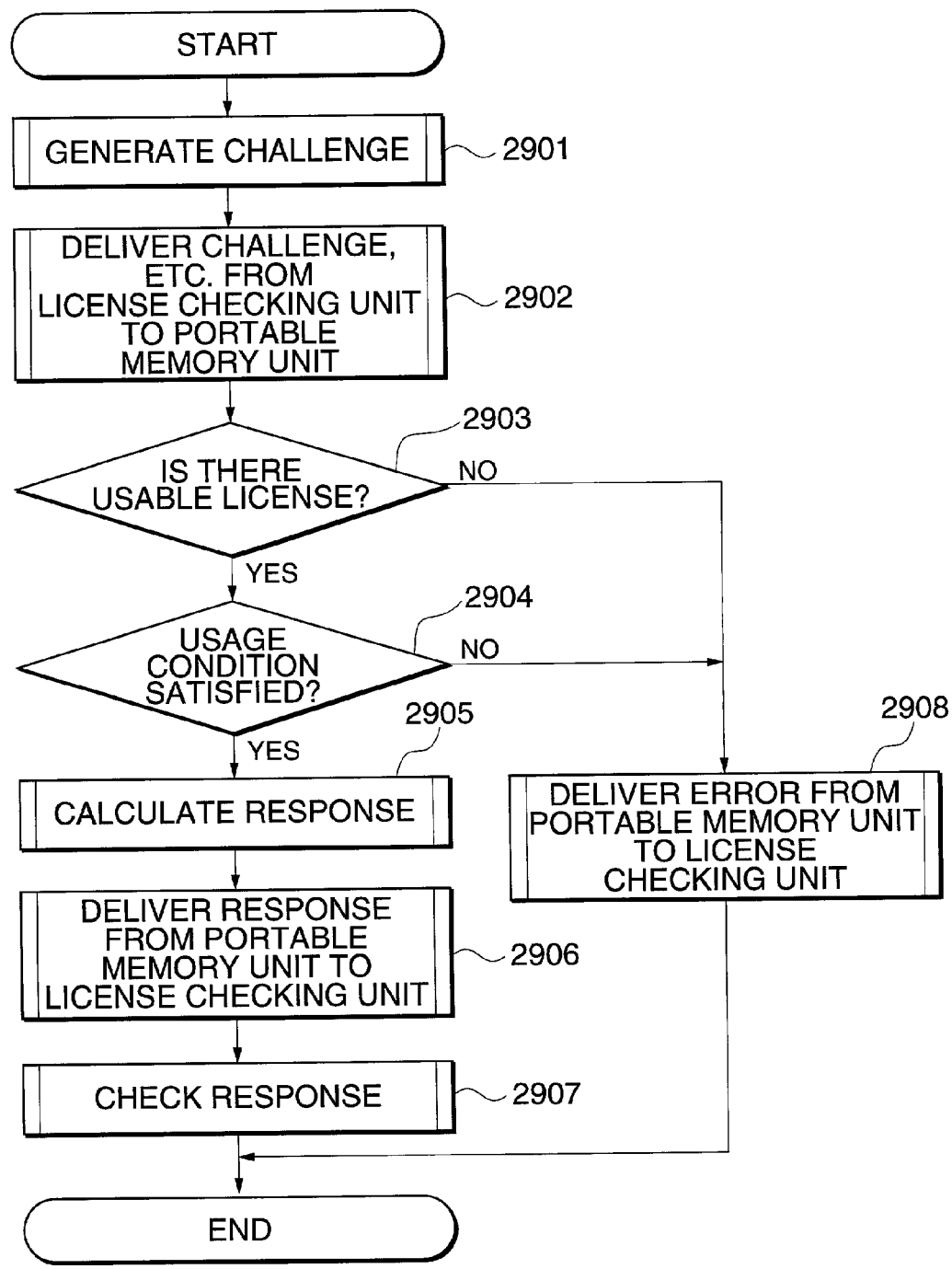
FIG. 29 is a flowchart showing the operation of the portable memory unit and the software provided with the license checking feature when a license is verified.

FIG. 29 is a flowchart showing the operation of the first license checking unit 3506 and the portable memory unit 3511 when a license for a first feature is checked. Referring to FIG. 29, the operation of the license checking unit 3506 and the portable memory unit 3511 when a license is checked will be described below.

Operation to check a license starts from the first license checking unit 3506.

First, a challenge C is generated in the challenge generating unit 2802 (2901). A challenge is a random number different every time check is done and the challenge generating unit 2802 includes a random number generation feature.

After a challenge is generated, the generated challenge C, the identifier ID, the public key e and the modulus n of a public key for verification stored in the public key information memory unit 2803 and condition assessing object information s generated by the conditions assessing object information preparing unit 2801 are sent to the portable memory unit 3511 via the portable memory unit controller 3508 (2902).

The portable memory unit 3511 which receives C, ID, n, e and s described above first selects a license corresponding to the verification public key identifier ID of licenses stored in the license memory unit 2815 (2903). The selection is executed by checking a value in a public key identifier field of the license stored in the license memory unit 2815 is equal to ID. In the case the corresponding license cannot be found, it is reported to the first license checking unit 3506 via the input/output control unit 2811 that an error occurs (2908) and the processing is terminated.

In the case the corresponding license is found, it is determined in the usage condition assessing unit 2814 whether a usage condition 1 included in the license is met or not (2904). To check the start and the end of an effective period of the license described in the usage condition 1, a clock is built in the usage condition assessing unit 2814. In the case the specification of a condition s is input from the first license checking unit 3506, it is also checked whether the condition assessing object information s meets the usage condition 1 or not.

In the case it is judged in 2904 that the usage condition 1 is not met, it is reported to the first license checking unit 3506 via the input/output control unit 2811 that an error occurs (2908) and the processing is finished.

In the case it is judged in 2904 that the usage condition 1 is met, a response R is calculated in the response calculation unit 2813 (2905) and is sent to the first license checking unit 3506 via the input/output control unit 2811 (2906). The response R is calculated according to the following expression (2) based upon a challenge C, modulus n, a public key e respectively input from the first license checking unit 3506 via the input/output control unit 2811, a certification value t and the usage condition 1 respectively included in the license selected in 2903 and consumer private information u stored in the consumer private information memory unit 2812.

$$R = C^{t+f(n,e,u,l)} \bmod n \qquad (2)$$

The first license checking unit 3506 which receives the response R via the portable memory unit controller 3508 checks the legitimacy of the response R in the response checking unit 2804 (2907). A challenge C generated by the challenge generating unit 2802, modulus n and a public key e stored in the public key information memory unit 2803 are used in the check in addition to the response R. If the following expression (3) is met, verification is successful and if not, verification is failure.

$$C \equiv R^e \bmod n \qquad (3)$$

As clear from the expressions (1), (2) and (3), the check of a license is basically processing for determining whether a certification value t can function as a private key d or not and only when the combination of modulus, a public key, a certification value, a usage condition and consumer private information is legitimate, the verification of a response is successful. Attack such as the diversion of the license different in a public key for, the usage of the license of another user and the forgery of an usage condition is difficult.

As described above, many conditions in addition to the effective period of a license can be described for the usage condition 1. Of them, in the case information to be an object of assessing a condition is not stored in the portable memory unit, the information is supplied from outside the portable memory unit 3511 as condition assessing object information s. For example, in the case it is described in the usage condition 1 that the first feature of the software in FIG. 35 is available only after execution of the second feature of the same software, information showing whether the second feature is executed or not is generated in the conditions assessing object information preparing unit 2801 and is supplied from outside the portable memory unit 3511 as condition determination object information s.

The second license checking unit 3507 of the software shown in FIG. 35 also has the similar internal configuration to the first license checking unit 3606 shown in FIG. 28 and performs the similar operation to that described in relation to FIG. 29.

Figure 36:
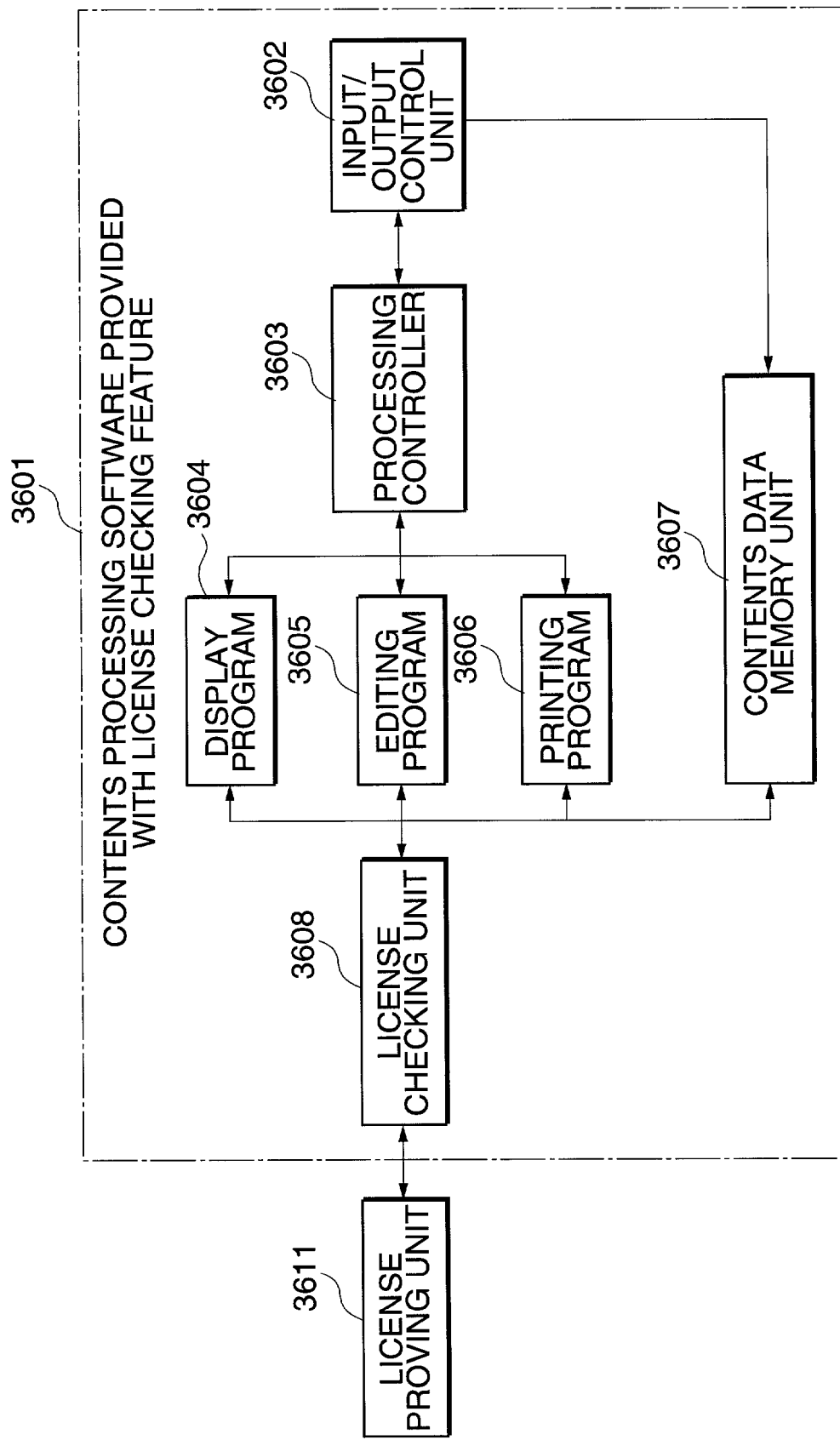
FIG. 36 shows an example of the configuration of the contents processing software provided with the license checking feature to which the invention is applied.

FIG. 36 shows digital contents processing software to which the invention is applied. This is software that can display, edit and print digital contents such as a document, images, music and screen images. This software checks whether a user owns a right license or not before operations on digital contents and only in the case the user owns a right license, operations are enabled.

The software 3601 includes an input/output control unit 3602, a processing control unit 3603, a display program 3604, an editing program 3605, a printing program 3606, a contents data memory unit 3607 and a license checking unit 3608.

The role of respective components is as follows.

Input/output control unit 3602: Controls input/output from/to a user.

Processing control unit 3603: Receives a command from a user from the input/output control unit 3602 and executes a function such as displaying, editing and printing digital contents according to the command.

Display program 3604: Displays digital contents according to calling from the processing control unit 3603. Calls the license checking unit 3608 before the execution of display and verifies that a user owns a right license for the display of the digital contents.

Editing program 3605: Edits digital contents according to calling from the processing control unit 3603. Calls the license checking unit 3608 before the execution of editing and verifies that a user owns a right license for editing the digital contents.

Printing program 3606: Prints digital contents according to calling from the processing control unit 3603. Calls the license checking unit 3608 before the execution of printing and verifies that a user owns a right license for printing the digital contents.

Contents data memory unit 3607: Stores the data of digital contents which a user is operating.

License checking unit 3608: Is called from the display program 3604, the editing program 3605 and the printing program 3606 and checks whether or not a user owns a license that enables specified operation for digital contents under operation.

In a computer where this software is run exists a license proving unit 3611 that stores consumer private information and licenses, generates information used for checking the legitimacy of a license and sends it to the license checking unit 3608.

Figure 37:
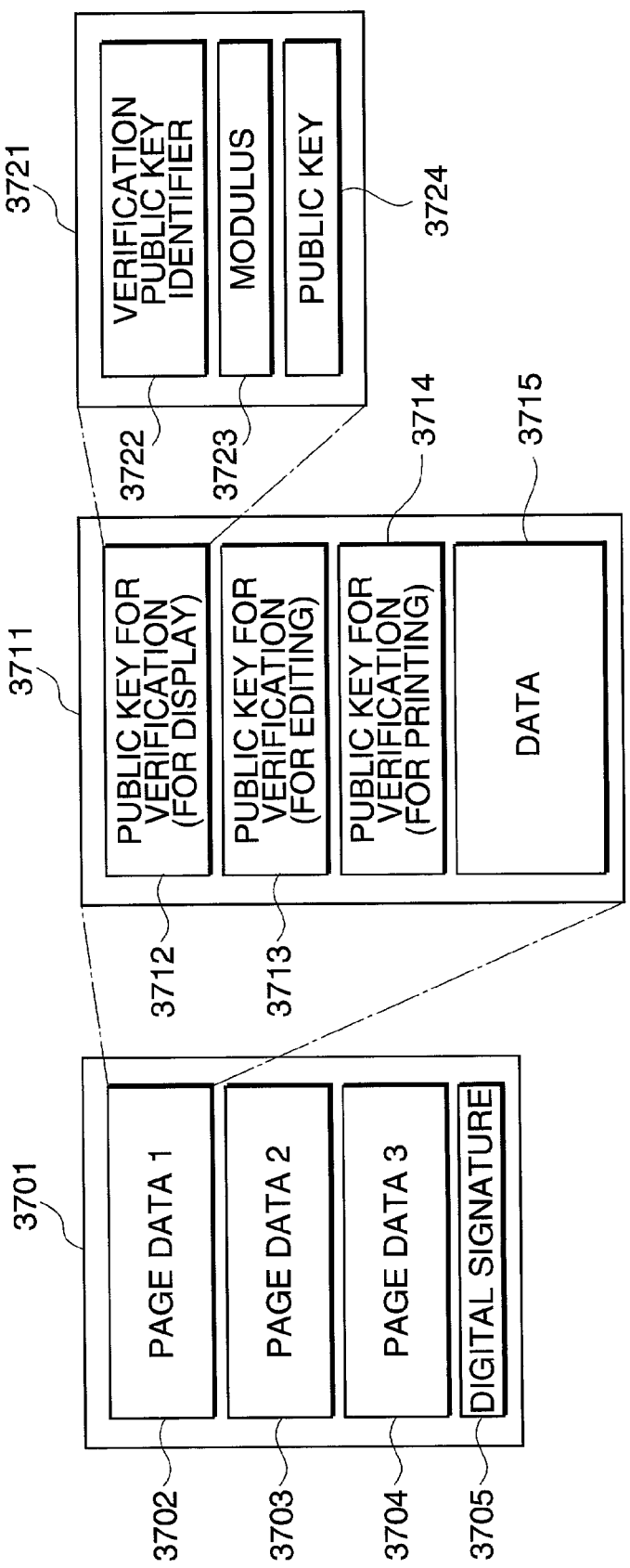
FIG. 37 shows the data structure of the digital contents operated by the contents processing software provided with the license checking feature to which the invention is applied.

FIG. 37 shows the data structure of digital contents operated by this software.

A digital content operated by this software includes plural pages. A public key for verification is assigned every type of operation applied to each page and a required availability license is different every feature of each page.

A digital content 3701 is divided into page data pieces 3702, 3703, and 3704. Each page data piece 3711 includes the information of a public key for verification 3712 assigned to the display of the page, the information of a public key for verification 3713 assigned to the editing of the same page, the information of a public key for verification 3714 assigned to the printing of the same page and the data of the page 3715. Further, the information 3721 of each public key for verification includes an identifier 3722 assigned to the public key for verification, the modulus 3723 of the public key for verification and a public key 3724 of the public key for verification.

For example, in the case a certain page is edited, it is checked whether a consumer owns a license corresponding to the public key for verification assigned to the editing of the page or not.

To prevent digital contents from being forged, a digital signature is added to digital contents operated by this software. The digital signature 3705 is attached to the last part of the digital contents 3701 and it can be checked using the digital signature whether the content is forged or not.

Figure 30:
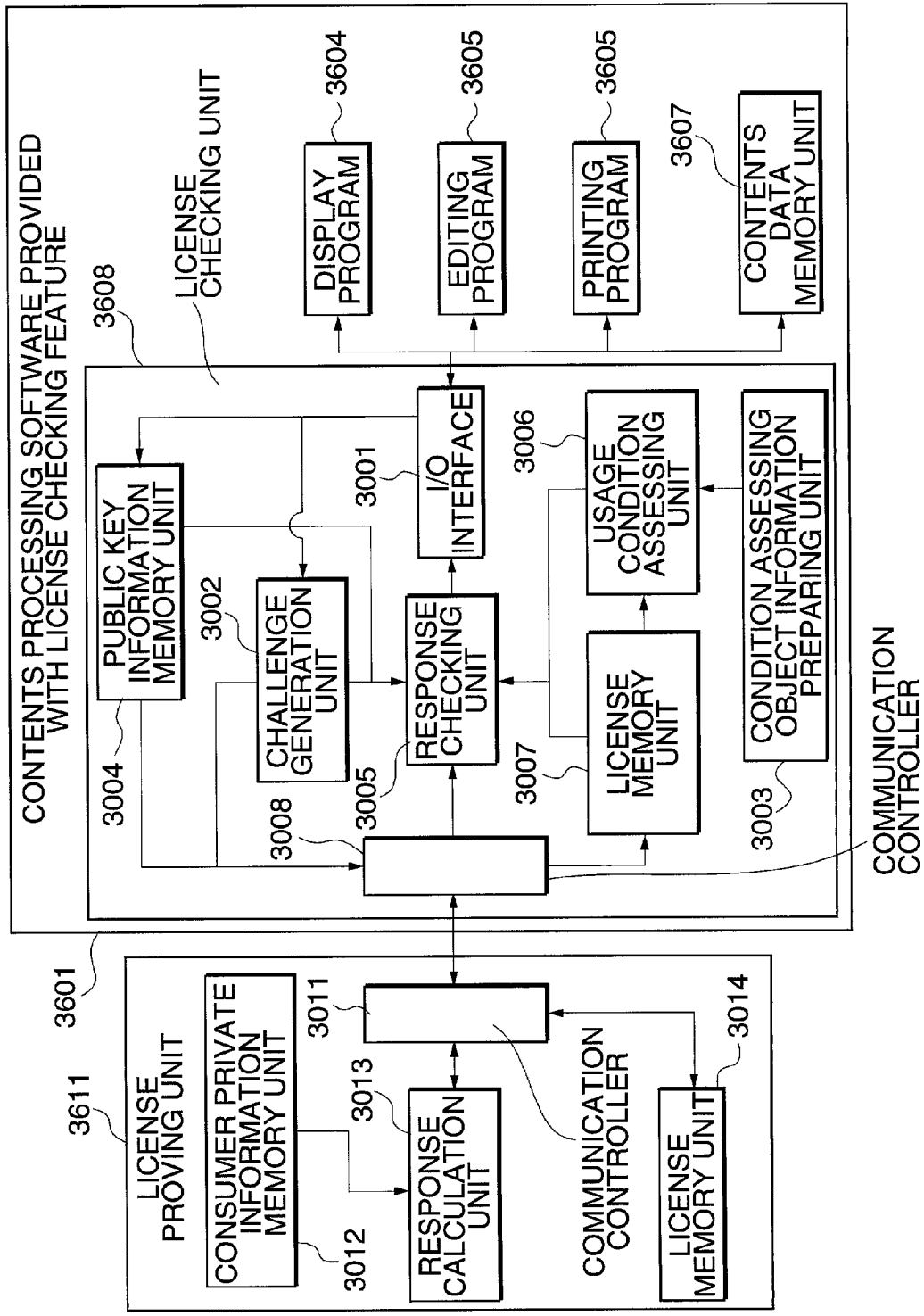
FIG. 30 shows an example of the internal configuration of contents processing software provided with the license checking feature and the license proving unit respectively to which the invention is applied.

FIG. 30 shows the internal configuration of the license checking unit 3608 of the software 3601 shown in FIG. 36 and the license proving unit 3611 for supplying information used for checking the legitimacy of a license to the software. The license checking unit 3608 sends a random number called a challenge to the license proving unit 3611, the license proving unit 3611 calculates a value called a response based upon the received challenge, outputs it and the legitimacy of a license stored in the license proving unit 3611 is verified by checking the legitimacy of the response by the license checking unit 3608.

The license checking unit 3608 includes an I/O interface 3001, a challenge generating unit 3002, a condition assessing object information preparing unit 3003, a public key information memory unit 3004, a response checking unit 3005, a usage condition assessing unit 3006, a license memory unit 3007 and a communication controller 3008.

The role of each unit of the license checking unit 3608 is as follows.

I/O interface 3001: Interface that receives input from the display program 3604, the editing program 3605 and the printing program 3606 and outputs the result of checking a license.

Challenge generating unit 3002: Generates a challenge sent to the license proving unit 3611.

Condition assessing object information preparing unit 3003: Generates information that should be assessed in the case a feature is executed only when an usage condition described in a license is satisfied.

Public key information memory unit 3004: Stores information related to a public key for verification used for checking a license.

Response checking unit 3005: Checks the legitimacy of a response generated by the license proving unit 3611.

Usage condition assessing unit 3006: Determines whether a usage condition described in a license is met or not.

License memory unit 3007: Stores a license extracted from the license proving unit 3611.

Communication controller 3008: Controls communication between the software and the license proving unit 3611.

The license proving unit 3611 includes a communication controller 3011, a consumer private information memory unit 3012, a response calculation unit 3013 and a license memory unit 3014.

The role of each unit of the license proving unit 3611 is as follows.

Communication controller 3011: Controls communication between the license proving unit and the license checking unit 3608.

Consumer private information memory unit 3012: Stores consumer private information.

Response calculation unit 3013: Calculates a response sent to the license checking unit 3608.

License memory unit 3014: Stores plural licenses.

Figure 31:
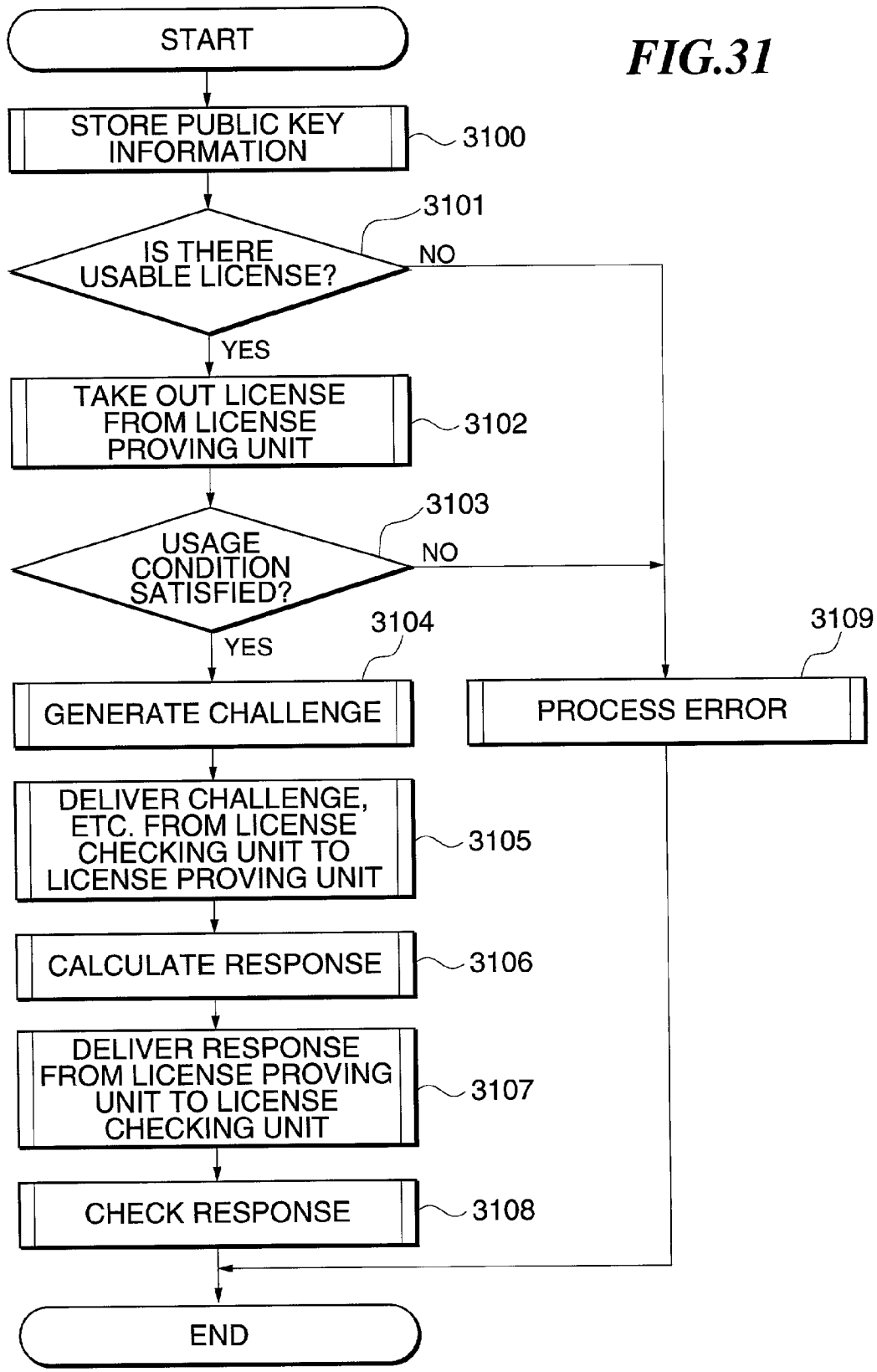
FIG. 31 is a flowchart showing the operation of the contents processing software provided with the license checking feature and the license proving unit when a license is verified.

FIG. 31 is a flowchart showing the operation of the license checking unit 3608 and the license proving unit 3611 when a license is verified. Referring to FIG. 31, the operation of the license checking unit 3608 and the license proving unit 3611 when a license is verified will be described below.

In the case the display, the editing or the printing of a page of a digital content shown in FIG. 37 is instructed by a user of software, the display program 3604, the editing program 3605 or the printing program 3606 calls the license checking unit 3608 to check a license. At that time, the display program 3604, the editing program 3605 or the printing program 3606 extracts the information of a public key for verification, which consists of a verification public key identifier ID, modulus n and a public key e, assigned to a feature to be executed of the page which is currently under operation from a digital content stored in the contents data memory unit 3607, and inputs the information to the license checking unit 3608 via the I/O interface 3001. The license checking unit 3608 starts the check of a license since the unit receives the input.

The license checking unit 3608 first stores the information of the public key for verification input via the I/O interface 3001 in the public key information memory unit 3004 (3100).

Next, the license checking unit 3608 accesses the license memory unit 3014 of the license proving unit 3611 via the communication controller 3008 and searches a license available to checking a license (3101). Of licenses stored in the license memory unit 3014, a license the value in the public key identifier field of which is coincident with the verification public key identifier stored in the public key storage 3004 is the desired license. In the case the corresponding license is not found, the check of a license ends in failure and after error processing (3109), the processing is terminated.

In the case the corresponding license is found, it is extracted and is stored in the license memory unit 3007 of the license checking unit 3608 (3102).

Next, it is determined in the usage condition assessing unit 3006 whether the usage condition 1 included in the license stored in the license memory unit 3007 is met or not (3103). To check the start and the end of an effective period of the license described in the usage condition 1, the usage condition assessing unit 3006 includes a clock. In the case condition assessing object information s generated in the conditions assessing object information preparing unit 3003 exists, it is also assessed whether the condition assessing object information s meets the usage condition 1 or not.

In the case it is judged in 3103 that the usage condition 1 is not met, the check of a license ends in failure and after error processing (3109), the processing is terminated.

In the case it is judged in 3103 that the usage condition 1 is met, a challenge C is generated in the challenge generating unit 3002 (3104). A challenge is a random number different every time check is done and the challenge generating unit 3002 includes a random number generation feature.

After a challenge is generated, the generated challenge C, the modulus n and the public key e respectively stored in the public key information memory unit 3004 and the usage condition 1 included in the license stored in the license memory unit 3007 are sent to the license proving unit 3611 via the communication controller 3008 (3105).

The license proving unit 3611 that receives the challenge calculates a response R in the response calculation unit 3013 (3106) and sends it to the license checking unit 3608 via the communication controller 3011 (3107). The response R is calculated according to the following expression (4) based upon the challenge C, the modulus n, the public key e and the usage condition 1 respectively input from the license checking unit 3608 via the communication controller 3011 and consumer private information u stored in the consumer private information memory unit 3013.

$$R = C^{f(n,e,u,l)} \bmod n \tag{4}$$

The license checking unit 3608 that receives the response R via the communication controller 3008 checks the legitimacy of the response R in the response checking unit 3005 (3108). In verification, the challenge C generated by the challenge generating unit 3002, the modulus n and the public key e respectively stored in the public key information memory unit 3004 and the certification value t included in the license stored in the license memory unit 3007 are used in addition to the response R. If the following expression (5) is met, verification is successful and if not, it is failure.

$$C \equiv (C^t R)^e \bmod n \tag{5}$$

As clear from the expressions (1), (4) and (5), only when the combination of modulus, a public key, a certification value, a usage condition and consumer private information is legitimate, the check of a response is successful. Attack such as the diversion of a license different in a public key for verification, the utilization of a license of another user and the forgery of a usage condition is difficult.

As described above, many conditions except an effective period of a license can be described in a usage condition 1. For example, an available frequency can be specified for the usage condition 1. In this case, a mechanism for storing the frequency of use is provided in the conditions assessing object information preparing unit 3003, the frequency is sent to the usage condition assessing unit 3006 as condition assessing object information s in the judgment of 3103 and has only to be compared with an available frequency described in the usage condition 1.

In work requiring a long time such as editing, even if the check of a license is successful when editing work is started, the effective period of the license may end during the editing work. In such a case, the check of the license is required to be performed every a few minutes. In the case it proves that the effective period of the license end, editing is disabled at that time.

In the case data 3715 included in a digital content is not encrypted, the data may be able to be accessed without the check of a license by extracting only data from a file of the digital content. To prevent such a situation, data 3715 has only to be encrypted. The data included in a digital content can be prevented from being leaked from a file by temporarily decoding and enabling executing various features only in the case the check of a license is successful.

Figure 38:
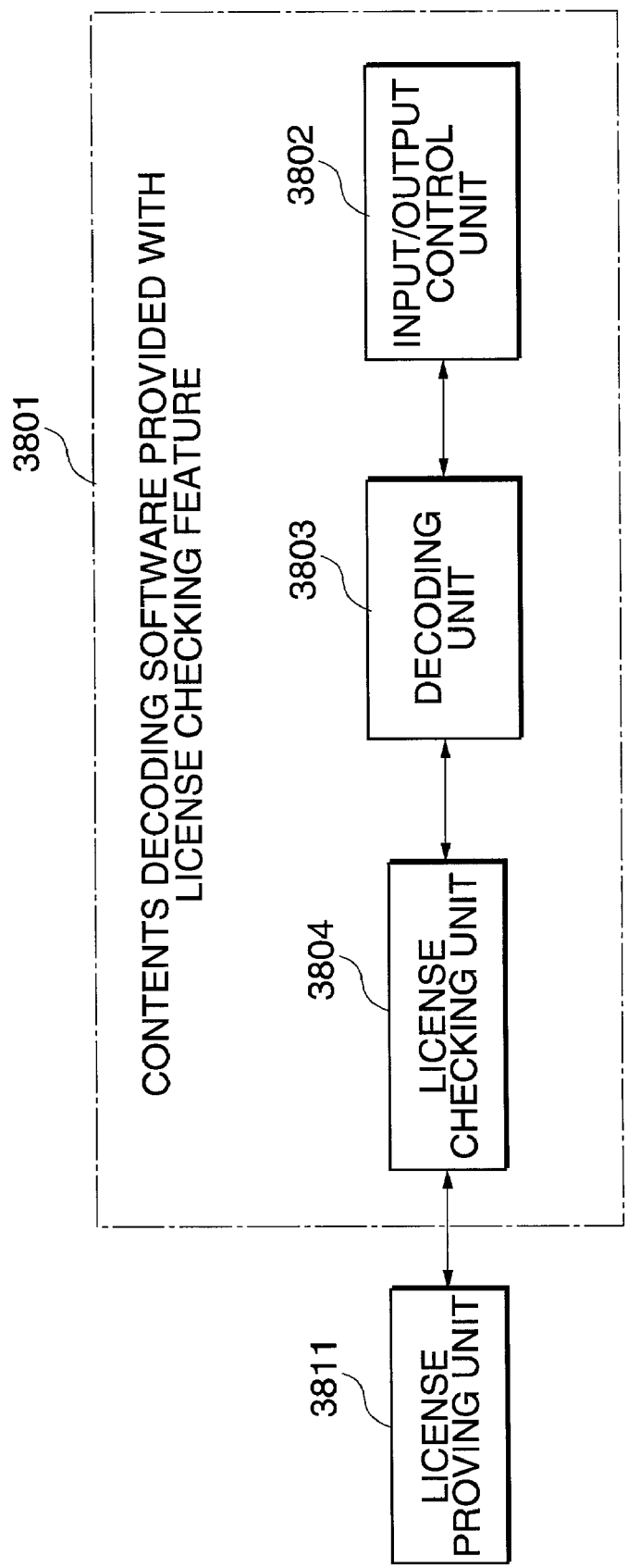
FIG. 38 shows an example of the configuration of the contents decrypting software provided with the license checking feature to which the invention is applied.

FIG. 38 shows software for decoding digital contents to which the invention is applied. This software decodes digital contents existing in an encrypted state such as a document, images, music and screen images and outputs them in an available format. A license is required to decode digital contents and in this software, before decoding, it is checked whether a user of this software owns a right availability license or not.

The software 3801 includes an input/output control unit 3802, a decoding unit 3803 and a license checking unit 3804.

The role of respective components is as follows.

Input/output control unit 3802: Controls input/output from/to a user.

Decoding unit 3803: Decodes encrypted digital contents.

License checking unit 3804: Is called from the decoding unit 3803 and checks whether a user owns the license that can decode digital contents or not.

Consumer private information and a license are stored in a computer where this software is run and a license proving unit 3811 that sends information required to check the legitimacy of the license to the license checking unit 3804 exists.

Figure 39:
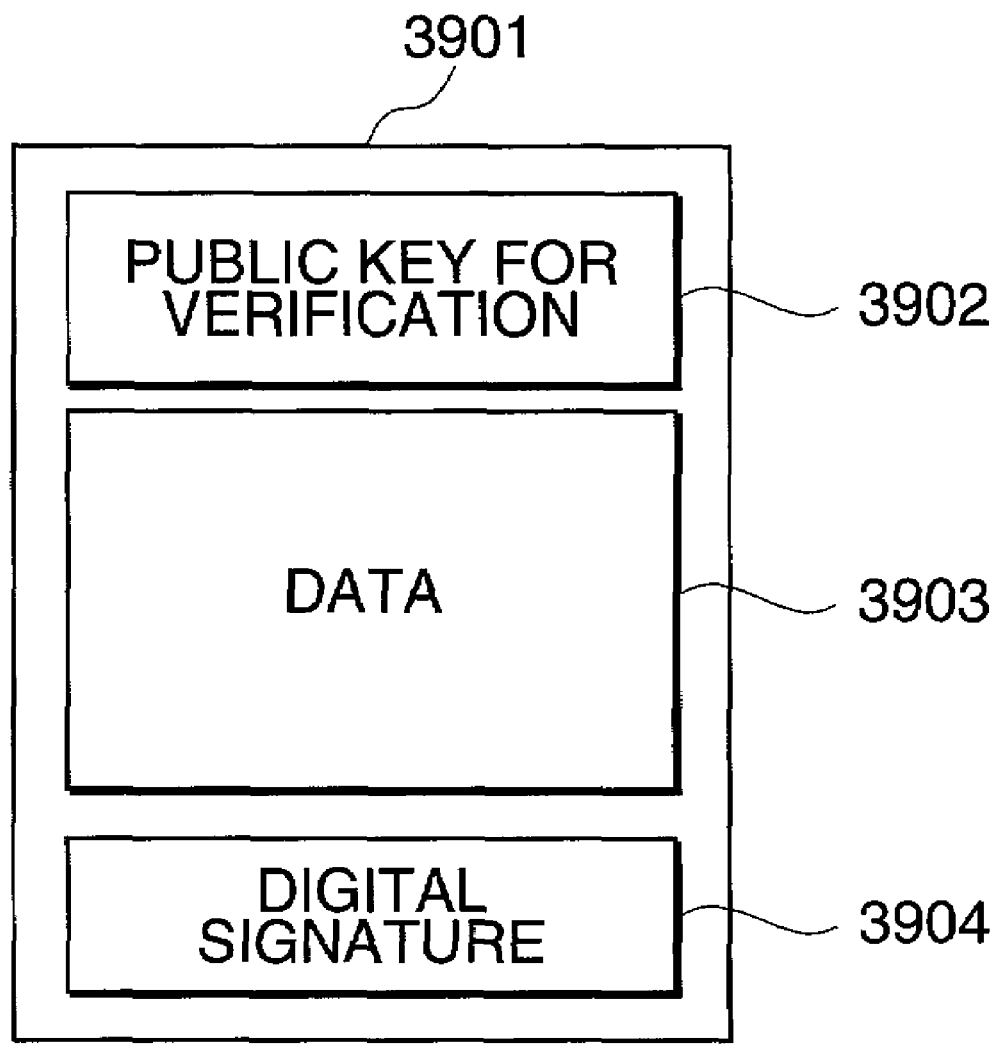
FIG. 39 shows the data structure of the digital contents decrypted by the contents decrypting software provided with the license checking feature to which the invention is applied.

FIG. 39 shows the data structure of a digital content decoded by this software.

Digital contents 3901 decoded by this software includes encrypted data 3903, the information 3902 of a public key for verification assigned to decoding the digital content and further, a digital signature 3904 applied to the data 3903 and the information 3902 of the public key for verification. The digital signature 3904 is applied to prevent the forgery of the digital content. It is attached to the last part of the digital content 3901 and it can be checked using it whether the digital contents 3901 is forged or not.

Figure 32:
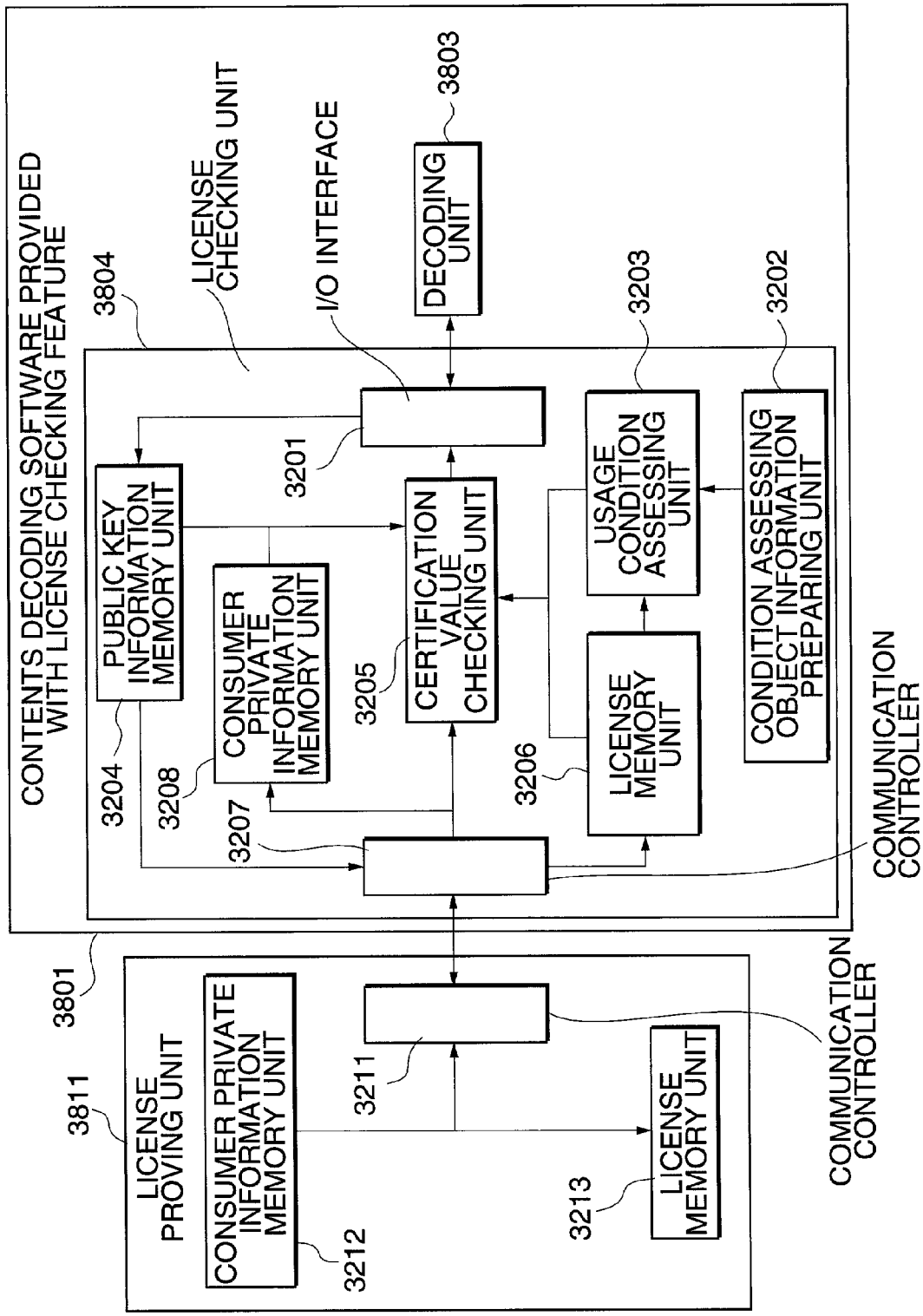
FIG. 32 shows an example of the internal configuration of contents decrypting software provided with the license checking feature and the license proving unit respectively to which the invention is applied.

FIG. 32 shows each internal configuration of the license checking unit 3804 of the software 3801 shown in FIG. 38 and the license proving unit 3811 that supplies information used for checking the legitimacy of a license to the software. The license checking unit 3804 extracts the license which the license proving unit 3811 stores and verifies the legitimacy.

The license checking unit 3804 includes an I/O interface 3201, a condition assessing object information preparing unit 3202, an usage condition assessing unit 3203, a public key information memory unit 3204, a certification value checking unit 3205, a license memory unit 3206, a communication controller 3207 and consumer private information memory unit 3208.

The role of each unit of the license checking unit 3804 is as follows.

I/O interface 3201: Interface that receives input from the decoding unit 3803 and outputs the result of the check of a license.

Condition assessing object information preparing unit 3202: Generates the information that should be assessed in the case a digital content are decoded only when the usage condition described in a license meets a specific condition.

Usage condition assessing unit 3203: Determines whether the usage condition described in a license is met or not.

Public key information memory unit 3204: Stores information related to a public key for verification used for checking a license.

Certification value checking unit 3205: Checks the legitimacy of a certification value described in a license.

License memory unit 3206: Stores a license extracted from the license proving unit 3811.

Communication controller 3207: Controls communication between the software and the license proving unit 3811.

Consumer private information memory unit 3208: Stores consumer private information extracted from the license proving unit 3811.

Also, the license proving unit 3811 includes a communication controller 3211, a consumer private information memory unit 3212 and a license memory unit 3213.

The role of each unit of the license proving unit 3811 is as follows.

Communication controller 3211: Controls the input/output of data between the license proving unit and the license checking unit 3804.

Consumer private information memory unit 3212: Stores consumer private information.

License memory unit 3213: Stores plural licenses.

Figure 33:
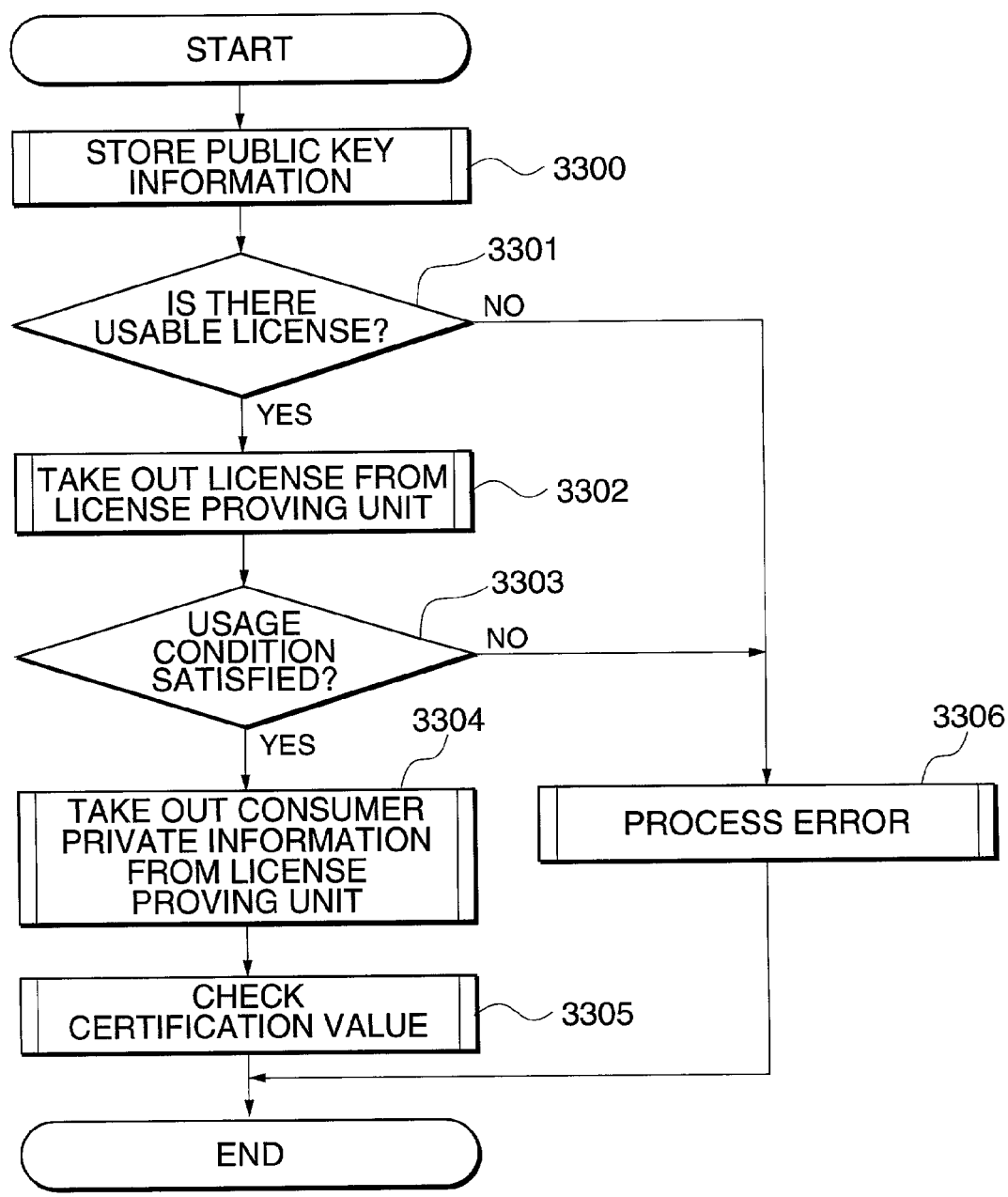
FIG. 33 is a flowchart showing the operation of the contents decrypting software provided with the license checking feature and the license proving unit when a license is verified.

FIG. 33 is a flowchart showing the operation of the license checking unit 3804 and the license proving unit 3811 in verifying a license. Referring to FIG. 33, the operation of the license checking unit 3804 and the license proving unit 3811 in checking a license will be described below.

In the case a user instructs to decode of the digital content shown in FIG. 39, the decoding unit 3803 calls the license checking unit 3804 to verify a license. At that time, the decoding unit 3803 extracts the information such as the verification public key identifier ID, the modulus n and the public key e of a public key for verification attached to the digital content and inputs it to the license checking unit 3804 via the I/O interface 3201. The license checking unit 3804 starts checking a license when the unit receives the input.

The license checking unit 3804 first stores the information input via the I/O interface 3201 in the public key information memory unit 3204 (3300). Next, the license memory unit 3213 of the license proving unit 3811 is accessed via the communication controller 3207 and a license available in checking a license by the license checking unit 3804 is searched of licenses stored in the license memory unit 3213 (3301). Of the licenses stored in the license memory unit 3211, the license the value in the public key identifier field of which is coincident with the verification public key identifier stored in the public key information memory unit 3204 is the desired license. In the case the corresponding license is not found, the check of a license ends in failure and after error processing (3306), the processing is terminated.

In the case the corresponding license is found, it is extracted and is stored in the license memory unit 3206 of the license checking unit 3804 (3302).

Next, it is determined in the usage condition assessing unit 3203 whether or not the usage condition 1 included in the license stored in the license memory unit 3206 is met (3303). To check the start and the end of an effective period of the license described in the usage condition 1, the usage condition assessing unit 3203 includes a clock. In the case condition assessing object information s generated in the condition assessing object information preparing unit 3202 exists, it is also assessed whether or not the condition assessing object information s meets the usage condition 1.

In the case the usage condition 1 is not met in 3303, the check of the license ends in failure and after error processing (3306), the processing is terminated.

In the case it is judged in 3303 that the usage condition 1 is met, the consumer private information memory unit 3212 of the license proving unit 3811 is accessed via the communication controller 3207, consumer private information u stored in the consumer private information memory unit 3212 is extracted and is stored in the consumer private information memory unit 3208 of the license checking unit 3804 (3304).

Finally, the legitimacy of the certification value t included in the license stored in the license memory unit 3206 is checked in the certification value checking unit 3205 (3305). For verification, the certification value checking unit 3205 generates a random number r and checks whether or not the following expression (6) is met based upon the modulus n and the public key e respectively stored in the public key information memory unit 3204, the usage condition 1 included in the license stored in the license memory unit 3206 and consumer private information u stored in the consumer private information memory unit 3208.

$$r \equiv (r^{t \cdot f(n,e,u,l)})^e \bmod n \tag{6}$$

As clear from the expressions (1) and (6), only when the combination of a modulus, a public key, a certification value, a usage condition and consumer private information is legitimate, the check of the certification value is successful. Attack such as the diversion of a license different in a public key for, the utilization of a license of another user and the forgery of an usage condition is difficult.

In the case a license is checked for decompression when compressed digital contents are decompressed, the similar configuration and operation to those of the software shown in FIG. 38 can also be utilized. The same configuration and operation can be utilized except that processing for compression and decompression is executed in place of processing for encryption and decoding.

As a consumer who has no license cannot use digital contents such as the software shown in FIG. 35 and the file shown in FIG. 37 or 39, he/she may also acquire digital contents themselves using any distribution path. Therefore, the provider of digital contents can distribute digital contents in various paths convenient for consumers. For example, digital contents may also be downloaded from a specific site in the Internet, are stored in CD-ROM and may also be distributed. Digital contents may also be broadcast in broadcasting by a satellite and the copy of digital contents may also be exchanged among friends.

—Issue of Verification Public Key Information—

Verification public key information is generated in the center in response to a request from a provider of digital contents and is transmitted to the provider. At the time of a request, data of a verification public key information request is transmitted/received. Normally, though the sender of this request is a provider of digital contents and the receiver of this request is the center, an entity other than the provider and the center may also be the sender and the receiver in the case another entity connected to the Internet requests in place of the provider and receives the request in place of the center.

The data structure of a verification public key information request is as follows.

Verification public key information request::={
  Sender Field
  Receiver field
  Date/time field
  Public key specification field
  Digital signature field
  Certificate field
}

Sender field: The identifier of the sender of a verification public key information request is described. The sender is normally a provider of digital contents, however, the sender may also be another entity connected to the Internet.

Receiver field: The identifier of the receiver of the verification public key information request is described. The receiver is normally the center, however, the receiver may also be another entity connected to the Internet.

Date/time field: The date/time when the verification public key information request is generated is described.

Public key specification field: A demand of the requester for a public key for verification is described. The identifier of the provider that uses the public key for verification generated by this request, public key cipher algorithm and the information of the length of the key of the public key for verification generated by this request can be described in this field.

Digital signature field: A digital signature for a verification public key information request by the sender is described.

Certificate field: A group of public key certificates including a public key for verifying the digital signature in the digital signature field of the verification public key information request is described.

The center which receives the verification public key information request generates a public key pair according to the specification of a public key described in the verification public key information request, generates verification public key information involving the public key of the generated public key pair and passes it to the requester. The center can determine whether the requested verification public key information should be generated or not or whether the center should generate a public key according to the specification of the specified public key or not.

When verification public key information is passed, data of verification public key information delivery is transmitted/received. Normally, though the sender of this data is the center that generates verification public key information and the receiver of this data is the provider that uses the issued verification public key information, an entity other than the center and the provider may also be the sender and the receiver in the case another entity connected to the Internet transmits verification public key information in place of the center and receives verification public key information in place of the provider.

The data structure of a verification public key information delivery is as follows.

Verification public key information delivery::={
  Sender field
  Receiver field
  Date/time field
  Verification public key information field
  Digital signature field
  Certificate field
}

Sender field: The identifier of the sender of the verification public key information delivery is described. Though the sender is normally the center, it may also be another entity connected to the Internet.

Receiver field: The identifier of the receiver of the verification public key information delivery is described. Though the receiver is normally a provider, it may also be another entity connected to the Internet.

Date/time field: The date/time when the verification public key information delivery is generated is described.

Verification public key information field: Verification public key information send by the verification public key information delivery is described.

Digital signature field: A digital signature added to the verification public key information delivery by the sender of the verification public key information delivery is described.

Certificate field: A group of public key certificates including a public key for verifying a digital signature in the digital signature field in the verification public key information delivery and in the digital signature field of verification public key information included in the verification public key information delivery is described.

—License Agreement—

In this embodiment, a provider of digital contents and a retailer of digital contents can independently exist. A retailer can sell various digital contents provided by various providers and a specific provider can also get many retailers to sell digital contents provided by the provider.

For a provider, it is basically advantageous to get many retailers to sell his digital contents, however, it may cause trouble to get an unreliable retailer to sell his own digital contents. Therefore, a provider is required to control retailers that can sell the provider's digital contents.

To enable the control, data called a license agreement is used in this embodiment.

A license agreement is digital data for certifying that a provider entrusts a specific retailer with selling the provider's specific digital contents, is generated in response to a request from a retailer and is transmitted to the retailer.

Hereinafter, a license agreement is called only an agreement.

The data structure of an agreement is as follows.

Agreement::={
  Issuer field
  Recipient field
  Date of issue/time field
  Agreement identifier field
  Start date/time of effective period
  End date/time of effective period
  Public key identifier field
  Usage condition limitation information field
  Digital signature field
}

Issuer field: The identifier of the provider that is the issuer of the agreement is described.

Recipient field: The identifier of the retailer that is the receiver of the agreement is described.

Date of issue/time field: The date of issue/time of the agreement is described.

Agreement identifier field: An identifier assigned to the agreement by the provider, who is the owner of the content that is agreed to be sold by this agreement, is described.

Start date/time of effective period: The start date/time of an effective period of the agreement is described.

End date/time of effective period: The end date/time of an effective period of the agreement is described.

Public key identifier field: A verification public key identifier assigned to a public key for verification is described. Issuance of the license for the public key for verification specified by this field is agreed by this agreement.

Usage condition limitation information field: Usage condition limitation information, which is information for limiting a range of a usage condition described in a license, is described.

Digital signature field: A digital signature for the whole agreement by the provider that is an issuer is described.

A provider can control a usage condition described in a license sold by a retailer by usage condition limitation information described in the usage condition limitation information field.

The data structure of usage condition limitation information is as follows.

Usage condition limitation information::={
  Minimum effective period field
  Maximum effective period field
  - - -
}

Minimum effective period field: The minimum limit of length between the start and the end of an effective period described in the usage condition field of a license corresponding to a public key for verification specified in the public key identifier field of the agreement is described. The length between the start and the end of the effective period described in the usage condition field of the license is required to be over a value described in the filed.

Maximum effective period field: The longest limit of length between the start and the end of an effective period described in the usage condition field of a license corresponding to a public key for verification specified in the public key identifier field of the agreement is described. The length between the start and the end of the effective period described in the usage condition field of the license is required to be a value described in the field or less.

Various limitations can also be described in usage condition limitation information according to digital contents related to a public key for verification specified in the public key identifier field of the agreement except the shortest effective period or the longest effective period.

For example, in the case the available frequency of digital contents is limited so that it is a specific frequency or less, the minimum available frequency and the maximum available frequency are described in usage condition limitation information and an available frequency in the range described in the usage condition limitation information is specified in the usage condition.

In the case the sum is specified in the usage condition to account or collect any charge when digital contents are used, a range of sum is described in the usage condition limitation information.

Further, in the case the feature is specified to allow only the use of specific one of features which a digital content have, specifiable features is described in the usage condition limitation information.

—Issue of Agreement—

An agreement is generated by a provider of digital contents in response to a request from a retailer of digital contents and is transmitted to the retailer. In the request, data called an agreement request is transmitted/received. Normally, though the sender of the request is the retailer that requests and the receiver of the request is the provider that receives the request, an entity other than the retailer and the provider may also be the sender or the receiver in the case another entity connected to the Internet requests in place of the retailer and receives a request in place of the provider.

The data structure of agreement request is as follows.

Agreement request::={
  Sender field
  Receiver field
  Date/time field
  Agreement specification field
  Digital signature field
  Certificate field
}

Sender field: The identifier of the sender that requests the agreement is described. The sender is normally a retailer of digital contents, however, it may also be another entity connected to the Internet.

Receiver field: The identifier of the receiver that receives a request for an agreement is described. The receiver is normally a provider of digital contents, however, it may also be another entity connected to the Internet.

Date/time field: The date/time when the agreement request is generated is described.

Agreement specification field: A specification for an agreement requested by the requester.

Digital signature field: A digital signature for the agreement request by the sender of the is described.

Certificate field: A group of public key certificates including a public key for verifying a digital signature in the digital signature field of the is described.

The data structure of a agreement specification described in the agreement specification field of a agreement request is as follows.

Agreement specification::={
  Issuer field
  Subject field
  Public key identifier field
  Desired usage condition limitation information field
}

Issuer field: The identifier of the provider, which should be the issuer of the requested agreement, is described.

Subject field: The identifier of the retailer allowed to sell licenses by the requested agreement is described.

Public key identifier field: A verification public key identifier assigned to a public key for verification is described. Selling the licenses corresponding to the public key specified in this field is allowed by the requested agreement.

Desired usage condition limitation information field: Usage condition limitation information to be described in the requested agreement is described.

A provider who receives a agreement request generates an agreement according to a specification described in the request and passes it to the sender. The provider can determine whether the requested agreement should be generated or not or whether an agreement should be generated according to the specification described in the request or not.

When the generated agreement is passed, data of an agreement delivery is transmitted/received. Normally, though the sender of an agreement delivery is a provider who generates the agreement involved in the agreement delivery and the receiver of an agreement delivery is the retailer which uses the agreement involved in the agreement delivery, an entity other than the provider and the retailer may also be the sender and the receiver in the case another entity connected to the Internet sends an agreement delivery in place of the provider and receives the agreement delivery in place of the retailer.

The data structure of an agreement delivery is as follows.

Agreement delivery::={
  Sender field
  Receiver field
  Date/time field
  Agreement field
  Digital signature field
  Certificate field
}

Sender field: The identifier of the sender of the agreement delivery is described. Though the sender is normally a provider of digital contents, it may also be another entity connected to the Internet.

Receiver field: The identifier of the receiver of the agreement delivery is described. Though the receiver is normally a retailer of digital contents, it may also be another entity connected to the Internet.

Date/time field: The date/time when the agreement delivery is generated is described.

Agreement field: An agreement send in the agreement delivery is described.

Digital signature field: A digital signature added to the agreement delivery by the sender of the agreement delivery is described.

Certificate field: A group of public key certificates including a public key for verifying a digital signature in the digital signature field of the agreement delivery and in the digital signature field of the agreement included in the agreement delivery is described.

—Issue of a License—

A license is issued according to a request from a consumer. A consumer sends the license request for requesting the license of a specific digital content on a specific usage condition to a retailer. The retailer who receives the license request normally generates an another license request to request the issue of a license to the consumer who is the requester of the license request the retailer received and sends it to the center. The center who receives the license request from the retailer generates a license for the consumer and passes it to the retailer. The retailer who receives the license sends the license to the consumer who is the requester of the license request the retailer received. Data called a license delivery is transmitted/received in sending the license from the center or the retailer.

Plural retailers can also mediate between a consumer and the center. In that case, a retailer who directly receives a request from the consumer sends second license request to a second retailer and the second retailer send third license request for to the center. An issued license may also be sent to the consumer on the reverse path and some retailers may also be skipped.

The data structure of a license request is as follows.

License request::={
  Sender field
  Receiver field
  Date/time field
  License specification field
  Digital signature field
  Certificate field
}

Sender field: The identifier of the sender of the license request is described.

Receiver field: The identifier of the receiver of the license request is described.

Date/time field: The date/time when the license request is generated is described.

License specification field: A field to describe demands for the requested license by this license request. Normally, the license specification, in which demands for a requested license is described, is described, however, in the case the receiver of the license request is a retailer and the retailer's own management number is assigned to the digital content sold by the retailer, the number may also be described.

Digital signature field: A digital signature for the license request by the sender of the request is described.

Certificate field: A group of public key certificates including a public key for verifying a digital signature in the digital signature field of the license request is described. If an agreement is included in the license request, the public key certificates including a public key for verifying a digital signature in the digital signature field of the agreement is involved in the group.

The data structure of a license specification described in the license specification filed of the license request is as follows.

License specification::={
  Public key identifier field
  Consumer identifier field
  Usage condition field
  Agreement field
}

Public key identifier field: A verification public key identifier assigned to a public key for verification that can verify the license requested in the license request is described.

Consumer identifier field: The identifier of a consumer who uses the license requested in a license request.

Usage condition field: The usage condition to be described in the license requested in a license request is described.

Agreement field: In the case the sender of a license request is a retailer, an agreement which certifies that the retailer can sell a license is described. The agreement described in this field should be corresponding to a public key for verification having an identifier specified in the public key identifier field of the license specification on an usage condition described in the usage condition field of the license specification.

The center determines whether or not the license having the usage condition described in the usage condition field of the license specification is issued. Particularly, the center does not issue a license for the request not allowed in the agreement included in the license specification.

Also, a retailer may also modify the usage condition field in the license specification in the process of a request for a license.

The data structure of a license delivery is as follows.

License delivery::={
  Sender field
  Receiver field
  Date/time field

License field
Digital signature field
Certificate field
}

Sender field: The identifier of the sender of the license delivery is described.

Receiver field: The identifier of the receiver of the license delivery is described.

Date/time field: The date/time when the license delivery is generated is described.

License field: The license sent in the license delivery is described.

Digital signature field: A digital signature for the license delivery by the sender of the license delivery is described.

Certificate field: A group of public key certificates including a public key for verifying a digital signature in the digital signature field of the license delivery and in the digital signature field of the license included in the license delivery is described.

—Configuration of Center—

The center in this embodiment has a feature for processing a verification public key information request and a license request respectively input via the Internet, a feature for generating the history of the issuance of license and sending it to a provider or a retailer via the Internet and a feature for generating the history of the issuance of verification public key information and sending it to a provider via the Internet.

Figure 2:
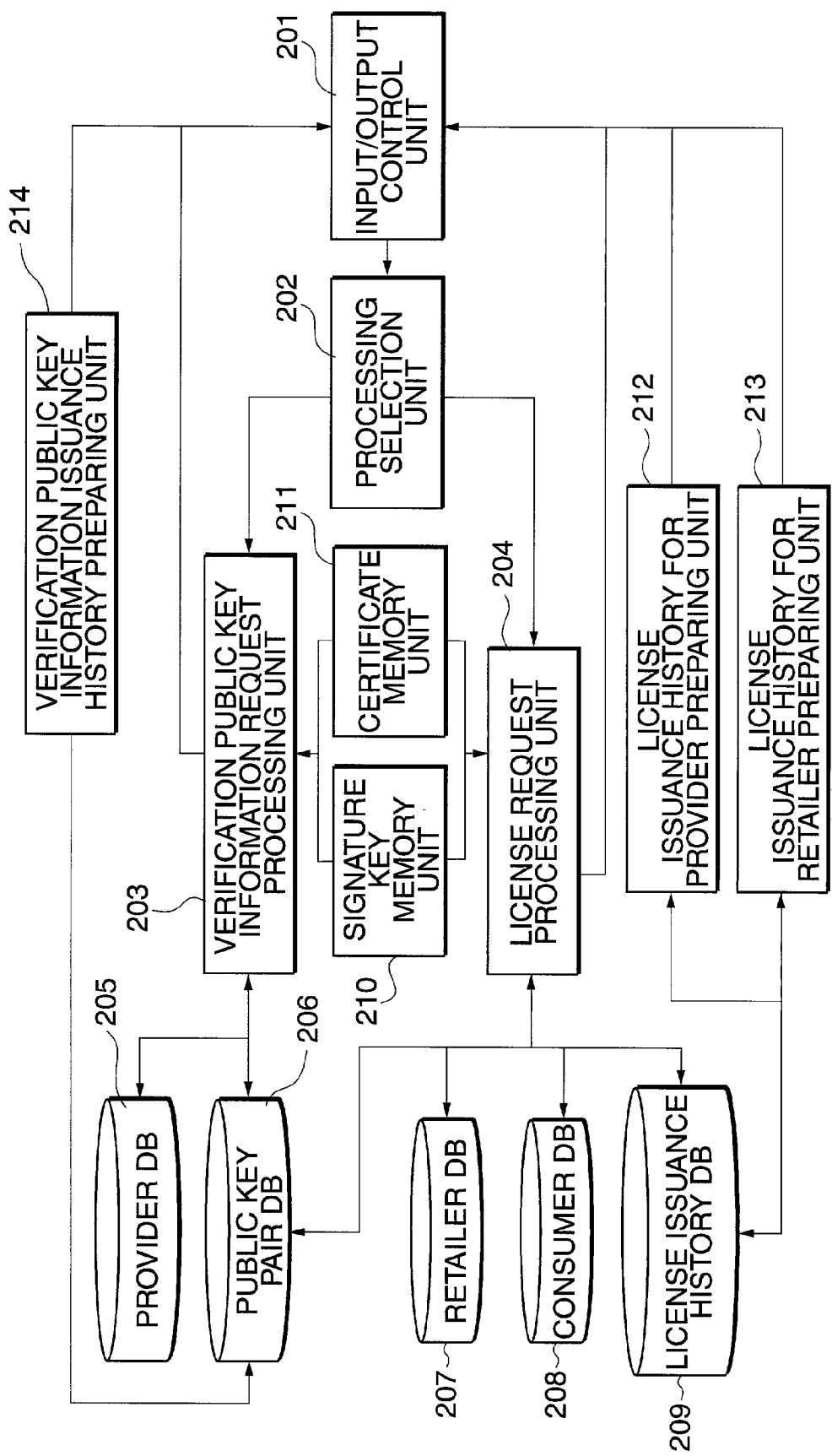
FIG. 2 is a block diagram showing a center to which the invention is applied.

FIG. 2 is a block diagram showing the center in this embodiment.

The center includes an input/output control unit 201, a processing selection unit 202, a verification public key information request processing unit 203, a license request processing unit 204, a provider DB 205, a public key pair DB 206, a retailer DB 207, a consumer DB 208, a license issuance history DB 209, a signature key memory unit 210, a certificate memory unit 211, a license issuance history for provider preparing unit 212, a license issuance history for retailer preparing unit 213 and a verification public key information issuance history preparing unit 214, and is connected to the Internet via the input/output control unit 201.

The role of each unit of the center in this embodiment is as follows.

Input/output control unit 201: Accepts the input of data via the Internet and outputs data generated by the verification public key information request processing unit 203 and data generated by the license request processing unit 204 via the Internet. For inputting from the Internet to the input/output control unit 201 or outputting from the input/output control unit 201 to the Internet, a WWW site connected to the input/output control unit 201 can be used. A provider and a retailer is allowed to access to the site for requesting verification public key information or licenses. Connecting an electronic mail system and the input/output control unit 201 automatically or manually can be used as another method.

Processing selection unit 202: Judges whether input data is a verification public key information request or a license request, calls the verification public key information request processing unit 203 in the case of the verification public key information request and calls the license request processing unit 204 in the case of the license request.

Verification public key information request processing unit 203: Processes a verification public key information request, generates a verification public key information request delivery and sends it to the requester of the request via the input/output control unit 201. In the process of generating the verification public key information request delivery, this unit refers to the provider DB 205 and adds a new entry to the public key pair DB 206.

License request processing unit 204: Processes a license request, generates a license request delivery and sends it to the requester of the request via the input/output control unit 201. In the process of generating the license request delivery, this unit refers to the public key pair DB 206, the retailer DB 207 and the consumer DB 208 and adds a new entry to the license issuance history DB 209.

Provider DB 205: A database for storing data related to a provider.

Public key pair DB 206: A database for storing information related to a public key pair used for generating a license.

Retailer DB 207: A database for storing data related to a retailer.

Consumer DB 208: A database for storing data related to a consumer.

License issuance history DB 209: A database for storing data related the history of the issuance of a license.

Signature key memory unit 210: Stores a signature key used for a digital signature by the center.

Certificate memory unit 211: Stores a public key certificate including a verification key that is for the verification of a digital signature generated based upon a signature key stored in the signature key memory unit 210.

License issuance history for provider preparing unit 212: Generates the history of the issuance of a license for every provider and sends it to the provider via the input/output control unit 201.

License issuance history for retailer preparing unit 213: Generates the history of the issuance of a license for every retailer and sends it to the retailer via the input/output control unit 201.

Verification public key information issuance history preparing unit 214: Generates the history of the issuance of verification public key information for every provider and sends it to the provider via the input/output control unit 201.

—Database Center Owns—

The center owns five databases of the provider DB 205, the public key pair DB 206, the retailer DB 207, the consumer DB 208 and the license issuance history DB 209.

The provider DB 205 is a database that stores information related to an entity that the center approves as a provider.

FIG. 6 shows the structure of the provider DB 205. The provider DB 205 is a table having the following single attribute.

Provider identifier attribute: The identifier of an entity approved by the center as a provider.

The center does not approve an entity other than providers registered in this database as a provider. Therefore, the center neither issues verification public key information to such an entity and nor issues a license to digital contents provided by such an entity.

In the case the center wants to increase entities that the center approves as a provider, it adds a new entry to this database.

The public key pair DB 206 stores a public key for verification issued to a provider and the private key corresponding to the public key. In this embodiment, RSA is used for public key cipher algorithm for a public key for verification and a private key. Therefore, the public key pair DB 206 is a database for storing a public key pair according to RSA.

FIG. 7 shows the structure of the public key pair DB 206. The public key pair DB 206 is a table having the following seven attributes and each entry is information related to one public key pair.

Public key identifier attribute: Verification public key identifier assigned to a public key pair of this entry.

Modulus attribute: Modulus according to RSA.

Private key attribute: Private key according to RSA.

Provider identifier attribute: The identifier of the provider to which the verification public key information including the public key described in this entry is issued.

Start of effective period attribute: The date/time when the effective period of the verification public key information including the public key described in this entry is started.

End of effective period attribute: The date/time when the effective period of the verification public key information including the public key described in this entry ends.

Date of issue attribute: The date/time of issue of the verification public key information including the public key described in this entry.

The retailer DB 207 is a database that stores information related to the entity that the center approves as a retailer.

FIG. 8 shows the structure of the retailer DB 207. The retailer DB 207 is a table having the following single attribute.

Retailer identifier attribute: The identifier of the entity that the center approves as a retailer.

The center does not approve an entity other than retailers registered in this database as a retailer. Therefore, the center never issues a license in response to a license request from such an entity.

In the case the center wants to increase entities approved as a retailer, it adds a new entry to this database.

The consumer DB 208 is a database that stores information related to the entity that the center approves as a consumer.

FIG. 9 shows the structure of the consumer DB 208. The consumer DB 208 is a table having the following two attributes.

Consumer identifier attribute: The identifier of a consumer approved by the center.

Consumer private information attribute: Consumer private information corresponding to the consumer specified in the consumer identifier attribute.

The license issuance history DB 209 is a database that stores information related to licenses which the center has issued.

FIG. 10 shows the structure of the license issuance history DB 209. The license issuance history DB 209 is a table having the following six attributes and each entry includes information related to one license.

Public key identifier attribute: The identifier of a public key for verification assigned to the public key for verification that can verify the license described in this entry.

Provider identifier attribute: The identifier of the provider to which the verification public key information including the public key for verification specified in the public key identifier attribute in this entry is issued.

Consumer identifier attribute: The identifier of the consumer to whom the use of digital contents is permitted by the license described in this entry.

Intermediary identifier attribute: The identifier of the retailer that requests the issuance of the license described in this entry.

Usage condition attribute: A result of encoding an usage condition involved in the license described in this entry according to a basic encoding rule (BER, ITU-T recommendation X.690).

Date of issue attribute: The date/time when the license described in this entry is issued.

Figure 3:
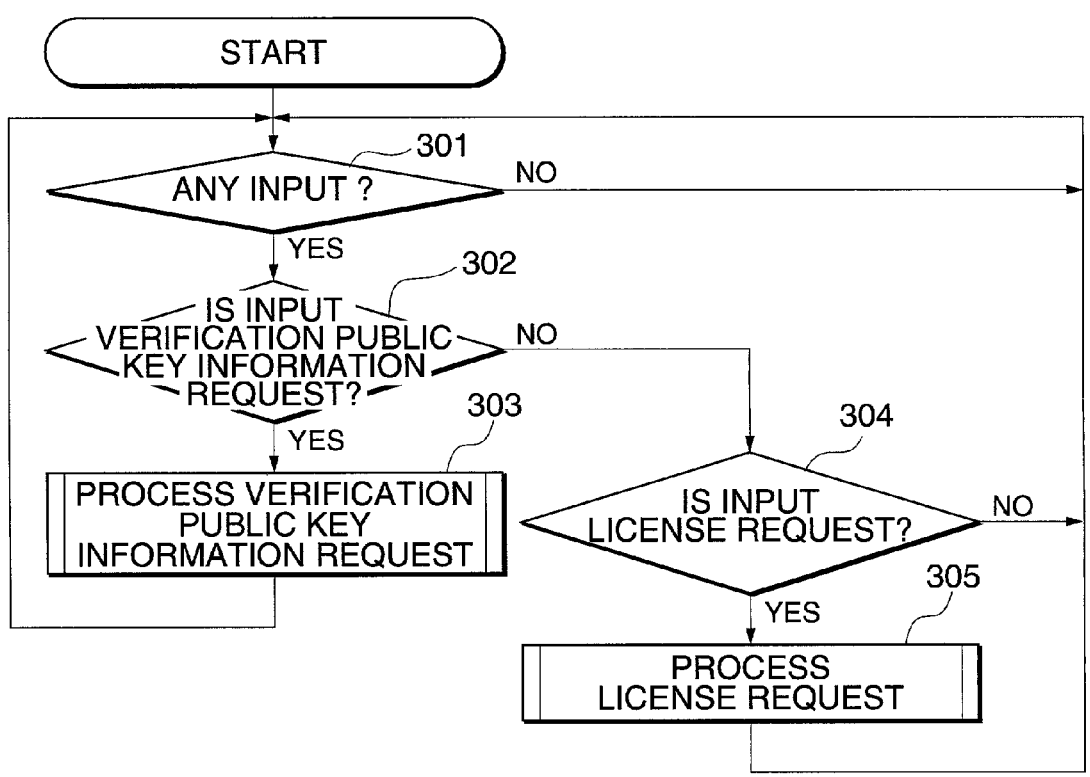
FIG. 3 is a flowchart showing the operation of the center to which the invention is applied.

FIG. 3 is a flowchart showing the operation of the center in this embodiment. Referring to the flowchart shown in FIG. 3, the operation of the center in this embodiment will be described below.

As shown in FIG. 3, the center in this embodiment executes an endless process. Usually the center waits for the input of data. When any data is input, the center executes processing according to the input, and returns to wait next input.

First, the input/output control unit 201 checks whether any data is input or not (301). In the case no data is input, the check of input (301) is performed again.

When it proves in the check of input (301) that any data is input, the processing selection unit 202 judges whether the input is a verification public key information request or not (302). In the case the input is a verification public key information request, the verification public key information request processing unit 203 is called and the verification public key information request is processed (303). When the processing of the verification public key information request is finished, the center returns to the check of input again (301).

In the judgment in 302, in the case the input is not the verification public key information request, the processing selection unit 202 judges whether the input is a license request or not (304). In the case the input is a license request, the license request processing unit 204 is called and the license request is processed (305). When the processing of the license request is finished, the center returns to the check of input (301) again.

Also, in the judgment in 304, in the case the input is not the license request, the center returns to the check of input (301) again.

—Verification Public Key Information Request Processing Unit—

Figure 4:
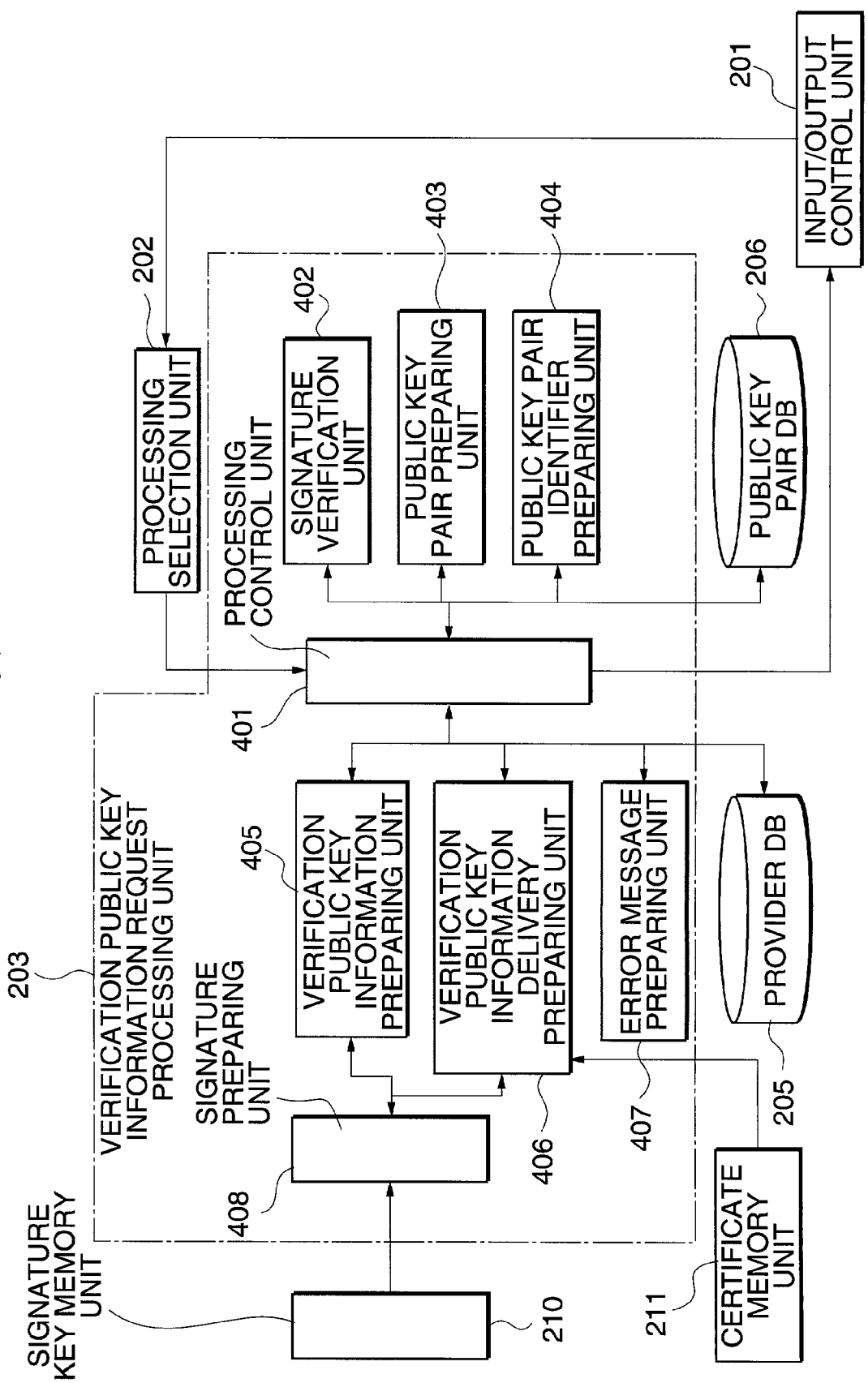
FIG. 4 shows the internal configuration of a verification public key information request processing unit that the center to which the invention is applied has.

FIG. 4 shows the internal configuration of the verification public key information request processing unit 203 which the center in this embodiment has.

The verification public key information request processing unit 203 has a feature for processing a verification public key information request. This unit includes a processing control unit 401, a signature verification unit 402, a public key pair preparing unit 403, a public key pair identifier preparing unit 404, a verification public key information preparing unit 405, a verification public key information delivery preparing unit 406, an error message preparing unit 407 and a signature preparing unit 408.

The role of each unit included in the verification public key information request processing unit 203 is as follows.

Processing control unit 401: This unit has the features for input from the processing selection unit 202, output to the input/output control unit 201, referring to the provider DB 205 and the addition of entry to the public key pair DB 206.

This unit controls the whole processing of a verification public key information request.

Signature verification unit 402: Verifies a digital signature of a verification public key information request input from the processing selection unit 202.

Public key pair preparing unit 403: Generates a public key pair used for generating a public key for verification and a license.

Public key pair identifier preparing unit 404: Generates a verification public key identifier assigned to a public key for verification. The unit is devised so that generated identifier is unique by extracting a bit string at random from sufficiently large space.

Verification public key information preparing unit 405: Generates verification public key information. This unit calls the signature preparing unit 408 to attach a digital signature to the verification public key information.

Verification public key information delivery preparing unit 406: Generates a verification public key information delivery. This unit calls the signature preparing unit 408 to attach a digital signature to the verification public key information delivery. Further, accesses the certificate memory unit 211 to acquire the public key certificate including the verification key for the signature of the center.

Error message preparing unit 407: Generates an error message.

Signature preparing unit 408: Generates a digital signature for verification public key information and a verification public key information delivery. Accesses to the signature key memory unit 210 to acquire a signature key for a digital signature.

Figure 5:
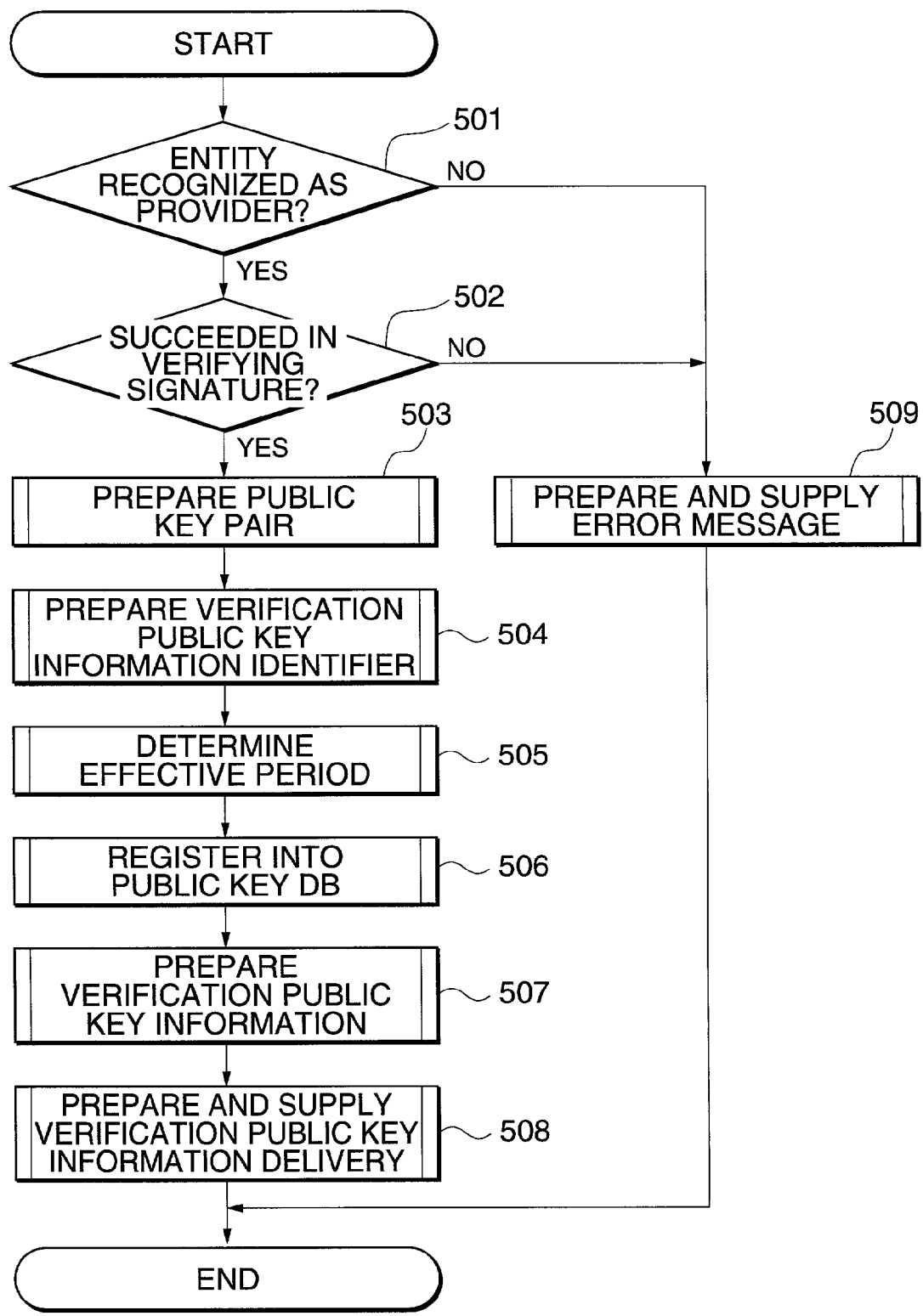
FIG. 5 is a flowchart showing the operation of a processing control unit of the verification public key information request processing unit that the center to which the invention is applied has.

FIG. 5 is a flowchart showing the operation of the processing control unit 401 in the verification public key information request processing unit 203 which the center in this embodiment has. Referring to FIG. 5, the operation of the processing control unit 401 will be described below.

First, the identifier of the provider which is included in the public key specification field of a verification public key information request input from the processing selection unit 202 is extracted. The identifier is checked referring to the provider DB 205 whether the center approves an entity having the identifier as a provider or not (501). In the case an entry having the identifier exists in the provider DB 205, it proves that the entity is an entity approved as a provider.

In the case it proves in the judgment in 501 that the entity is an entity not approved as a provider, an error message is generated in the error message preparing unit 407 and after it is output to the input/output control unit 201 (509), the processing is finished.

In the case that it proves in the judgment in 501 that the entity is approved as a provider, the digital signature of the verification public key information request is verified (502). For a verification key, the one attached to the certificate field of the verification public key information request is used, however, in the case a required public key certificate does not exist in the certificate field, the signature is verified after the public key certificate is acquired from CA 108.

In the case the signature is not verified, an error message is generated in the error message preparing unit 407 and after it is output to the input/output control unit 201 (509), the processing is finished.

In the case the signature is verified, the processing control unit calls the public key pair preparing unit 403 for generating a public key pair according to RSA and receives the generated modulus, public key and private key (503). Further, the processing control unit calls the public key pair identifier preparing unit 404 for generating the identifier to be assigned to verification public key information and receives the generated identifier (504).

Next, after the processing control unit suitably determines the start date and the end date of the effective period of verification public key information (505), it adds a new entry to the public key pair DB (506). The following value is set to each attribute of the new entry.

Public key identifier attribute: An identifier generated in 504.

Modulus attribute: Modulus according to RSA generated in 503.

Public key attribute: A public key according to RSA generated in 503.

Private key attribute: A private key according to RSA generated in 503.

Provider identifier attribute: The identifier of a provider, which is the user of the requested public key for verification, included in the public key specification field of the verification public key information request.

Start of effective period attribute: The start date/time of the effective period generated in 505.

End of effective period attribute: The end date/time of the effective period generated in 505.

Date of issue attribute: A current date.

Next, the processing control unit calls the verification public key information preparing unit (405) for generating verification public key information and receives the result (507). The following value is set to each field of the verification public key information.

Issuer field: The identifier of the center.

Recipient field: The identifier of the provider, which is a user of a requested public key for verification, included in the public key specification field of the verification public key information request.

Date of issue/time field: The current time.

Start date/time of effective period: The start date/time of the effective period generated in 505.

End date/time of effective period: The end date/time of the effective period generated in 505.

Verification public key identifier field: An identifier generated in 504.

Public key information field: The modulus, the public key and the private key respectively generated in 503.

Digital signature field: The digital signature for data in fields included in the verification public key information except this field. In order to generate the signature, this unit calls the signature preparing unit 408, receives the signature and sets it in the field.

Finally, the processing control unit calls the verification public key information delivery preparing unit 406 for generating a verification public key information. The processing control unit which receives the generated verification public key information delivery from the verification public key information delivery preparing unit sends the result to the input/output control unit 201 (508), and finishes processing of the verification public key information request. The following values are set in each field of the verification public key information delivery.

Sender field: The identifier of the center.

Receiver field: An identifier described in the sender field of the verification public key information request.

Date/time field: The current time.

Verification public key information field: The verification public key information generated in 507.

Digital signature field: The digital signature for data in the field other than this field and a certificate field in this verification public key information delivery. In order to generate a digital signature, the verification public key information delivery preparing unit calls the signature preparing unit 408, receives a signature value of the result and sets it in this field.

Certificate field: A public key certificate stored in the certificate memory unit 211.

—License Request Processing Unit—

Figure 11:
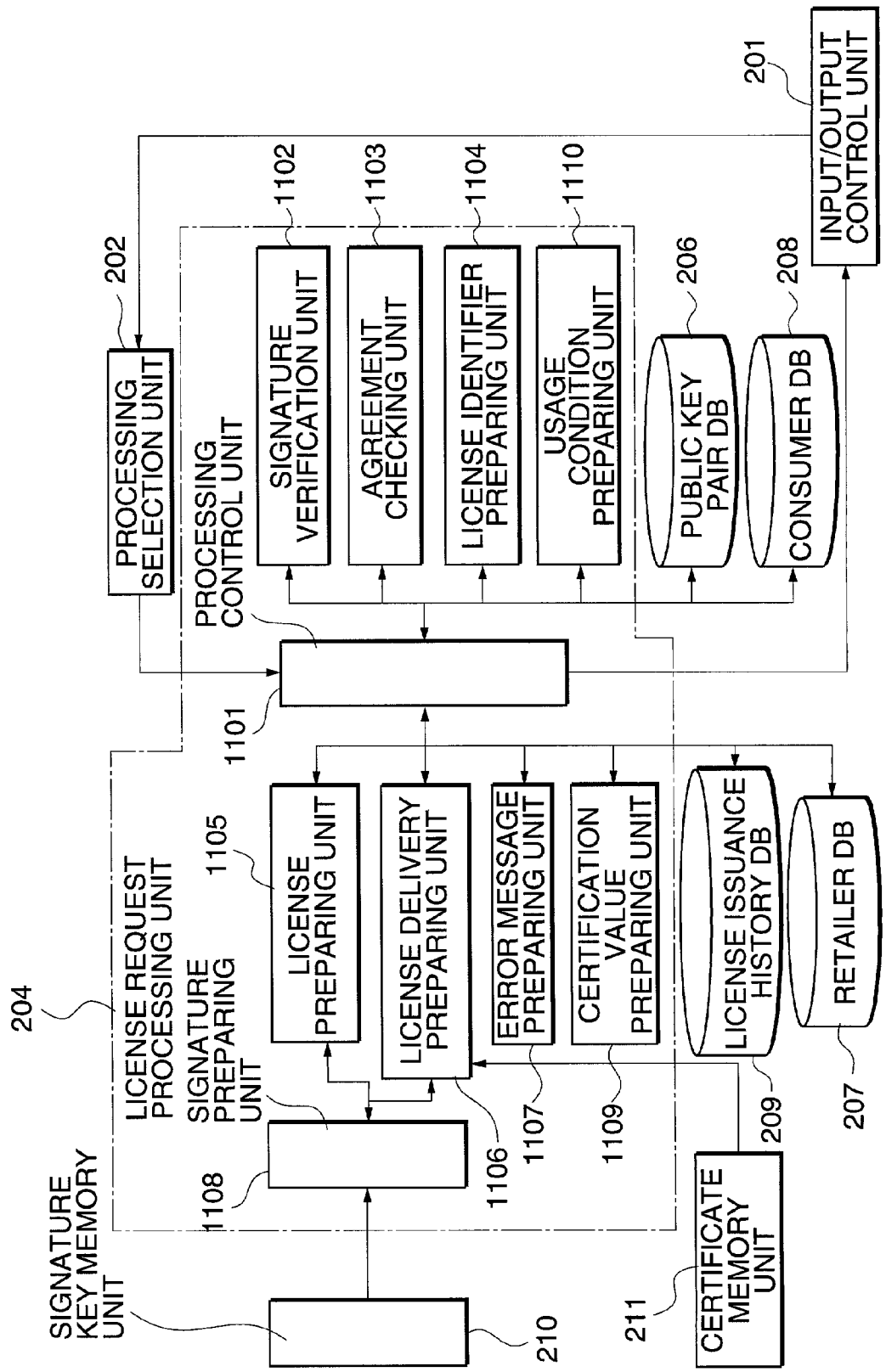
FIG. 11 shows the internal configuration of a license request processing unit that the center to which the invention is applied has.

FIG. 11 shows the internal configuration of the license request processing unit 204 which the center in this embodiment has.

The license request processing unit 204 has a feature for processing a license request. This unit includes a processing control unit 1101, a signature verification unit 1102, an agreement checking unit 1103, a license identifier preparing unit 1104, a license preparing unit 1105, a license delivery preparing unit 1106, an error message preparing unit 1107, a signature preparing unit 1108, a certification value preparing unit 1109 and a usage condition preparing unit 1110.

The role of each unit included in the license request processing unit 204 is as follows.

Processing control unit 1101: This unit has features for input from the processing selection unit 202, output to the input/output control unit 201, referring to the public key pair DB 206, the retailer DB 207 and the consumer DB 208 and adding a new entry to the license issuance history DB 209 and controls the whole processing of a license request.

Signature verification unit 1102: Verifies the digital signature for a the license request input from the processing selection unit 202 and the agreement included in the license request.

Agreement checking unit 1103: Checks whether or not the selling of the license requested in the license request input from the processing selection unit 202 is allowed by the agreement included in the a license request.

License identifier preparing unit 1104: Generates the license identifier assigned to the license requested by the license request. The unit is devised so that generated identifier is unique by extracting a bit string at random from sufficiently large space.

License preparing unit 1105: Generates the license requested by the license request. To attach a digital signature to the license, this unit calls the signature preparing unit 1108.

License delivery preparing unit 1106: Generates the license delivery involving the license requested by the license request. In order to attach a digital signature to the license delivery, this unit calls the signature preparing unit 1108. Further, in order to acquire the public key certificate of the verification key for the signature of the center, this unit accesses the certificate memory unit 211.

Error message preparing unit 1107: Generates an error message.

Signature preparing unit 1108: Generates a digital signature for a license and a license delivery. In order to acquire a signature key for a digital signature, this unit accesses the signature storage 210.

Certification value preparing unit 1109: Generates the certification value included in the license requested by the license request.

Usage condition preparing unit 1110: Generates the usage condition included in the license requested by the license request.

Figure 12:
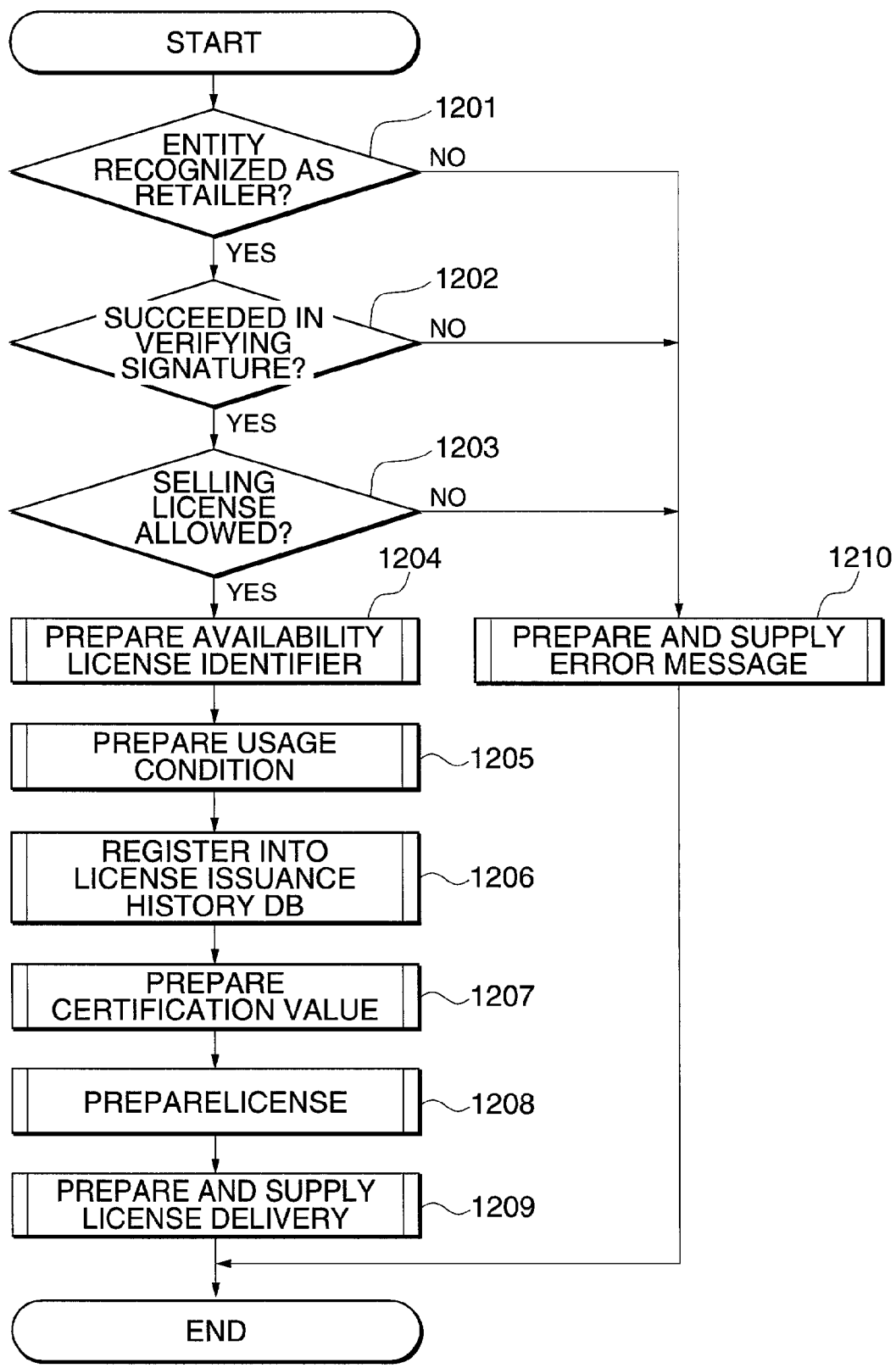
FIG. 12 is a flowchart showing the operation of a processing control unit of the license request processing unit that the center to which the invention is applied has.

FIG. 12 is a flowchart showing the operation of the processing control unit 1101 of the license request processing unit 204 that the center in this embodiment has. Referring to FIG. 12, the operation of the processing control unit 1101 will be described below.

First, the processing control unit extracts the identifier described in the sender field of the license request input from the processing selection unit 202 checks referring to the retailer DB 207 whether the center approves the entity specified by the extracted identifier as a retailer or not (1201). In the case the entry having the identifier exists in the retailer DB 207, it proves that the entity is approved as a retailer.

In the case it proves in the judgment in 1201 that the entity specified by the identifier is not approved as a retailer, an error message is generated in the error message preparing unit 1107. The processing control unit outputs the generated error message to the input/output control unit 201 (1210) and ends this process.

In the case it proves in the judgment in 1201 that the entity specified by the identifier is approved as a retailer, the digital signature of the license request and the digital signature of the agreement included in the license request are verified (1202). For a verification key, the one included in the public key certificate attached to the certificate field of the license request is used. In the case the required public key certificate does not exist in the certificate field, a signature is verified after the required public key certificate is acquired from CA 108.

In the case the signature is not verified, an error message is generated in the error message preparing unit 1107. The processing control unit outputs the generated error message to the input/output control unit 201 (1210) and ends this process.

In the case the signature is verified, it is checked whether or not the selling the license requested by the license request is allowed by the agreement included in the license request (1203). More concretely, the license specification included in the license specification field of the license request is sent to the agreement checking unit 1103. The agreement checking unit checks whether the selling a license corresponding to the public key for verification, which is specified in the public key identifier field of the license specification, on the usage condition described in the usage condition field of the license specification. And, the agreement checking unit checks is allowed by the agreement included in the agreement field of the license or not.

In the case it proves in 1203 that the issuance is not allowed, an error message is generated in the error message preparing unit 1107. The processing control unit outputs the generated error message to the input/output control unit 201 (1210) and ends this process.

In the case it proves in 1203 that the issuance is allowed, The processing control unit calls the license identifier preparing unit 1104 for generating the identifier assigned to the license and receives the generated identifier (1204), the usage conditions preparing unit 1110 is called and an usage condition to be described in the license is determined (1205). A license generated by the usage conditions preparing unit may be a value in the usage condition field of the specification of the license included in the license particulars field of the request for the license as it is or the value in the usage condition field may be suitably modified in a range allowed by the agreement included in the agreement field of the specification of the license.

After the usage condition is generated, a new entry is added to the license issuance history DB 209 (1206). The following values are set to each attribute of the new entry.

Public key identifier attribute: A value in the public key identifier field of the license specification included in the license specification field of the license request.

Provider identifier attribute: The identifier of the provider who is issued the public key for verification corresponding to the requested license is described. For getting this identifier, the processing control unit accesses the public key pair DB, and extracts the identifier described in the provider identifier attribute of the entry the public key identifier attribute of which is the same value as the public key identifier field of the license specification.

Consumer identifier attribute: A value in the consumer identifier field of the license specification.

Intermediary identifier attribute: A value in the sender field of the license request.

Usage condition attribute: The usage condition generated by the usage conditions preparing unit in 1205.

Date of issue attribute: A current date.

Next, the processing control unit calls the certification value preparing unit 1109 for generating a certification (1207). Further, the processing control unit calls the license preparing unit 1105 for generating a license (1208). The following values are each set to each field of the license.

Issuer field: The identifier of the center.

Recipient field: the value in the consumer identifier field of the license specification included in the license specification filed of the license request.

Date of issue/time field: The value of the date of issue attribute of the entry added to the license issuance history DB 209 in 1206.

License identifier field: The identifier generated in 1204.

Public key identifier field: The value in the public key identifier field of the license specification included in the license specification field of the license request.

Usage condition field: The usage condition generated by the usage condition preparing unit in 1205.

Certification value field: The certification value generated in 1207.

Digital signature field: The digital signature for this license. To generate a digital signature, the processing control unit calls the signature preparing unit 1108.

Finally, the processing control unit calls the license delivery preparing unit 1106 for generating a license delivery. The processing control unit outputs the result from the license delivery preparing unit to the input/output control unit 201 (1209), and ends this process. The following values are each set in each field of the license delivery.

Sender field: The identifier of the center.

Receiver field: The value in the sender field of the license request.

Date/time field: The current point of time.

License field: The license generated in 1208.

Digital signature field: The digital signature for this license delivery. To generate a digital signature, the processing control unit calls the signature preparing unit 1108.

Certificate field: The public key certificate stored in the certificate memory unit 211.

—Other Features Center has—

The center in this embodiment can send the history information of issued licenses to a provider.

The history information of issued licenses sent to a provider is the information of the issuance of licenses for the public key for verification assigned to the provider. This information is generated in the license issuance history for provider preparing unit 212 and is sent to the provider via the input/output control unit 201. For a provider, the history information is reliable information showing that which retailer sells his digital contents and how much of his digital contents is sold. In the case a margin in selling is passed from the retailer to the provider, the history information is important information for checking the legitimacy of a margin sent from the retailer.

The license issuance history for provider preparing unit 212 receives the specifications of the identifier of the provider the history of which is to be generated and the start date and the end date of a period the history of which is to be generated. After getting these input, the license issuance history for provider preparing unit selects a group of entries of which the value of the provider identifier attribute is equal with the identifier of the specified provider by the input and of which the value of the date of issue attribute is in the specified history generation period by the input from the license issuance history DB 209. The license issuance history for provider preparing unit extracts the values of the public key identifier attribute, the intermediary identifier attribute, the usage condition attribute and the date of issue attribute from the selected entries. In this embodiment, the specifications of the identifier of a provider and the history generation period are sent from an operator of the center, however, the provider may also input them via the Internet.

The center in this embodiment can also send the history information of the issuance of licenses to the corresponding retailer.

The history information of the issuance of licenses sent to the retailer is the information of the issuance of licenses based upon the requests from the retailer. The information is generated in the license issuance history for retailer preparing unit 213 and is sent to the retailer via the input/output control unit 201. This history is used as the basis of the amount of a margin in the case the center receives the margin of the issuance of licenses from the retailer.

The license issuance history for retailer preparing unit 213 receives the specifications of the identifier of a retailer the history of which is to be generated and the start date and the end date of a period the history of which is to be generated. The license issuance history for retailer preparing unit selects a group of entries the value of the intermediary identifier attribute of which is the same with the identifier of the specified retailer and the value of the date of issue attribute of which is in the specified history generation period from the license issuance history DB 209. The license issuance history for retailer preparing unit extracts the values of the public key identifier attribute, the provider identifier attribute, the consumer identifier attribute, the usage condition attribute and the date of issue attribute form the selected entries. In this embodiment, the specifications of the identifier of a retailer and a history generation period are sent from an operator of the center, however, the retailer may also input them via the Internet.

Also, the center in this embodiment can send the history information of the issuance of verification public key information to a provider.

The history information of the issuance of verification public key information passed to a provider is information of verification public key information issued to the provider. This history information is generated in the verification public key information issuance history preparing unit 214 and is sent to the provider via the input/output control unit 201. This history functions as a basis in the case the center collects the commission of the issuance of verification public key information from the provider.

The verification public key information issuance history preparing unit 214 receives the specifications of the identifier of a provider the history of which is to be generated and the start date and the end date of a period the history of which is to be generated. The unit extracts the values of the public key identifier attribute, the modulus attribute, the public key attribute, the start of effective period attribute, the end of effective period attribute and the date of issue attribute from the public key pair DB 206. In this embodiment, the specifications of the identifier of a provider and a history generation period are sent from an operator of the center, however, the provider may also input them via the Internet.

The history information described above may also be sent to a provider or a retailer via an electronic mail and may also be issued on demand via WWW. In the case tapping and forgery may be performed, it is desirable that encryption and a digital signature are applied.

—Configuration of Provider—

Figure 13:
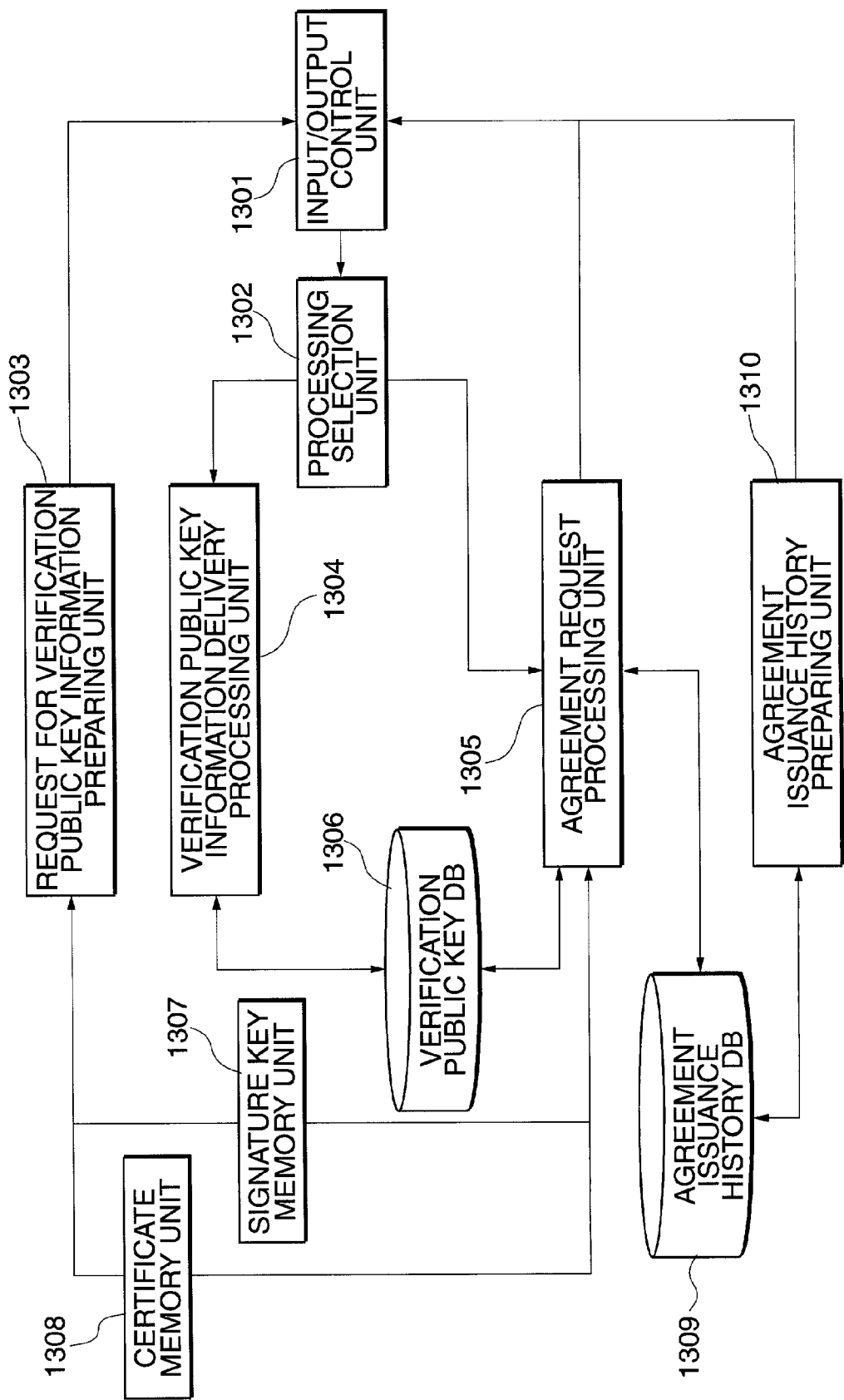
FIG. 13 is a block diagram showing a provider to which the invention is applied.

FIG. 13 is a block diagram showing a provider in this embodiment.

The provider in this embodiment has a feature for generating a verification public key information request and sending it to the center via the Internet and a feature for processing a verification public key information delivery and an agreement request respectively input via the Internet. The provider includes an input/output control unit 1301, a processing selection unit 1302, a verification public key information request preparing unit 1303, a verification public key information delivery processing unit 1304, an agreement request processing unit 1305, a verification public key DB 1306, a signature key memory unit 1307, a certificate memory unit 1308, an agreement issuance history DB 1309 and an agreement issuance history preparing unit 1310, and is connected to the Internet via the input/output control unit 1301.

The role of each unit of the provider in this embodiment is as follows.

Input/output control unit 1301: Monitors the input of data via the Internet and outputs data generated by the verification public key information request preparing unit 1303 and the agreement request processing unit 1305 via the Internet. For a method of input from the Internet to the input/output control unit 1301 or output from the input/output control unit 1301 to the Internet, we can use a method of preparing a WWW site connected to the input/output control unit 1301 and allowing other entities to access to the site. A method of accessing a WWW site prepared by other entities and sending data generated by the provider is another good method. The method of automatically or manually connecting an electronic mail system and the input/output control unit 1301 can be used, too.

Processing selection unit 1302: Judges whether input data is a verification public key information delivery or an agreement request. If the input is a verification public key information delivery, this unitcalls the verification public key information delivery processing unit 1304. If the input is an agreement request, this unit calls the agreement request processing unit.

Verification public key information request preparing unit 1303: Generates a verification public key information request and sends it to the center via the input/output control unit 1301. In the process of generating the request, the preparing unit described above accesses the signature key memory unit 1307 and the certificate memory unit 1308.

Verification public key information delivery processing unit 1304: Processes a verification public key information delivery and registers a public key for verification into the verification public key DB 1306.

Agreement request processing unit 1305: Processes an agreement request, generates an agreement delivery and sends it to a requester via the input/output control unit 1301. In the process of generating the agreement delivery, the agreement request processing unit refers to the verification public key DB 1306, adds a new entry to the agreement issuance history DB 1309 and accesses the signature key memory unit 1307 and the certificate memory unit 1308.

Verification public key DB 1306: A database that stores information related to a public key for verification.

Signature key memory unit 1307: Stores the signature key used for a digital signature generated by a provider.

Certificate memory unit 1308: Stores the public key certificate including the verification key that can verify the digital signature generated using a signature key stored in the signature key memory unit 1307.

Agreement issue history DB 1309: A database storing the history of the issuance of agreements.

Agreement issuance history preparing unit 1310: Generates the history of the issuance of agreements for every retailer.

—Databases Provider has—

A provider has two databases of the verification public key DB 1306 and the agreement issuance history DB 1309.

The verification public key DB 1306 is a database that stores the information about the verification public key information issued by the center together with the application of a public key for verification determined by the provider itself.

FIG. 14 shows the structure of the verification public key DB 1306. The verification public key DB 1306 is a table having the following six attributes and each entry is the information of one public key for verification.

Public key identifier attribute: A verification public key identifier assigned to a public key for verification.

Modulus attribute: An RSA modulus contained in verification public key information.

Public key attribute: A public key according to RSA included in verification public key information.

Start of effective period attribute: The start date/time of an effective period of verification public key information.

End of effective period attribute: The end date of the effective period of the verification public key information.

Application attribute: An application that the provider assigns to the public key for verification described in this entry. The information of digital contents or the feature the legitimacy of the license of which is verified using the public key for verification is described.

The agreement issuance history DB 1309 is a database that stores the history of agreements issued by the provider.

FIG. 34 shows the structure of the agreement issuance history DB 1309. The agreement issuance history DB 1309 is a table having the following seven attributes and each entry is the information of one issuance of an agreement.

Agreement identifier attribute: An identifier assigned to an issued agreement.

Public key identifier attribute: A verification public key identifier assigned to the public key for verification the license for is allowed to be sold in the issued agreement.

Retailer identifier attribute: The identifier of the retailer who is allowed to sell a license by the issued agreement.

Usage condition limitation information attribute: Usage condition limitation information described in the issued agreement.

Start of effective period attribute: The start date/time of an effective period of the issued agreement.

End of effective period attribute: The end date of the effective period of the issued agreement.

Date of issue attribute: The date of issue/time of the issued agreement.

—Verification Public Key Information Request Preparing Unit—

The provider in this embodiment requests the center to issue verification public key information including the public key for verification assigned to digital contents to be newly sold by the provider. In the request, the provider generates a verification public key information request in the verification public key information request preparing unit 1303 and sends the request to the center via the input/output control unit 1301.

The verification public key information request preparing unit 1303 sets the following values in each field of the verification public key information request.

Sender field: The identifier of the provider.

Receiver field: The center's identifier.

Date/time field: The current point of time.

Public key specification field: A specification for a public key for verification to be generated. As the user of the public key for verification, the provider's identifier is described. Further, the public key encryption algorithm and the length of the key for the public key for verification are specified. In this embodiment, as only RSA is enabled for public key encryption algorithm, a value of public key encryption algorithm is fixed to a value according to RSA.

Digital signature field: A digital signature for the verification public key information request. To generate a digital signature, the verification public key information request preparing unit 1303 includes the signature preparing unit and sets the signature value generated by the signature preparing unit into this field. A signature key is acquired by accessing to the signature key memory unit 1307.

Certificate field: The public key certificate stored in the certificate memory unit 1308.

—Verification Public Key Information Delivery Processing Unit—

When a verification public key information request is generated in the verification public key information request preparing unit 1303 and is sent to the center, a verification public key information delivery is sent from the center as the response. The verification public key information delivery is sent to the verification public key information delivery processing unit 1304 via the input/output control unit 1301 and the processing selection unit 1302. The verification public key information delivery processing unit processes the verification public key information delivery there.

Figure 15:
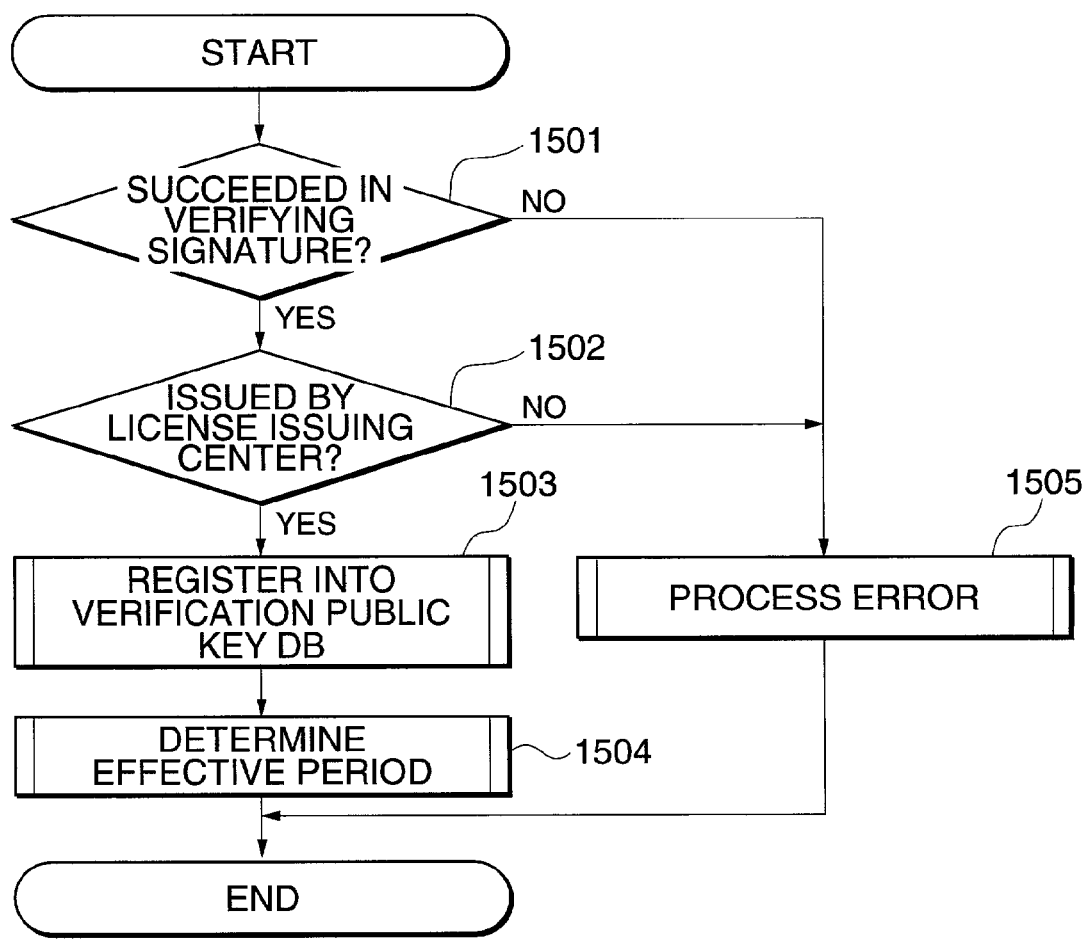
FIG. 15 is a flowchart showing the operation of a verification public key information delivery processing unit that the provider to which the invention is applied has.

FIG. 15 is a flowchart showing the operation of the verification public key information delivery processing unit 1304 which the provider in this embodiment has. Referring to FIG. 15, the operation of the verification public key information delivery processing unit 1304 will be described below.

First, the verification public key information delivery input from the processing selection unit 1302 and the digital signature of the verification public key information included in the verification public key information delivery are verified (1501). For the verification key, the one attached to the certificate field of the verification public key information delivery is used, however, in the case the required public key certificate does not exist in the certificate field, the signatures are verified after the public key certificate is acquired from CA 108. To verify the signatures, the verification public key information delivery processing unit 1304 includes a signature verification unit verifying a digital signature.

In the case a digital signature is not verified in 1501, the processing is terminated after error processing is executed (1505).

In the case a digital signature is verified in 1501, it is checked whether or not the issuer of verification public key information included in the verification public key information delivery is the center (1502). This check is executed by checking whether or not the identifier described in the issuer field of the verification public key information is that of the center.

In the case the issuer of the verification public key information is not the center in the check of 1502, the processing is terminated after error processing is executed (1505).

In the case the issuer of the verification public key information is the center in the check of 1502, a new entry is added to the verification public key DB 1306 (1503). The following values are set in each attribute of the new entry.

Public key identifier attribute: the value in the verification public key identifier field of verification public key information included in the verification public key information delivery.

Modulus attribute: The RSA modulus contained in the public key information field of the verification public key information included in the verification public key information delivery.

Public key attribute: The public key according to RSA included in the public key information field of the verification public key information included in the verification public key information delivery.

Start of effective period attribute: The value in the start date/time of effective period of the verification public key information included in the verification public key information delivery.

End of effective period attribute: The value in the end date/time of effective period of the verification public key information included in the verification public key information delivery.

Application attribute: The information of the application that the provider assigns to the public key for verification included in the verification public key information delivery.

—Agreement Request Processing Unit—

Figure 16:
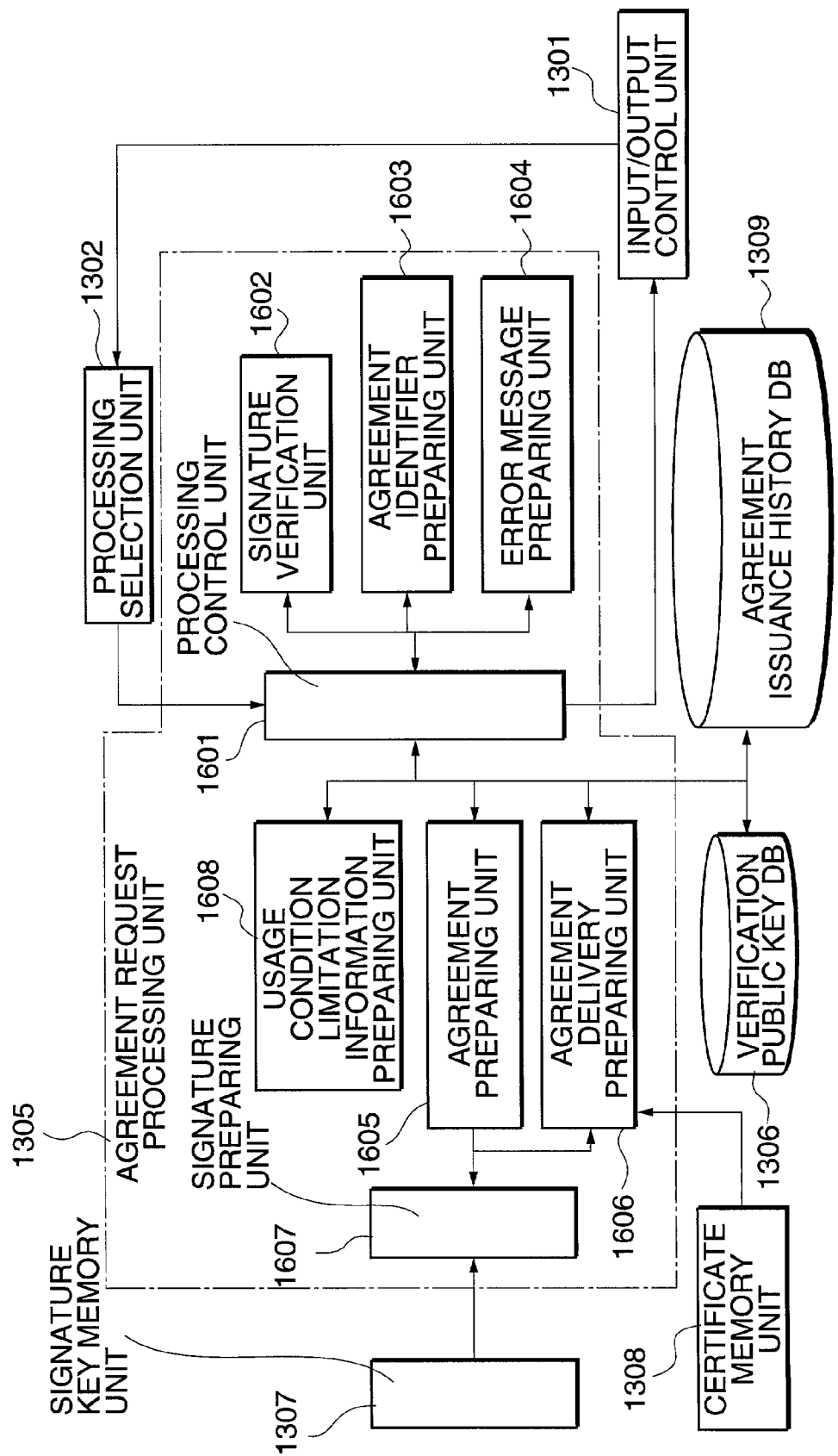
FIG. 16 shows the internal configuration of an agreement request processing unit that the provider to which the invention is applied has.

FIG. 16 shows the internal configuration of the agreement request processing unit 1305 that the provider in this embodiment has.

The agreement request processor 1305 has a feature for processing an agreement request. The agreement request processor includes a processing control unit 1601, a signature verification unit 1602, an agreement identifier preparing unit 1603, an error message preparing unit 1604, an agreement preparing unit 1605, an agreement delivery preparing unit 1606, a signature preparing unit 1607 and an usage condition limitation information preparing unit 1608.

The role of each unit including the agreement request processing unit 1305 is as follows.

Processing control unit 1601: This unit has the features for input from the processing selection unit 1302, output to the input/output control unit 1301, referring to the verification public key DB 1306, and adding an entry to the agreement issuance history DB 1309 and controls the whole processing of an agreement request.

Signature verification unit 1602: Verifies the digital signature for the agreement request input from the processing selection unit 202.

Agreement identifier preparing unit 1603: Generates the agreement identifier assigned to an agreement. The preparing unit is devised so that the generated identifier is unique by extracting a bit string at random from sufficiently large space.

Error message preparing unit 1604: Generates an error message.

Agreement preparing unit 1605: Generates an agreement. In order to attach a digital signature to the agreement, this unit calls the signature preparing unit 1607.

Agreement delivery preparing unit 1606: Generates an agreement delivery. In order to attach a digital signature to the agreement delivery, this unit calls the signature preparing unit 1607. Further, in order to acquire the public key certificate of the verification key for the signature of the provider, this unit accesses the certificate memory unit 1308.

Signature preparing unit 1607: Generates a digital signature for an agreement and an agreement delivery. In order to acquire the signature key for a digital signature, this unit accesses the signature key memory unit 1307.

Usage condition limitation information preparing unit 1608: Generates usage condition limitation information described in an agreement.

Figure 17:
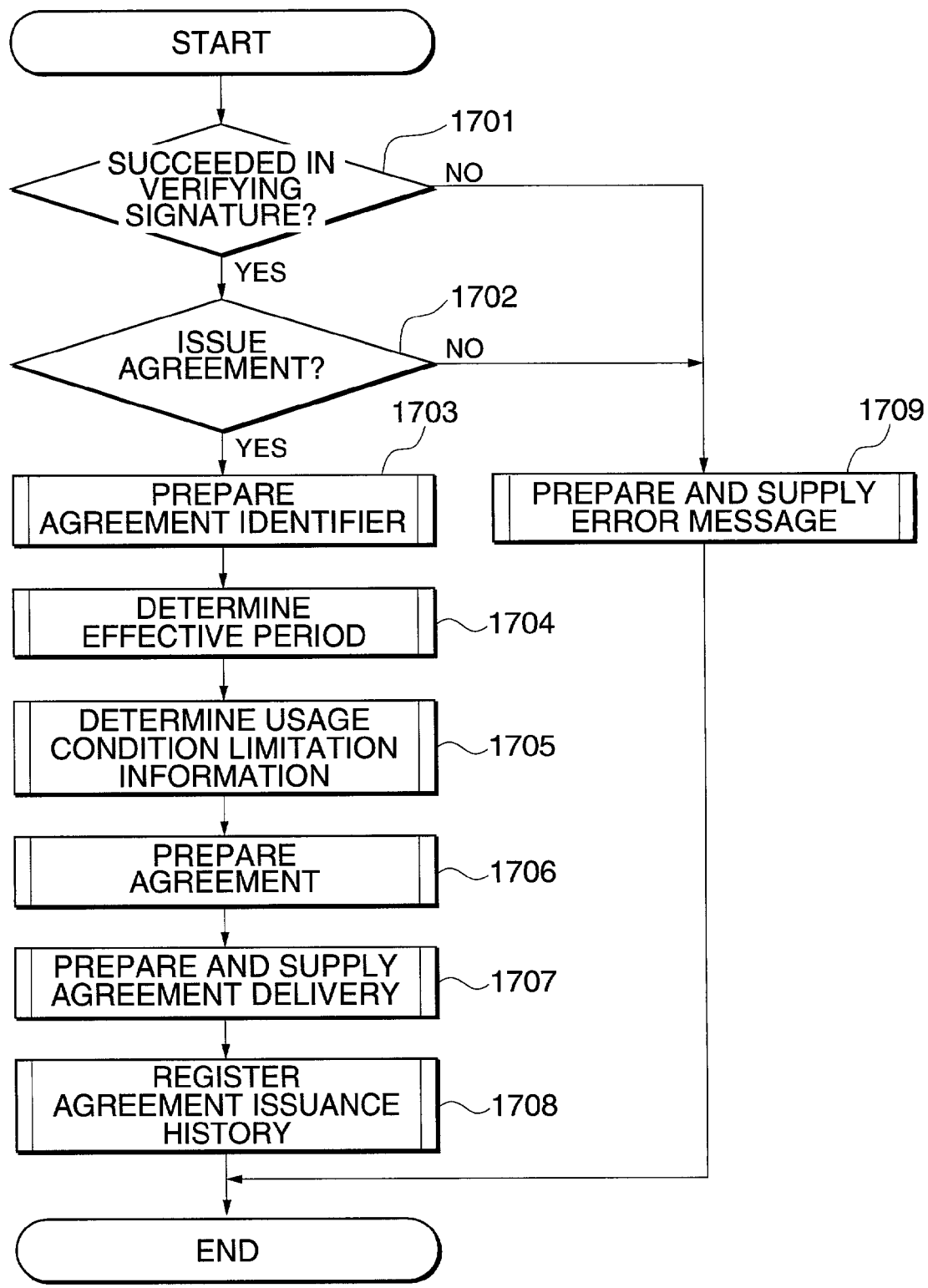
FIG. 17 is a flowchart showing the operation of a processing control unit of the agreement request processing unit that the provider to which the invention is applied has.

FIG. 17 is a flowchart showing the operation of the processing control unit 1601 in the agreement request processing unit 1305 that the provider in this embodiment has. Referring to FIG. 17, the operation of the processing control unit 1601 will be described below.

First, the digital signature for an agreement request input from the processing selection unit 1302 is verified (1701). For a verification key, the one involved in the public key certificate attached to the certificate field of the agreement request is used. However, in the case the required public key certificate does not exist in the certificate field, the signature is verified after the public key certificate is acquired from CA 108.

In the case the signature is not verified, an error message is generated in the error message preparing unit 1604 and after it is output to the input/output control unit 1301 (1709), the processing is terminated.

In the case the signature is verified, it is determined whether the agreement requested in the agreement request is to be issued or not (1702). It is the provider that determines whether the agreement is to be issued or not. For example, in the case the retailer to which the agreement is conferred is unreliable or in the case the identifier described in the issuer field of the agreement specification included in the agreement request is different from that of the provider, the provider should not issue the agreement. And, in the case the verification public key information specified by the verification public key identifier described in the public key identifier field of the agreement specification included in the agreement request is not the one issued to the provider, the provider should not issue the agreement.

In the case the provider judges he should not issue the agreement on the usage condition limitation information field of the agreement specification included in the agreement request, the issuance of the agreement is canceled.

In the case it is determined in 1702 that the agreement is not issued, an error message is generated in the error message preparing unit 1604 and after it is output to the input/output control unit 1301 (1709), the processing is terminated.

In the case it is determined in 1702 that the agreement is issued, the agreement identifier preparing unit 1603 is called, and the identifier assigned to the agreement is generated (1703). After this generation the effective period of the issued agreement is suitably determined (1704).

Further, the usage condition limitation information preparing unit 1608 is called, usage condition limitation information included in the issued agreement is generated by the usage condition limitation information preparing unit (1705). The usage condition limitation information generated may be the one described in the usage condition limitation information field of the agreement specification included in the agreement request. The provider may also determine suitable usage condition limitation information based upon its own judgment.

Afterward, the agreement preparing unit 1605 is called, the agreement is generated by the preparing unit (1706). The following values are each set in each field of the agreement.

Issuer field: The identifier of the provider.

Recipient field: the value in the subject field of the agreement specification included in the agreement request.

Date of issue/time field: A current date.

Agreement identifier field: The identifier generated in 1703.

Start date/time of effective period: The start date/time of the effective period determined in 1704.

End date/time of effective period: The end date of the effective period determined in 1704.

Public key identifier field: The value in the public key identifier field of the agreement specification included in the agreement request.

Usage condition limitation information field: The usage condition limitation information determined in 1705.

Digital signature field: The digital signature for this agreement. To generate the digital signature, the signature preparing unit 1607 is called, the signature value calculated by the signature preparing unit is set in the field.

Next, the agreement delivery preparing unit 1606 is called, an agreement delivery is prepared by the preparing unit, the result from the preparing unit is output to the input/output control unit 1301 (1707). The following values are each set in each field of the agreement delivery.

Sender field: The identifier of the provider.

Receiver field: The identifier described in the sender field of the agreement request.

Date/time field: A current date.

Agreement field: The agreement generated in 1706.

Digital signature field: The digital signature for this agreement delivery. To generate the digital signature, the signature preparing unit 1607 is called and the result from the signature preparing unit is set in this field.

Certificate field: The public key certificate stored in the certificate memory unit 1308.

Finally, a new entry showing the history of the issuance of the agreement is added to the agreement issuance history DB 1309 and the processing is finished. The following values are each stored in each attribute of the added entry.

Agreement identifier attribute: The identifier generated in 1703.

Public key identifier attribute: The value in the public key identifier field of the agreement specification included in the agreement request.

Retailer identifier attribute: The value of the subject field of the agreement specification included in the agreement request.

Usage condition limitation information attribute: The usage condition limitation information determined in 1705.

Start of effective period attribute: The start date/time of the effective period determined in 1704.

End of effective period attribute: The end date of the effective period determined in 1704.

Date of issue attribute: The value described in the date of issue/time field of the agreement generated in 1705.

—Other Features Provider has—

The provider in this embodiment can send the history information of the issuance of an agreement to a retailer.

The history information of the issuance of an agreement passed to a retailer is the information of the agreement issued to the retailer. This history information is generated in the agreement issuance history preparing unit 1310 and is sent to the retailer via the input/output control unit 1301. This history information functions as a basis in the case the provider charges the retailer the commission of the issuance of an agreement.

The agreement issuance history preparing unit 1310 receives the specifications of the identifier of a retailer the history of which is to be generated and the start date and the end date of a history generation period. The unit selects the group of entries the value of the retailer identifier attribute of which is coincident with the identifier of the specified retailer and the value of the date of issue attribute of which is in the specified history generation period from the agreement issuance history DB 1309. Afterward the unit extracts the values of the agreement identifier attribute, the public key identifier attribute, the usage condition limitation information attribute, the start of effective period attribute, the end of effective period attribute and the date of issue attribute from the selected entities. In this embodiment, the specifications of the identifier of the retailer and the history generation period are sent from an operator of the provider, however, they may also be input from the retailer via the Internet.

The history information described above may be sent via an electronic mail and may also be issued via downloading from WWW on demand. In the case tapping and forgery may be performed, it is desirable that encryption and a digital signature can be applied.

—Configuration of Retailer—

Figure 18:
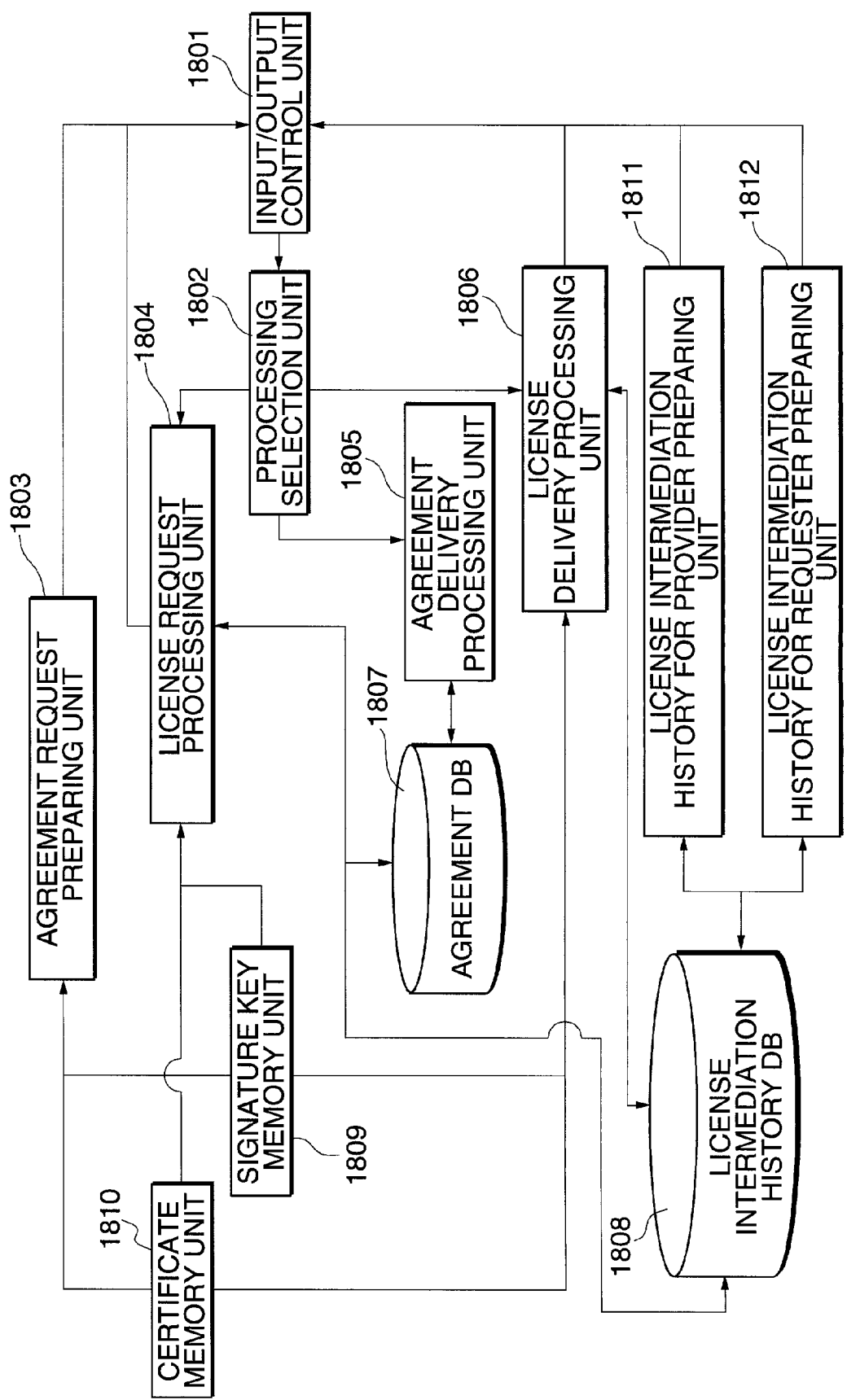
FIG. 18 is a block diagram showing a retailer to which the invention is applied.

FIG. 18 is a block diagram showing a retailer in this embodiment.

The retailer in this embodiment has a feature for generating an agreement request and sending it to a provider via the Internet, a feature for processing an agreement delivery, a license request and a license delivery respectively input via the Internet and a feature for generating the history of the mediation for issuance of a license and sending it to the provider and a requester of the via the Internet. The retailer includes an input/output control unit 1801, a processing selection unit 1802, an agreement request preparing unit 1803, a license request processing unit 1804, an agreement delivery processing unit 1805, a license delivery processing unit 1806, an agreement DB 1807, a license intermediation history DB 1808, a signature key memory unit 1809, a certificate memory unit 1810, a license intermediation history for provider preparing unit 1811 and a license intermediation history for requester preparing unit 1812. The retailer is connected to the Internet via the input/output control unit 1801.

The role of each unit of the retailer in this embodiment is as follows.

Input/output control unit 1801: Monitors the input of data via the Internet and outputs data generated by the agreement request preparing unit 1803, the license request processing unit 1804 and the license delivery processing unit 1806 via the Internet. For the method of input from the Internet to the input/output control unit 1801 or output from the input/output control unit 1801 to the Internet, the WWW site, which can be accessed by other entities, connected to the input/output control unit 1801 is preferable. Accessing the WWW site prepared by other entities and sending/receiving data is another good method. We can use the method of automatically or manually connecting an electronic mail system and the input/output control unit 1801.

Processing selection unit 1802: Judges whether input data is a license request, an agreement delivery or a license delivery. In the case of a license request, the processing selection unit calls the license request processing unit 1804. In the case of the agreement delivery, the processing selection unit calls the agreement delivery processing unit 1805. And, in the case of the license delivery, the processing selection unit calls the license delivery processing unit 1806.

Agreement request preparing unit 1803: Generates an agreement request and sends it to a provider via the input/output control unit 1801. In the process of generating the agreement request, accesses the signature key memory unit 1809 and the certificate memory unit 1810.

License request processing unit 1804: Processes a license request from a consumer, generates a second a license request and sends it to the center via the input/output control unit 1801. In the process of the processing, refers to the agreement DB 1807 and accesses the signature key memory unit 1809 and the certificate memory unit 1810.

Agreement delivery processing unit 1805: processes an agreement delivery from a provider and registers the agreement included in the agreement delivery into the agreement DB 1807.

License delivery processing unit 1806: Processes a license delivery from the center, generates a second license delivery and sends it to a requester of the license via the input/output control unit 1801. In the process of the processing, updates a license intermediation history DB 1808 and accesses the signature key memory unit 1809 and the certificate memory unit 1810.

Agreement DB 1807: The database that stores the information of the agreements issued to the retailer by the provider.

license intermediation history DB 1808: The database that stores the history of licenses which the retailer mediates.

Signature key memory unit 1809: Stores a signature key of the retailer. This key is used for making a digital signature by the retailer.

Certificate memory unit 1810: Stores the public key certificate including the verification key that enables the verification of the digital signature generated based upon the signature key stored in the signature key memory unit 1809.

License intermediation history for provider preparing unit 1811: Generates the history of the mediation of a license every provider and transmits it to the provider via the input/output control unit 1801.

License intermediation history for requester preparing unit 1812: Generates the history of the mediation of a license every requester of a request for the mediation of a license that the retailer receives and sends it to the requester via the input/output control unit 1801.

—Databases Retailer has—

The retailer has two databases of the agreement DB 1807 and the license intermediation history DB 1802.

The agreement DB 1807 is a database that stores the information of agreements that the retailer receives from plural providers.

FIG. 19 shows the structure of the agreement DB 1807. The agreement DB 1807 is the table having the following five attributes. Each entry is equivalent to one agreement.

Agreement identifier attribute: The agreement identifier assigned to the agreement described by an entry.

Public key identifier attribute: The identifier of the public key for verification the mediation of the issuance of the license of which is allowed in the agreement described by an entry.

Provider identifier attribute: The identifier of the provider that issues the agreement described by an entry.

Agreement attribute: Data acquired by encoding the agreement described by an entry according to BER.

Provider certificate attribute: Data acquired by encoding the public key certificate including the public key that can verify the digital signature of the provider that issues the agreement described by an entry according to BER.

The license intermediation history DB 1808 is a database that stores the information of licenses which the retailer mediates.

FIG. 20 shows the structure of the license intermediation history DB 1808. The license intermediation history DB 1808 is a table having the following eight attributes. Each entry describes about one intermediation of a license.

License identifier attribute: The identifier that the center assigns to the mediated license described by an entry of this DB.

Public key identifier attribute: The identifier that the center assigns to the public key for verification that can verify the legitimacy of the mediated license described by an entry of this DB.

Provider identifier attribute: The identifier of the provider that is a user of the public key for verification specified in the public key identifier attribute.

Consumer identifier attribute: The identifier of the consumer to which the mediated license described by an entry of this DB is issued.

Requester identifier attribute: The identifier of the entity that sends a license request to the retailer.

Usage condition attribute: The usage condition involved in the mediated license described by an entry of this DB.

Request date attribute: The date/time when the license request that the retailer receives is generated.

Transmission date attribute: The date/time when the retailer generates the license delivery including the mediated license described by an entry of this DB.

—Agreement Request Preparing Unit—

When a retailer in this embodiment wants to sell digital contents provided a provider, the retailer is required to receive the agreement allowing the mediation of the license corresponding to the public key for verification assigned to the digital contents. To receive the agreement from the provider, the retailer generates an agreement request in the agreement request preparing unit 1803 and sends it to the provider via the input/output control unit 1801.

The agreement request preparing unit 1803 sets the following each value in each field of the agreement request.

Sender field: The identifier of the retailer.

Receiver field: The identifier of the provider that is the recipient of the agreement request.

Date/time field: The current point of time.

Agreement specification field: The specification of the agreement to be generated by the agreement request is described.

Digital signature field: The digital signature for the agreement request. To generate the digital signature, the agreement request preparing unit 1803 includes the signature preparing unit and sets a signature value generated by the signature preparing unit in this field. The signature key used for making the signature is acquired by accessing to the signature key memory unit 1809.

Certificate field: The public key certificate stored in the certificate memory unit 1810.

The following values are each set in each field of the agreement specification described in the agreement specification field of the agreement request.

Issuer field: The identifier of the provider expected to issue the agreement in response to the agreement request.

Subject field: The identifier of the retailer.

Public key identifier field: The verification public key identifier assigned to the public key for verification the mediation the licenses corresponding to which is allowed by the agreement requested by the agreement request.

Usage condition limitation information field: Usage condition limitation information that the retailer wants to be described in the agreement requested by the agreement request.

—Agreement Delivery Processing Unit—

When an agreement request is generated in the agreement request preparing unit 1803 and is sent to a provider, an agreement delivery is sent from the provider in response to the agreement request. The received agreement delivery is sent to the agreement delivery processing unit 1805 via the input/output control unit 1801 and the processing selection unit 1802. The agreement delivery processing unit 1805 processes the agreement delivery.

Figure 21:
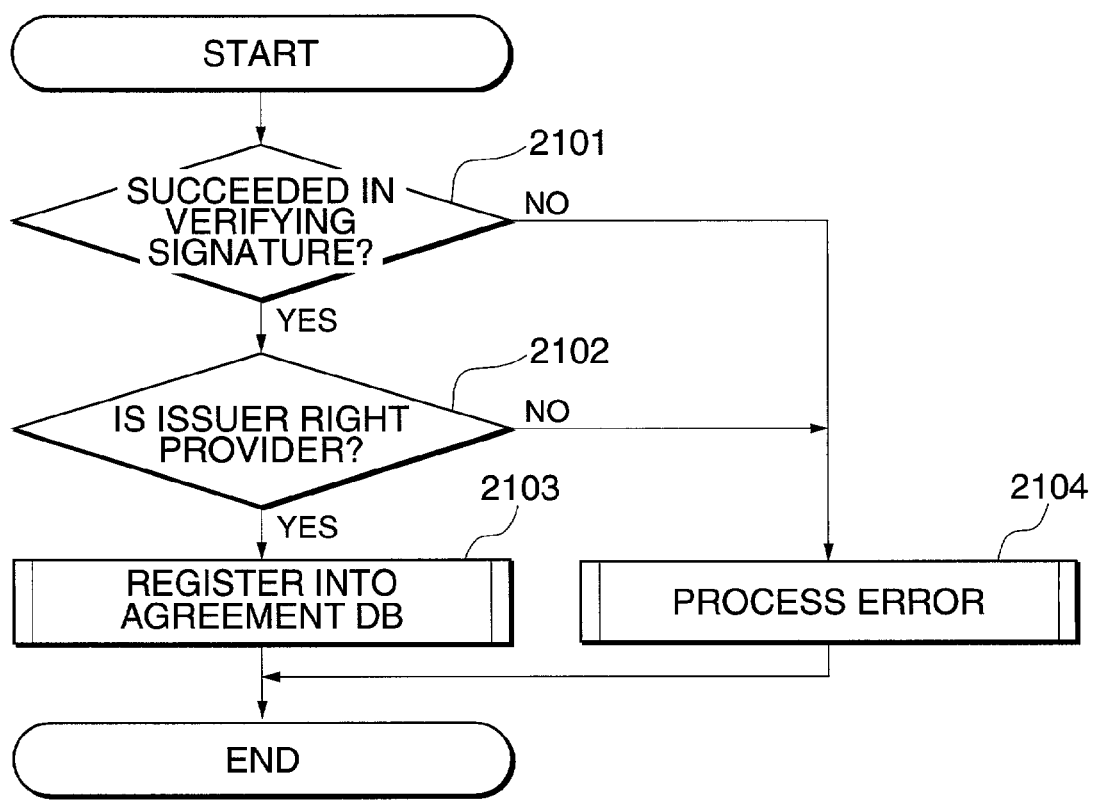
FIG. 21 is a flowchart showing the operation of an agreement delivery processing unit that the retailer to which the invention is applied has.

FIG. 21 is the flowchart showing the operation of the agreement delivery processing unit 1805 which the retailer in this embodiment has. Referring to FIG. 21, the operation of the agreement delivery processing unit 1805 will be described below.

First, the digital signature for the agreement delivery input from the processing selection unit 1802 and the digital signature for the agreement included in the agreement delivery are verified (2101). For the verification key, the one attached to the certificate field of the agreement delivery is used, however, in the case the required public key certificate does not exist in the certificate field, the signature is verified after the public key certificate is acquired from CA 108. To verify a signature, the agreement delivery processing unit 1805 includes a signature verification unit for only verifying a digital signature.

In the case the digital signatures are not verified in 2101, the processing is terminated after error processing is executed (2104).

In the case the digital signatures are verified in 2101, it is checked whether or not the generator of the agreement included in the agreement delivery is a legitimate provider (2102). There may be some variations for the criterion of judgment of whether the generator of the agreement is a legitimate provider or not. It is one example for the criterion that the value in the issuer field of the agreement included in the agreement delivery is coincident with the identifier described in the subject field of the agreement specification included in the agreement request requested by the retailer. When the retailer want to check whether the issuer of the agreement included in the agreement delivery is the legitimate user of the public key for verification, the mediation of a license corresponding to which is allowed in the agreement, the retailer can check the verification public key information issued by the center. As verification public key information is open information, it can be open in a form that the center or the provider can freely download verification public key information.

In the case it proves in the check in 2102 that the generator of the agreement is not a legitimate provider, the processing is terminated after error processing is executed (2104).

In the case it proves in the check in 2102 that the generator of the agreement is a legitimate provider, a new entry is added to the agreement DB 1807 (2103). The following values are each set in each attribute of the new entry.

Agreement identifier attribute: The value in the agreement identifier field of the agreement included in the agreement delivery.

Public key identifier attribute: The value in the public key identifier field of the agreement included in the agreement delivery.

Provider identifier attribute: The value in the issuer field of the agreement included in the agreement delivery.

Agreement attribute: The result of encoding the agreement included in the agreement information according to BER.

Provider certificate attribute: The result of encoding the public key certificate including the verification key for the signature of the provider included in the agreement delivery according to BER.

—License Request Processing Unit—

Figure 22:
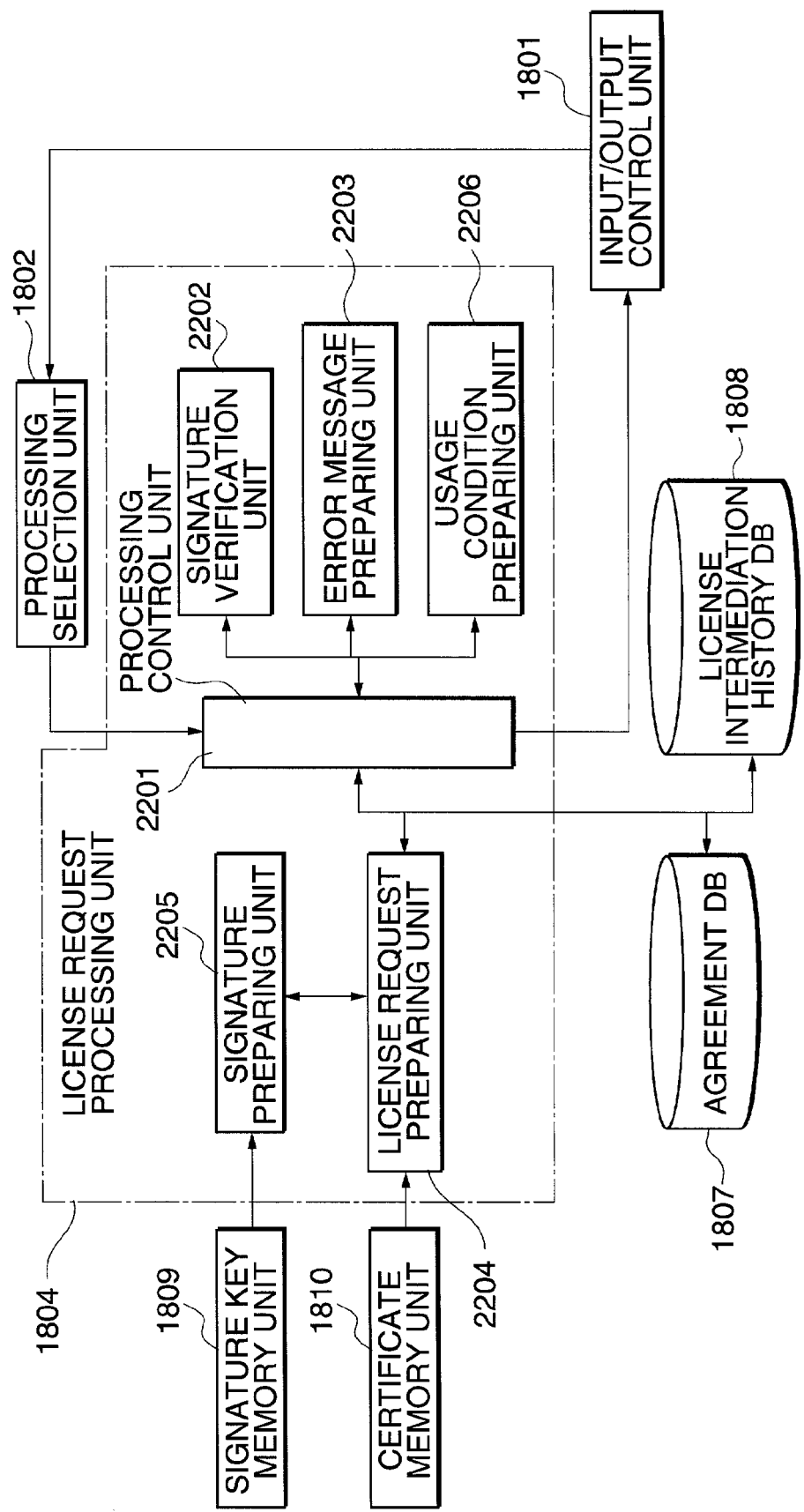
FIG. 22 shows the internal configuration of the license request processing unit that the retailer to which the invention is applied has.

FIG. 22 shows the internal configuration of the license request processing unit 1804 which the retailer in this embodiment has.

The license request processing unit 1804 has the features for processing a license request sent from a consumer or other retailers, generating a license request to the center and sending it to the center via the input/output control unit 1801. The unit includes a processing control unit 2201, a signature verification unit 2202, an error message preparing unit 2203, a license request preparing unit 2204, a signature preparing unit 2205 and a usage condition preparing unit 2206.

The role of each unit included in the license request processing unit 1804 is as follows.

Processing control unit 2201: This unit has the features for input from the processing selection unit 1802, output to the input/output control unit 1801, referring to the agreement DB 1807 and adding an entry to the license intermediation history DB 1808 and controls the whole processing of a license request.

Signature verification unit 2202: Verifies the digital signature for the license request input from the processing selection unit 1802.

Error message preparing unit 2203: Generates an error message.

License request preparing unit 2204: Generates a license request sent to the center. In order to attach a digital signature to the license request, this unit calls the signature preparing unit 2205. Further, in order to acquire the public key certificate of the verification key for the signature of the retailer, accesses the certificate memory unit 1810.

Signature preparing unit 2205: Generates a digital signature for the a license request generated in the license request preparing unit 2204. In order to acquire a signature key for a digital signature, accesses the signature key memory unit 1809.

Usage condition preparing unit 2206: Generates a usage condition to be included in a requested license by the license request generated by the license request processing unit.

Figure 23:
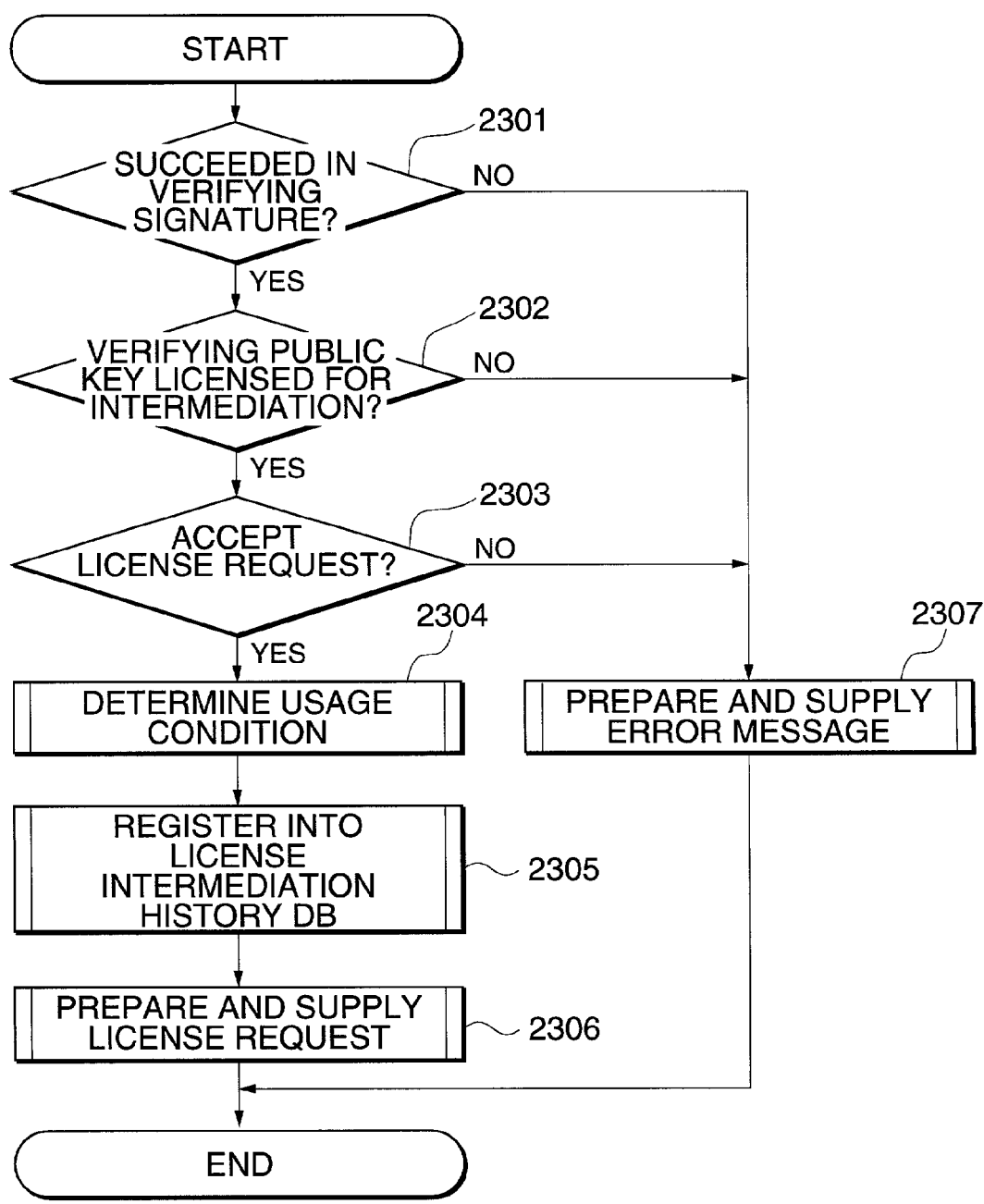
FIG. 23 is a flowchart showing the operation of the processing control unit of the license request processing unit that the retailer to which the invention is applied has.

FIG. 23 is the flowchart showing the operation of the processing control unit 2201 of the license request processing unit 1804 which the retailer in this embodiment has. Referring to FIG. 23, the operation of the processing control unit 2201 will be described below.

First, the digital signature for the license request input from the processing selection unit 1802 is verified (2301). For the verification key, the one attached to the certificate field of the license request is used. However, in the case the required public key certificate does not exist in the certificate field, the signature is verified after the public key certificate is acquired from CA 108.

In the case the signature is not verified, an error message is generated in the error message preparing unit 2203 and after it is output to the input/output control unit 1801 (2307), the processing is terminated.

In the case the signature is verified, it is checked whether or not the retailer is allowed the mediation of the license corresponding to the public key for verification specified in the license request (2302). In the case the agreement corresponding to the public key for verification specified in the license request exists in the agreement DB 1807 and the usage condition described in the license request is in a range of usage condition limitation information described in the agreement, it is judged that the mediation is allowed.

In the case it is judged in the check in 2302 that the mediation is not allowed, an error message is generated in the error message preparing unit 2203. After the error message is output to the input/output control unit 1801 (2307), the processing is terminated.

In the case it is judged in the check in 2302 that the mediation is allowed, the processing control unit checks whether the license request is accepted or not (2303). In the case the consumer or the retailer who/which are respectively the sender of the input license request are unreliable, it is determined that the license request is not accepted.

In the case it is judged in 2303 that the license request is not accepted, an error message is generated in the error message preparing unit 2203. After the error message is output to the input/output control unit 1801 (2307), the processing is terminated.

In the case it is judged in 2303 that the license request is accepted, the processing control unit calls the usage condition preparing unit 2206 for generating the usage condition described in the license request sent to the center (2304). The usage condition generated by the usage conditions preparing unit 2206 may be the same usage condition described in the input license request. If necessary, the retailer may modify the usage condition described in the input license request.

When the usage condition is generated, the entry having the information of the license request under processing is added to the license intermediation history DB 1808 (2305). The following values are each set in each attribute of the new entry.

License identifier attribute: No value is set at this time.

Public key identifier attribute: The value described in the public key identifier field of the license specification included in the input license request.

Provider identifier attribute: The identifier of the provider which is the user of the verification public key information specified by the identifier set in the public key identifier attribute. The identifier of the provider can be acquired by referring to the agreement DB. That is, the provider's identifier is the provider identifier attribute of the agreement DB's entry, which corresponds to the identifier set in the public key identifier attribute of this DB, whose value is equivalent to that of the public key identifier attribute of the agreement DB.

Consumer identifier attribute: The value in the consumer identifier field of the license specification included in the input license request.

Requester identifier attribute: The value in the sender field of the input license request.

Usage condition attribute: The usage condition determined in 2304.

Request date attribute: The value in the date/time field of the input license request.

Transmission date attribute: No value is set at this time.

Finally, a license request sent to the center is generated. The generated request is sent to the center via the input/output control unit 1801 (2306) and the processing is terminated. The following values are each set in each field of the license request sent to the center.

Sender field: The identifier of the retailer.

Receiver field: The center's identifier.

Date/time field: A current date.

License specification field: The license specification described later.

Digital signature field: The digital signature for the generated license request. In order to generate the digital signature, this unit calls the signature preparing unit 2205 and set the result from the signature preparing unit in this field. The signature key for generating the signature is acquired by accessing to the signature key memory unit 1809.

Certificate field: The public key certificate stored in the certificate memory unit 1810.

The following each value is described in each field of the license specification described in the license specification field included in the license request generated above.

Public key identifier field: The value in the public key identifier field described in the license specification included in the input license request.

Consumer identifier field: The value in the consumer identifier field described in the license specification included in the input license request.

Usage condition field: The usage condition determined in 2304.

Agreement field: The agreement stored in the agreement DB 1807 and corresponding to the public key for verification requested in the license request.

—License Delivery Processing Unit—

Figure 24:
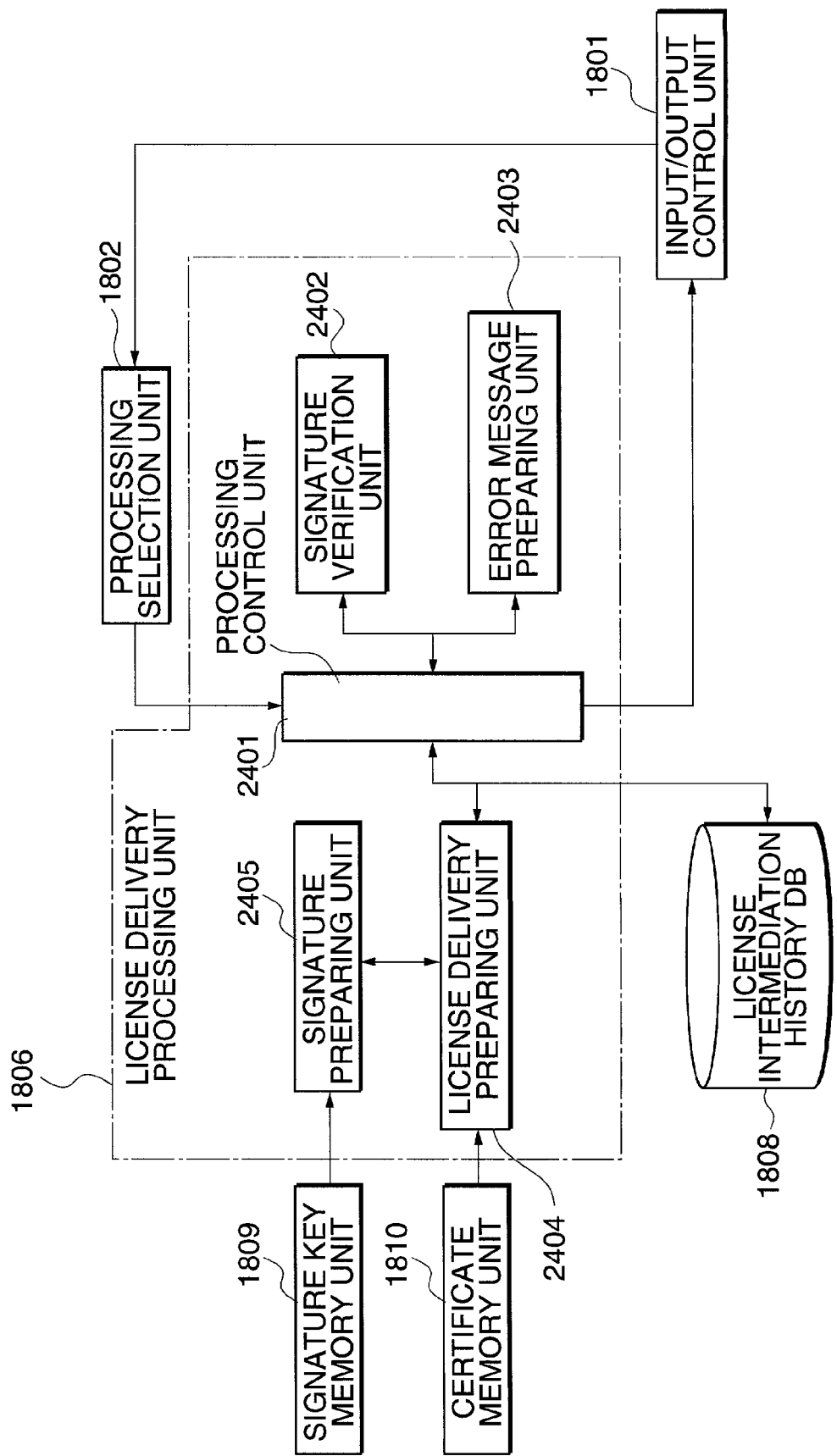
FIG. 24 shows the internal configuration of the license delivery processing unit that the retailer to which the invention is applied has.

FIG. 24 shows the internal configuration of the license delivery processing unit 1806 which the retailer in this embodiment has.

The license delivery processing unit 1806 has the features for processing a license delivery sent from the center or other retailer, generating a license delivery sent to the requester of the license and sending the license delivery to the requester via the input/output control unit 1801. This unit includes a processing control unit 2401, a signature verification unit 2402, an error message preparing unit 2403, a license delivery preparing unit 2404 and a signature preparing unit 2405.

The role of each unit included in the license delivery processing unit 1806 is as follows.

Processing control unit 2401: This unit has the features for input from the processing selection unit 1802, output to the input/output control unit 1801 and updating an entry in the license intermediation history DB 1808 and controls the whole processing of a license delivery.

Signature verification unit 2402: Verifies the digital signature for the license delivery input from the processing selection unit 1802 and the license included in the license delivery.

Error message preparing unit 2403: Generates an error message.

License delivery preparing unit 2404: Generates the license delivery sent to the requester of a license. In order to attach a digital signature to the license delivery newly generated, this unit calls the signature preparing unit 2405. Further, in order to acquire the public key certificate of the verification key for the signature of the retailer, this unit accesses the certificate memory unit 1810.

Signature preparing unit 2405: Generates a digital signature for the license delivery generated in the license delivery preparing unit 2404. In order to acquire the signature key for the digital signature, this unit accesses the signature key memory unit 1809.

Figure 25:
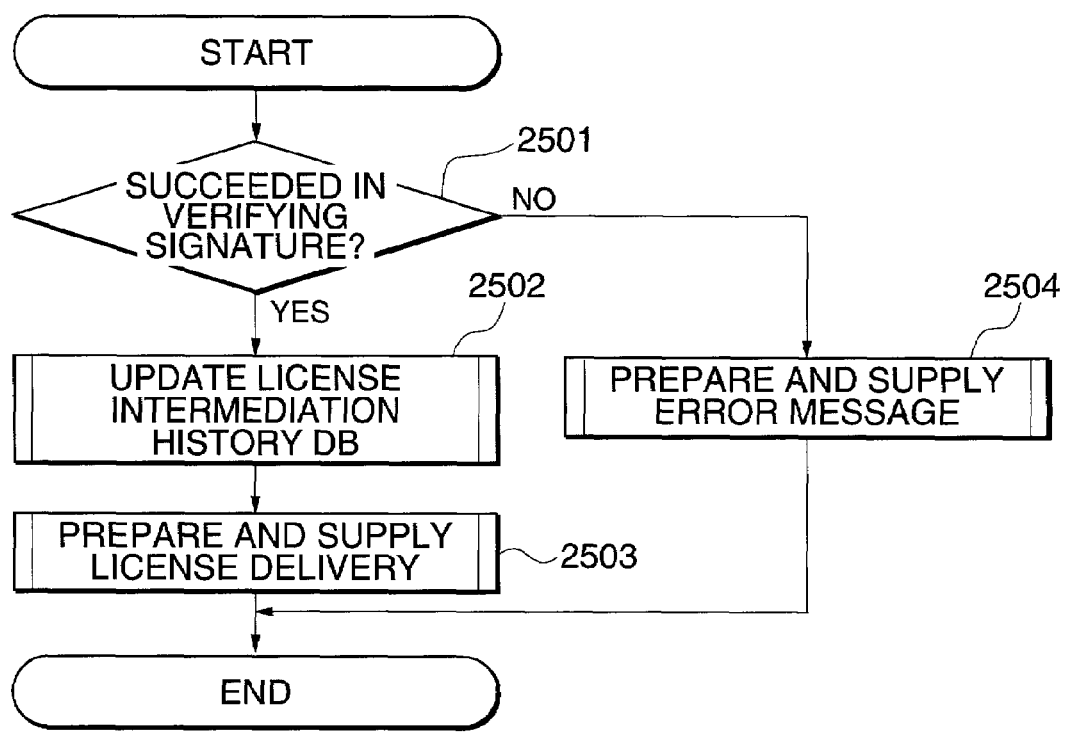
FIG. 25 is a flowchart showing the operation of the processing control unit of the license delivery processing unit that the retailer to which the invention is applied has.

FIG. 25 is a flowchart showing the operation of the processing control unit 2401 of the license delivery processing unit 1806 which the retailer in this embodiment has. Referring to FIG. 25, the operation of the processing control unit 2401 will be described below.

First, the digital signature for the license delivery input from the processing selection unit 1802 and the license included in the license delivery is verified (2501). For the verification key, the one included in the public key certificate attached to the certificate field of the license delivery is used. However, in the case the required public key certificate does not exist in the certificate field, the signature is verified after the public key certificate is acquired from CA 108.

In the case the signature is not verified, an error message is generated in the error message preparing unit 2403. After the error message is output to the input/output control unit 1801, the processing is terminated.

In the case the signature is verified, the entry in the license intermediation history DB 1808 is updated based upon the input license delivery (2502). The updated entry is the entry added when the license request corresponding to the input license delivery is processed. The values of the public key identifier attribute and the consumer identifier attribute of the updated entry are coincident with the values in the public key identifier field and the recipient field of the license included in the input license delivery. And the values of the license identifier attribute and the transmission date attribute of the entry are not set yet.

Each attribute of the entry to be updated is updated as follows.

License identifier attribute: The value in the license identifier field of the license included in the input license delivery.

Public key identifier attribute: Unchanged.

Provider identifier attribute: Unchanged.

Consumer identifier attribute: Unchanged.

Requester identifier attribute: Unchanged.

Usage condition attribute: The value in the usage condition field of the license included in the input license delivery.

Request date attribute: Unchanged.

Transmission date attribute: The current point of time.

Finally, a new license delivery sent to the requester of the license is generated. The generated license delivery is sent to the requester of the license via the input/output control unit 1801 (2503). After sending, the processing is finished. The following values are each set in each field of the newly generated license delivery.

Sender field: The identifier of the retailer.

Receiver field: The value of the requester identifier attribute of the updated entry of the license intermediation history DB 1808.

Date/time field: The value of the transmission date attribute of the updated entry of the license intermediation history DB 1808.

License field: The license included in the input license delivery.

Digital signature field: The digital signature for the generated license delivery. To generate the digital signature, this unit calls the signature preparing unit 2405.

Certificate field: Two public key certificates are set to this field. One is the public key certificate stored in the certificate memory unit 1810. Another one is the certificate included in the certificate field of the input license delivery. In the certificate field of the input license delivery, there are two certificate, and the one the public key included in which can verify the digital signature of the license included in the input license delivery is selected.

—Accounting and Settlement in License Request Processing—

The retailer in this embodiment can charge or settle the fee for a license issuance in processing of the license request. Processing for accounting or a settlement is executed before a license request is sent to the center and after a license request from a consumer is received.

In the case of accounting, a license issuance fee for every consumer is added in the process of processing for a license request. Later, it is charged the consumer. Therefore, the retailer in this embodiment owns the database that stores the current amount of a license issuance fee for every consumer.

The retailer in this embodiment can also settle a license issuance fee per every processing operation for a license request. For a method of this settlement, a settlement by a credit card which a consumer owns, a settlement by a prepaid system and others are enabled. In any case, the license request is sent to the center after it is verified that a settlement is finished.

—History Information Issued by Retailer—

The retailer in this embodiment can send the history information of the mediation of a license to a provider.

The history information of the mediation of a license sent to the provider is the information of the mediation of the license corresponding to the public key for verification assigned to the provider. The information is prepared in the license intermediation history for provider preparing unit 1811 and is sent to the provider via the input/output control unit 1801. The history functions as the basis of the amount of a margin that the retailer sends to the provider.

The license intermediation history for provider preparing unit 1811 receives the specifications of the identifier of the provider the history of which is to be generated and the start date and the end date of a history generation period. This unit selects the group of entries of which the value of the provider identifier attribute is coincident with the identifier of the specified provider and of which the value of the date of issuance attribute is in the specified period from the license intermediation history DB 1808. And, this unit extracts the values of the license identifier attribute, the public key identifier attribute, the usage condition attribute, the request date attribute and the transmission date attribute from the selected group. In this embodiment, the specifications of the identifier of the provider the history and the history generation period are received from an operator of the retailer, however, they may also be input from a provider via the Internet.

Also, the retailer in this embodiment can also send the history information of the mediation of a license to a requester of the mediation of the license.

The history information of the mediation of the license sent to the requester is the information of the mediation of the license requested from the requester. The information is generated in the license intermediation history for requester preparing unit 1812 and is sent to the requester via the input/output control unit 1801. This history functions as a basis in the case the retailer charges the requester commission.

The license intermediation history for requester preparing unit 1812 receives the specifications of the identifier of the requester the history of which is to be generated and the start date and the end date of a history generation period. This unit extracts the group of entries of which the value of the requester identifier attribute is coincident with the identifier of the specified requester and of which the value of the date of issuance attribute is in the specified history generation period from the license intermediation history DB 1808. And the unit extracts the values of the license identifier attribute, the public key identifier attribute, the provider identifier attribute, the consumer identifier attribute, the usage condition attribute, the request date attribute and the transmission date attribute from the selected group. In this embodiment, the specifications of the identifier of the requester and the history generation period are received from an operator of the retailer. And, they may also be input from the requester via the Internet.

The history information may be sent to the provider and the requester via an electronic mail and may also be issued by downloading from WWW on demand. In the case tapping and forgery may be performed, it is —Configuration of Consumer Terminal—

Figure 26:
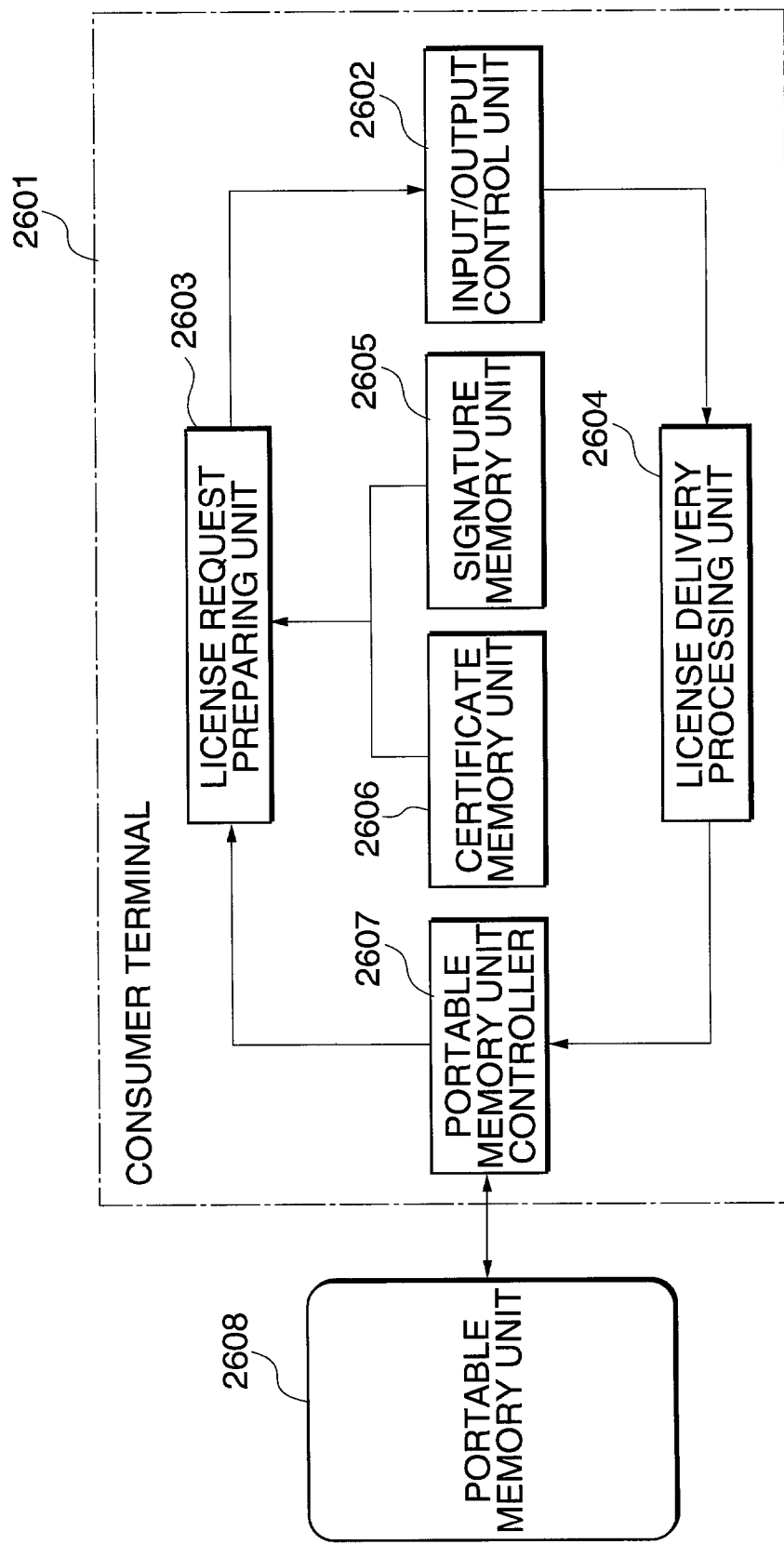
FIG. 26 is a block diagram showing a consumer terminal to which the invention is applied.

FIG. 26 is a block diagram showing a consumer terminal in this embodiment.

A consumer in this embodiment owns a portable memory unit storing a consumer identifier and a consumer private information. The consumer receives a license from a retailer via the Internet and stores it in the portable memory unit. A consumer terminal includes an input/output control unit 2602, a license request preparing unit 2603, a license delivery processing unit 2604, a signature key memory unit 2605, a certificate memory unit 2606 and a portable memory unit controller 2607. The terminal is connected to the Internet via the input/output control unit 2602 and is connected to the portable memory unit via the portable memory unit controller 2607.

The role of each unit of the consumer terminal in this embodiment is as follows.

Input/output control unit 2602: Accepts the input of data via the Internet and outputs a license request generated by the license request preparing unit 2603 via the Internet.

License request preparing unit 2603: Generates a license request and sends it to a retailer via the input/output control unit 2602. In the process of generating the license request, the signature key memory unit 2605 and the certificate memory unit 2606 are accessed and the portable memory unit 2608 is accessed via the portable memory unit controller 2607.

License delivery processing unit 2604: Processes a license delivery from a retailer and stores the license included in the license delivery into the portable memory unit 2608 via the portable memory unit controller 2607.

Signature key memory unit 2605: Stores the signature key used for a digital signature generated by the consumer terminal.

Certificate memory unit 2606: Stores the public key certificate including the verification key that can verify the digital signature generated based upon the signature key stored in the signature key memory unit 2605.

Portable memory unit controller 2607: Writes data to the portable memory unit 2608 and accesses the portable memory unit.

In this embodiment, the consumer terminal stores the signature key used for generating a digital signature for a license request. And the terminal stores the public key certificate including the verification key for verifying the signature generated based upon the signature key. However, these may also be stored in the portable memory unit.

In this embodiment, a consumer owns the portable memory unit and a license is stored in the storage. However, a license may also be stored in the storage area of the consumer terminal.

—License Request Preparing Unit—

The consumer terminal in this embodiment generates a license request for requesting the mediation of the license of digital contents in the license request preparing unit 2603, when a consumer using the terminal wants to use the digital contents. The terminal sends the request to the retailer via the input/output control unit 2602.

In the license request preparing unit 2603, the following values are each set in each field of the license request.

Sender field: The identifier of the consumer terminal.

Receiver field: The identifier of the retailer.

Date/time field: The current point of time.

License specification field: The specification of the license described later.

Digital signature field: The digital signature the generated license request. To generate the digital signature, the license request preparing unit 2603 includes a signature preparing unit and sets the signature value prepared by the signature preparing unit in this field. The signature key for generating the signature is acquired by accessing to the signature key memory unit 2605.

Certificate field: The public key certificate stored in the certificate memory unit 2606.

The following values are each set in each field of the license specifications specified in the license specification field.

Public key identifier field: The identifier of the public key for verification assigned to the digital contents the consumer want to use.

Consumer identifier field: The identifier of the consumer using the consumer terminal. The identifier of the consumer is stored in the portable memory unit 2608 and the license request preparing unit 2603 acquires the identifier of the consumer from the portable memory unit 2608 via the portable memory unit controller 2607.

Usage condition field: The license request preparing unit 2603 determines and sets a suitable usage condition.

Agreement field: Unset.

—License Delivery Processing Unit—

When a license request is generated in the license request preparing unit 2603 and is sent to a retailer, a license delivery is sent from the retailer as a response. The license delivery is input to the license delivery processing unit 2604 via the input/output control unit 2602 and is processed there.

Figure 27:
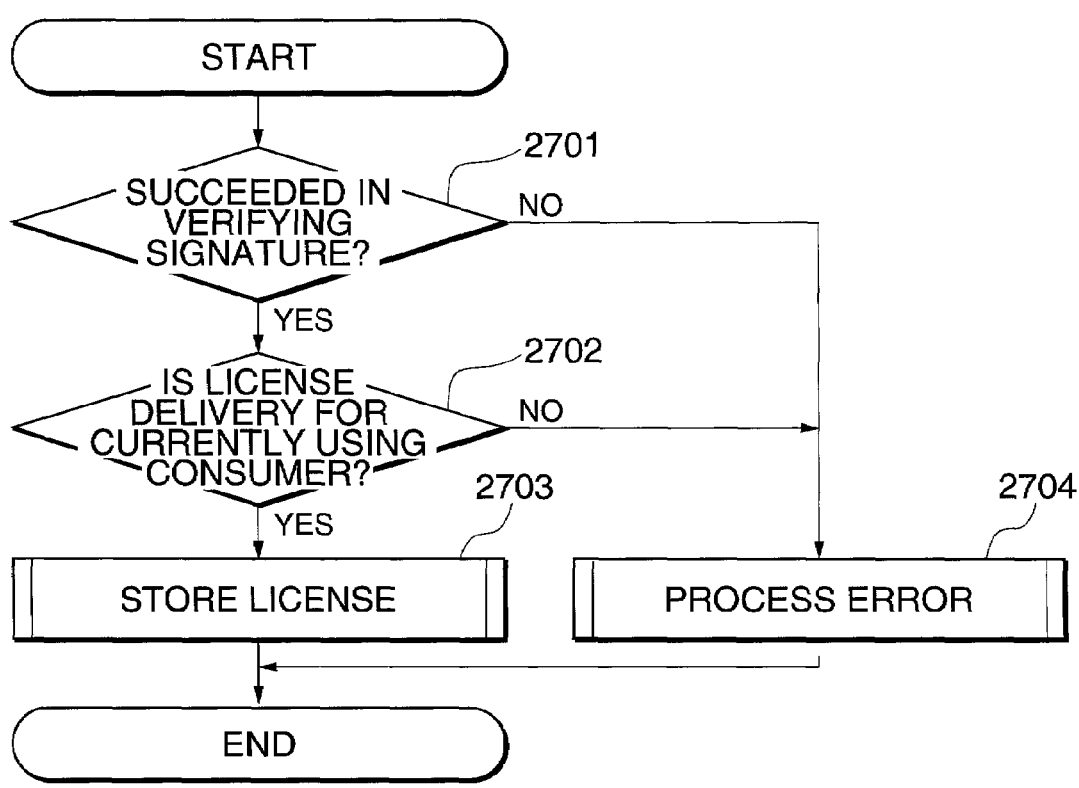
FIG. 27 is a flowchart showing the operation of the license request preparing unit that the consumer terminal to which the invention is applied has.

FIG. 27 is the flowchart showing the operation of the license request preparing unit 2603 which the consumer terminal in this embodiment has. Referring to FIG. 27, the operation of the license request preparing unit 2603 will be described below.

First, the digital signature for the input license delivery and the license included in the license delivery is verified (2701). For the verification key, the one included in the public key certificate attached to the certificate field of the license delivery is used. However, in the case the required public key certificate does not exist in the certificate field, the signature is verified after the public key certificate is acquired from CA 108.

In the case a digital signature is not verified in 2701, the processing is terminated after error processing is executed (2704).

In the case the digital signature is verified in 2701, it is checked whether the license included in the input license delivery is the one for the consumer currently using the consumer terminal or not (2702). The check is made by whether or not the identifier of the consumer acquired from the portable memory unit 2608 via the portable memory unit controller 2607 and the value in the recipient field of the license included in the input license delivery are coincident.

In the case it is judged in the check in 2702 that the license included in the input license delivery is not the one for the consumer, the processing is terminated after error processing is executed (2704).

In the case it is judged in the check in 2702 that the license included in the input license delivery is the one for the consumer, the license is stored in the portable memory unit 2608 via the portable memory unit controller 2607 (2703) and the processing is finished.

In this embodiment, a consumer owns a portable memory unit and the identifier of the consumer is stored there. However, it may also be stored in the storage area of the consumer terminal.

As described above, according to the invention, the provider of digital contents is released from the installation and the maintenance of a facility for issuing a license.

What is claimed is:

1. A license-issuing system which issues an electronic license for certifying that usage of digital contents is permitted to a specific user, the digital contents being provided by at least one of a provider and a seller, the system comprising:

verification information generation means for generating information for verification from a license-issuing center, the license-issuing center being independent from the at least one of the provider and the seller, the information for verification required to verify legitimacy of an electronic license;

verification information output means for outputting the information for verification generated by the verification information generation means;

license generation means which receives information to specify information for verification and generates the electronic license from the license-issuing center, the electronic license able to be verified by the information for verification specified by the received information; and license output means for outputting the electronic license generated by the license generation means, wherein information to specify an intermediator of the issuance of the electronic license and an agreement for certifying that the intermediation of the issuance of the electronic license corresponding to the specified information for verification is allowed to the specified intermediator are input to the license generation means together with the information to specify information for verification, and it is checked by the agreement whether or not the intermediation of the issuance of the electronic license corresponding to the information for verification is allowed to the intermediator and only in the case the intermediation is allowed, the electronic license is generated.

2. A license-issuing system according to claim 1, further comprising:

usage condition generation means for generating a usage condition which is a condition for limiting usage of digital contents, wherein:

the usage condition generated by the usage condition generation means is included in the electronic license generated by the license generation means.

3. A license-issuing system according to claim 1, further comprising:

a license issuance history memory unit for storing an issuance history of an electronic license;

a content provider's issuance history preparing unit which receives information to specify a content provider of digital contents and extracts an issuance history which is a history of the issuance of a license for digital contents provided by the specified content provider from the issuance histories stored in the license issuance history memory unit; and a content provider's issuance history output unit for outputting the issuance history for the specified content provider generated in the content provider's issuance history preparing unit.

4. A license-issuing system according to claim 1, further comprising:

license request receiving means for receiving a request for issuance of an electronic license, wherein, in the case the license request receiving means receives a request for the issuance of an electronic license, an electronic license is generated in the license generation means, wherein the license-issuing system further comprises:

a license issuance history memory unit for storing an issuance history of an electronic license;

a requestor's issuance history preparing unit which receives information to specify a requester of the issuance of the license and extracts the specified requestor's issuance history, which is the issuance history of the electronic license requested from the specified requester, from the issuance histories stored in the license issuance history memory unit; and a requestor's issuance history output unit for outputting the issuance history for the requester prepared in the requestor's issuance history preparing unit.

5. A license-issuing system according to claim 1, further comprising:

a verification information issuance history memory unit for storing a history of issuance of information for verification;

a verification information issuance history preparing unit which receives information to specify a recipient of information for verification and extracts the issuance history which is a history of the issuance of the information for verification issued to the specified recipient from the issuance histories stored in the verification information issuance history memory unit; and a verification information issuance history output unit for outputting the issuance history prepared in the verification information issuance history preparing unit.

6. A license-issuing system according to claim 1, further comprising:

public key pair preparing means for generating a public key pair; and private key storage means for storing a private key of the public key pair prepared in the public key pair preparing means, wherein:

the information for verification is the public key prepared by the public key pair preparing means; and the license is generated using the private key stored in the private key storage means.

7. The license-issuing system of claim 1, wherein the license is generated only from the license-issuing center.

8. A license intermediation system that intermediates a request for an electronic license for certifying that usage of digital contents is permitted to a specific user, the digital contents being provided by at least one of a provider and a seller, the system comprising:

license request receiving means for receiving a first license request, by the at least one of the provider and the seller, the first license request including a request for the issuance of the electronic license for certifying that the usage of specific digital contents is licensed;

license request preparing means for generating, from the at least one of the provider and the seller, a second license request for requesting the issuance of the electronic license requested in the received first license request;

license request output means for outputting the second license request prepared in the license request preparing means to a license-issuing center, the license-issuing center being independent from the at least one of the provider and the seller; and agreement storage means for storing an agreement for certifying that the system is permitted to intermediate the issuance of a license for specific digital contents, wherein the agreement stored in the agreement storage means is attached to the license request prepared by license request preparing means.

9. A license intermediation system according to claim 8, wherein:

information for verification required to verify legitimacy of a specific license is bound with specific digital contents; and information to specify the information for verification is included in the first and second license requests.

10. A license intermediation system according to claim 8, wherein:

the requested license includes a usage condition which is a condition for limiting the usage of digital contents;

usage condition preparing means for preparing the usage condition to be included in the requested license is provided; and the usage condition prepared by the usage condition generation means is included in the second license request prepared by the license request preparing means.

11. A license intermediation system according to claim 8, further comprising:

accounting means for charging a license issuance fee to a requester of the first license request, wherein:

when the first license request is received, the license issuance fee is charged to the requester by the accounting means.

12. A license intermediation system according to claim 8, further comprising:

settlement means for collecting a license issuance fee from a requester of the first license request, wherein:

when the first license request is received, the license issuance fee is collected from the requester by the settlement means.

13. The license intermediation system of claim 8, wherein the license is generated only from the license-issuing center.

14. An agreement issuing method for allowing intermediation of a request for an electronic license for certifying that usage of digital contents is permitted to a specific user, the digital contents being provided by a provider, the method comprising:

inputting information to the provider to specify an intermediator who intermediates a request for an electronic license for digital contents, wherein the electronic license is issued by a license-issuing center, the license-issuing center being independent from the provider and the intermediator;

inputting information to the provider to specify the digital contents the intermediation of which is permitted to the intermediator;

generating an agreement from the provider for certifying that the intermediation of the request for the electronic license for the specified digital contents is permitted to the specified intermediator; and outputting the generated agreement to the license-issuing center, wherein the license-issuing center verifies whether the intermediator is a specified intermediator.

15. The agreement issuing method of claim 14, wherein the license is generated only from the license-issuing center.

16. An agreement issuing system which issues an agreement for allowing intermediation of a request for an electronic license for certifying that usage of digital contents is permitted to a specific user, the digital contents being provided by a provider, the system comprising:

agreement generating means which receives, for the provider, information to specify an intermediator that intermediates a request for an electronic license of digital contents and information to specify the digital contents the request for the electronic license of which the intermediator is allowed to intermediate, and generates from the provider an agreement for certifying that the specified intermediator is allowed to intermediate the request for the electronic license of the specified digital contents, where the electronic license is issued by a license-issuing center, the license-issuing center being independent from the provider and the intermediate; and agreement output means for outputting the agreement generated by the agreement generating means to the license-issuing center, wherein the license-issuing center verifies whether the intermediator is a specified intermediator.

17. The agreement issuing system of claim 16, wherein the license is generated only from the license-issuing center.

18. An agreement issuing system according to claim 16, comprising:

usage condition limitation information generating means for generating usage condition limitation information which limits a range of a usage condition for limiting the usage of digital contents, wherein:

the usage condition limitation information generated by the usage condition limitation information generating means is included in the agreement generated by the agreement generating means.

19. An agreement issuing system according to claim 16, further comprising:

an agreement issuance history memory unit for storing an issuance history of an agreement;

a history preparing unit which receives information to specify an intermediator and extracts an issuance history for the agreement issued to the specified intermediator from the issuance histories stored in the agreement issuance history memory unit; and a history output unit for outputting the issuance history prepared in the history preparing unit.

20. A feature providing method for providing a user with one or more features, comprising:

storing information for verification to verify an electronic license for certifying that usage of all or part of features is permitted to a specific user;

inputting an electronic license;

verifying legitimacy of the input electronic license using the stored information for verification; and activating at least part of the features only if it is judged that the input electronic license is legitimate;

wherein the information for verification and the electronic license were generated from a license-issuing center, the one or more features were provided by at least one of a provider and a seller, and the license-issuing center is independent from the at least one of the provider and the seller.

21. The feature providing method of claim 20, wherein the license is generated only from the license-issuing center.

22. A digital contents operation method, comprising:

storing information for verification to verify an electronic license for certifying that operation of digital contents is permitted to a specific user;

inputting an electronic license;

verifying legitimacy of the input electronic license using the stored information for verification; and enabling at least part of operations of the digital contents only if it is judged that the input electronic license is legitimate;

wherein the information for verification and the electronic license were generated from a license-issuing center, the digital contents were provided by at least one of a provider and a seller, and the license-issuing center is independent from the at least one of the provider and the seller.

23. The digital contents operation method of claim 22, wherein the license is generated only from the license-issuing center.

24. A digital contents decrypting method for decrypting encrypted digital contents, comprising:

storing information for verification to verify an electronic license that certifies that decrypting of encrypted digital contents is permitted to a specific user;

inputting an electronic license;

verifying legitimacy of the input electronic license using the stored information for verification; and decrypting the encrypted digital contents only if it is judged that the input electronic license is legitimate;

wherein the information for verification and the electronic license were generated from a license-issuing center, the encrypted digital contents were provided by at least one of a provider and a seller, and the license-issuing center is independent from the at least one of the provider and the seller.

25. The digital contents decrypting method of claim 24, wherein the license is generated only from the license-issuing center.

26. A digital contents decompression method for decompressing compressed digital contents, comprising:

a step for storing information for verification to verify an electronic license that certifies that the decompression of compressed digital contents is permitted to a specific user;

a step for inputting an electronic license;

a step for verifying the legitimacy of the input electronic license using the stored information for verification; and a step for decompressing the compressed digital contents only if it is judged that the input electronic license is legitimate;

wherein the information for verification and the electronic license were generated from a license-issuing center, the compressed digital contents were provided by at least one of a provider and a seller, and the license-issuing center is independent from the at least one of the provider and the seller.

27. The digital contents decompression method of claim 26, wherein the license is generated only from the license-issuing center.

28. A system that provides one or more features to a user, comprising:

verification information storage means for storing information for verification to verify an electronic license that certifies that usage of all or a part of features of the system is permitted to a specific user; and license verification means which receives an electronic license and verifies legitimacy of the received electronic license using the information for verification stored in the verification information storage means, wherein:

at least part of the features is activated only if it is judged in the license verification means that the received electronic license is legitimate;

wherein the information for verification and the electronic license were generated from a license-issuing center, one or more features were provided by at least one of a provider and a seller, and the license-issuing center is independent from the at least one of the provider and the seller.

29. A system according to claim 28, further comprising:

connection means for connecting to the system a portable memory unit that stores an electronic license, wherein:

the license verification means verifies the legitimacy of the electronic license stored in the portable memory unit connected via the connection means.

30. The system of claim 28, wherein the license is generated only from the license-issuing center.

31. A digital contents operation system, comprising:

verification information storage means for storing information for verification to verify an electronic license that certifies that operation of digital contents is permitted to a specific user; and license verification means which receives an electronic license and verifies legitimacy of the received electronic license using the information for verification stored in the verification information storage means, wherein:

at least part of the operations of digital contents is enabled only if it is judged in the license verification means that the received electronic license is legitimate;

wherein the information for verification and the electronic license were generated from a license-issuing center, the digital contents were provided by at least one of a provider and a seller, and the license-issuing center is independent from the at least one of the provider and the seller.

32. A digital contents operation system according to claim 31, further comprising:

connection means for connecting to the system a portable memory unit that stores an electronic license, wherein:

the license verification means verifies the legitimacy of the electronic license stored in the portable memory unit connected via the connection means.

33. A digital contents operation system according to claim 31, wherein:

the information for verification is included in digital contents; and the information for verification is extracted from the digital contents and is stored in the verification information storage means.

34. The digital contents operation system of claim 31, wherein the license is generated only from the license-issuing center.

35. A digital contents decrypting system for decrypting encrypted digital contents, comprising:

verification information storage means for storing information for verification to verify an electronic license that certifies that decrypting of encrypted digital contents is permitted to a specific user; and license verification means which receives an electronic license and verifies legitimacy of the received electronic license using the information for verification stored in the verification information storage means, wherein:

the encrypted digital contents are decrypted only if it is judged in the license verification means that the received electronic license is legitimate;

wherein the information for verification and the electronic license were generated from a license-issuing center, the encrypted digital contents were provided by at least one of a provider and a seller, and the license-issuing center is independent from the at least one of the provider and the seller.

36. A digital contents decrypting system according to claim 35, further comprising:

connection means for connecting to the system a portable memory unit that stores an electronic license, wherein:

the license verification means verifies the legitimacy of the electronic license stored in the portable memory unit connected via the connection means.

37. The digital contents decrypting system of claim 35, wherein the license is generated only from the license-issuing center.

38. A digital contents decrypting system according to claim 35, wherein:

the information for verification is included in encrypted digital contents; and the information for verification is extracted from the encrypted digital contents and is stored in the verification information storage means.

39. A digital contents decompression system for decompressing compressed digital contents, comprising:

means for receiving compressed digital contents to be decompressed;

verification information storage means for storing information for verification to verify an electronic license that certifies that decompression of digital contents is permitted to a specific user; and license verification means which receives an electronic license and verifies legitimacy of the received electronic license using the information for verification stored in the verification information storage means, wherein:

the compressed digital contents are decompressed only if it is judged in the license verification means that the received electronic license is legitimate;

wherein the information for verification and the electronic license were generated from a license-issuing center, the compressed digital contents were provided by at least one of a provider and a seller, and the license-issuing center is independent from the at least one of the provider and the seller.

40. A digital contents decompression system according to claim 39, wherein:

the information for verification is included in the compressed digital contents; and the information for verification is extracted from the compressed digital contents and is stored in the verification information storage means.

41. A digital contents decompression system according to claim 39, further comprising:

connection means for connecting to the system a portable memory unit that stores an electronic license, wherein:

the license verification means verifies the legitimacy of the electronic license stored in the portable memory unit connected via the connection means.

42. The digital contents decompression system of claim 39, wherein the license is generated only from the license-issuing center.

* * * * *